United States Patent [19]
Kirchhoffer et al.

[11] Patent Number: 5,835,875
[45] Date of Patent: Nov. 10, 1998

[54] SWAP-SHIFT CONTROL SYSTEM FOR A MULTIPLE RATIO TRANSMISSION

[75] Inventors: Johann Kirchhoffer, Cologne; Thomas Martin, Pulheim; Eric Reichert, Leverkusen; Werner Croonen, Bergheim; Thomas Wagner, Cologne; Wolfgang Wickler, Bruhl, all of Germany

[73] Assignee: Ford Global Technologies, Inc., Dearborn, Mich.

[21] Appl. No.: 701,934

[22] Filed: Aug. 23, 1996

Related U.S. Application Data

[63] Continuation-in-part of Ser. No. 549,438, Oct. 27, 1995, Pat. No. 5,642,283.

[51] Int. Cl.$^6$ .......................... F16H 61/04; B60K 41/06
[52] U.S. Cl. .................... 701/51; 701/55; 701/56; 192/329; 192/333; 477/46; 477/50; 477/152
[58] Field of Search .................. 701/51, 55, 56, 701/58, 60, 61, 62; 477/39, 46, 50, 78, 152, 155; 475/120, 146, 59, 281

[56] References Cited

U.S. PATENT DOCUMENTS

| | | | |
|---|---|---|---|
| 4,007,648 | 2/1977 | Bookout | 74/763 |
| 4,653,350 | 3/1987 | Downs et al. | 74/864 |
| 4,685,356 | 8/1987 | Iwatsuki | 74/866 |
| 4,730,519 | 3/1988 | Nakamura et al. | 74/866 |
| 4,868,753 | 9/1989 | Mori | 364/424.1 |
| 4,884,471 | 12/1989 | Daggett et al. | 74/758 |
| 4,939,955 | 7/1990 | Sugano | 475/278 |
| 5,070,747 | 12/1991 | Lentz et al. | 74/866 |
| 5,078,663 | 1/1992 | Meffert | 475/284 |
| 5,150,296 | 9/1992 | Iwatsuki et al. | 364/424.1 |
| 5,167,592 | 12/1992 | Sakamoto | 475/277 |
| 5,176,592 | 1/1993 | Nakawaki et al. | 475/278 |
| 5,195,036 | 3/1993 | Kimura et al. | 364/424.1 |
| 5,224,907 | 7/1993 | Shirataki | 475/205 |
| 5,320,000 | 6/1994 | Marusue et al. | 477/154 |
| 5,334,117 | 8/1994 | Ito | 475/276 |

*Primary Examiner*—Tan Q. Nguyen
*Attorney, Agent, or Firm*—Frank G. McKenzie; Roger L. May

[57] ABSTRACT

An automatic transmission having a multiple ratio gearset arranged in series with an overdrive gearset wherein ratio upshifts and downshifts are effected by separate reaction brakes for each gearset, each brake being independently controlled to achieve an enhancement of shift quality using closed loop control of reaction brake pressure and high ratio clutch pressure as a function of turbine speed, output shaft speed, brake drum speed for the multiple ratio gearset and input shaft speed in establishing control of upshifts and downshifts.

8 Claims, 48 Drawing Sheets

3-2 DOWNSHIFT(SWAP SHIFT)

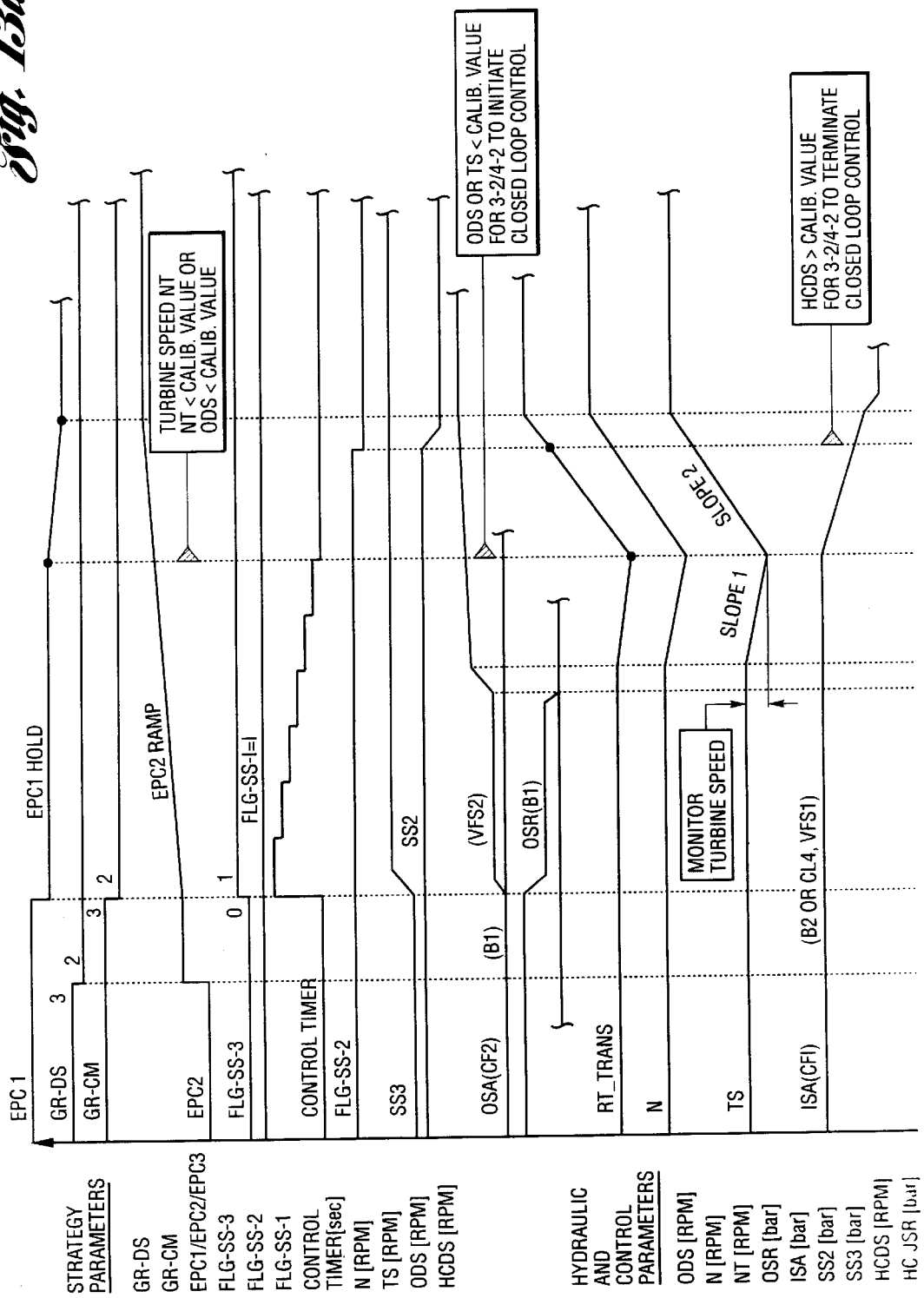

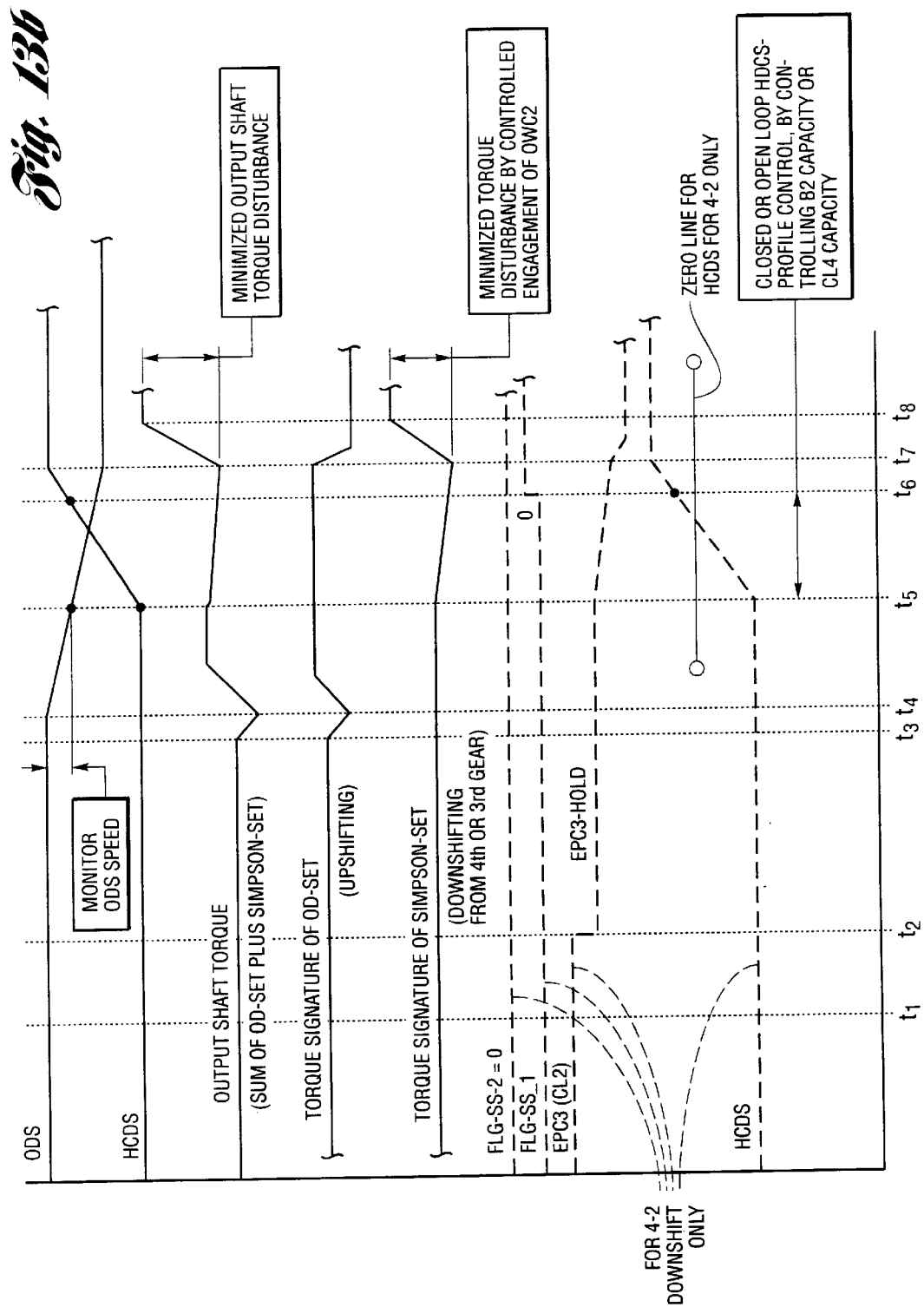

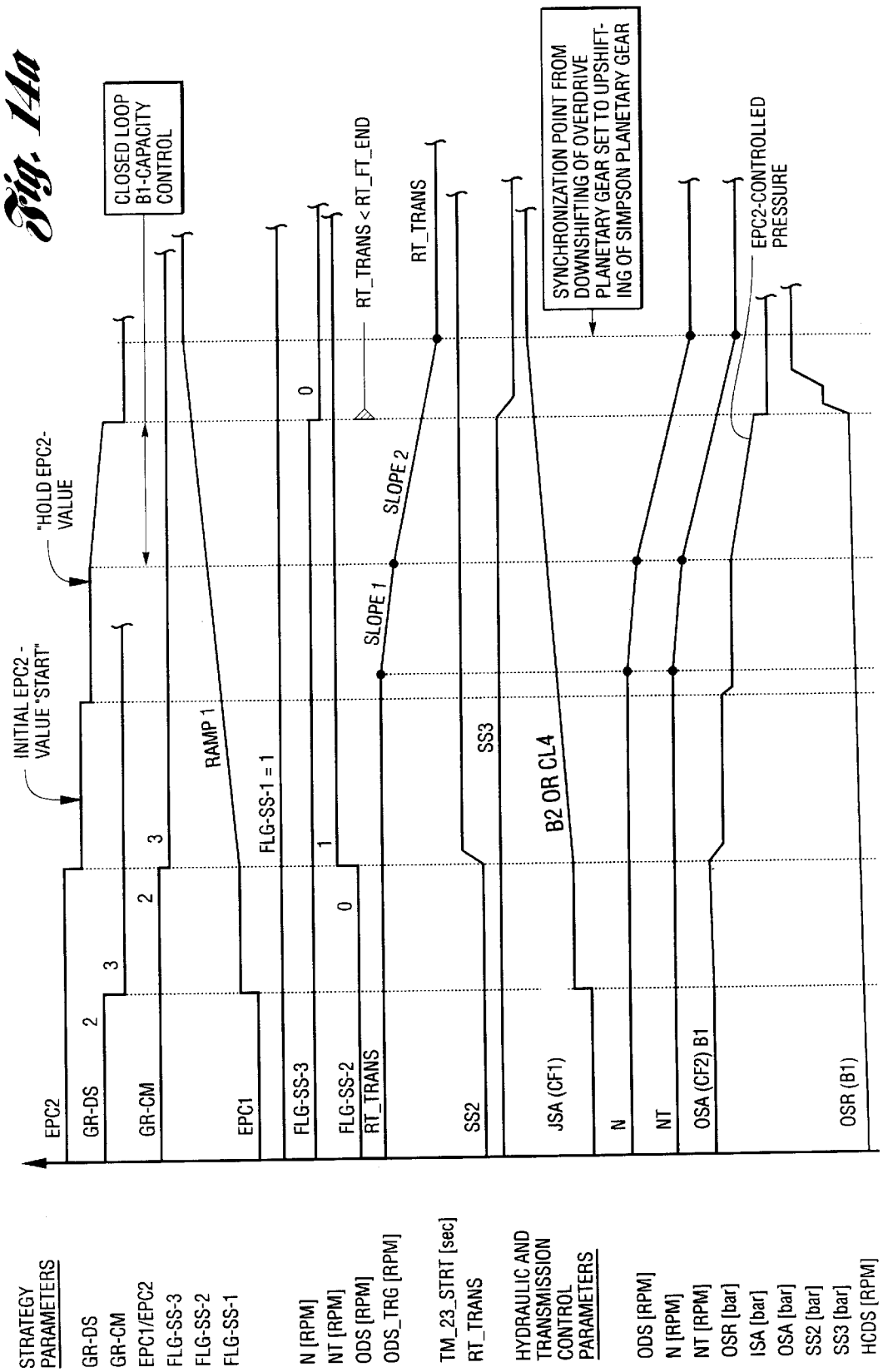

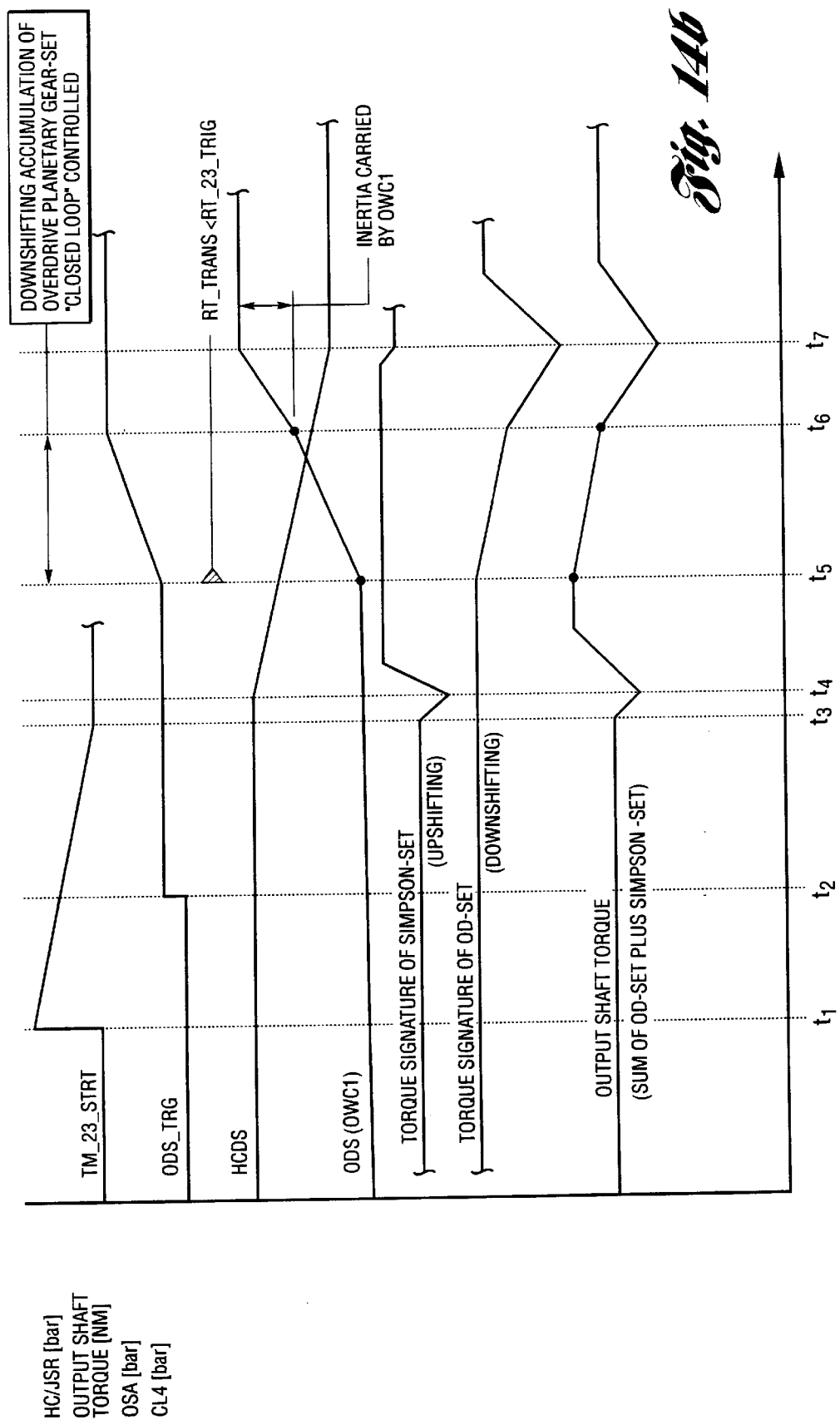

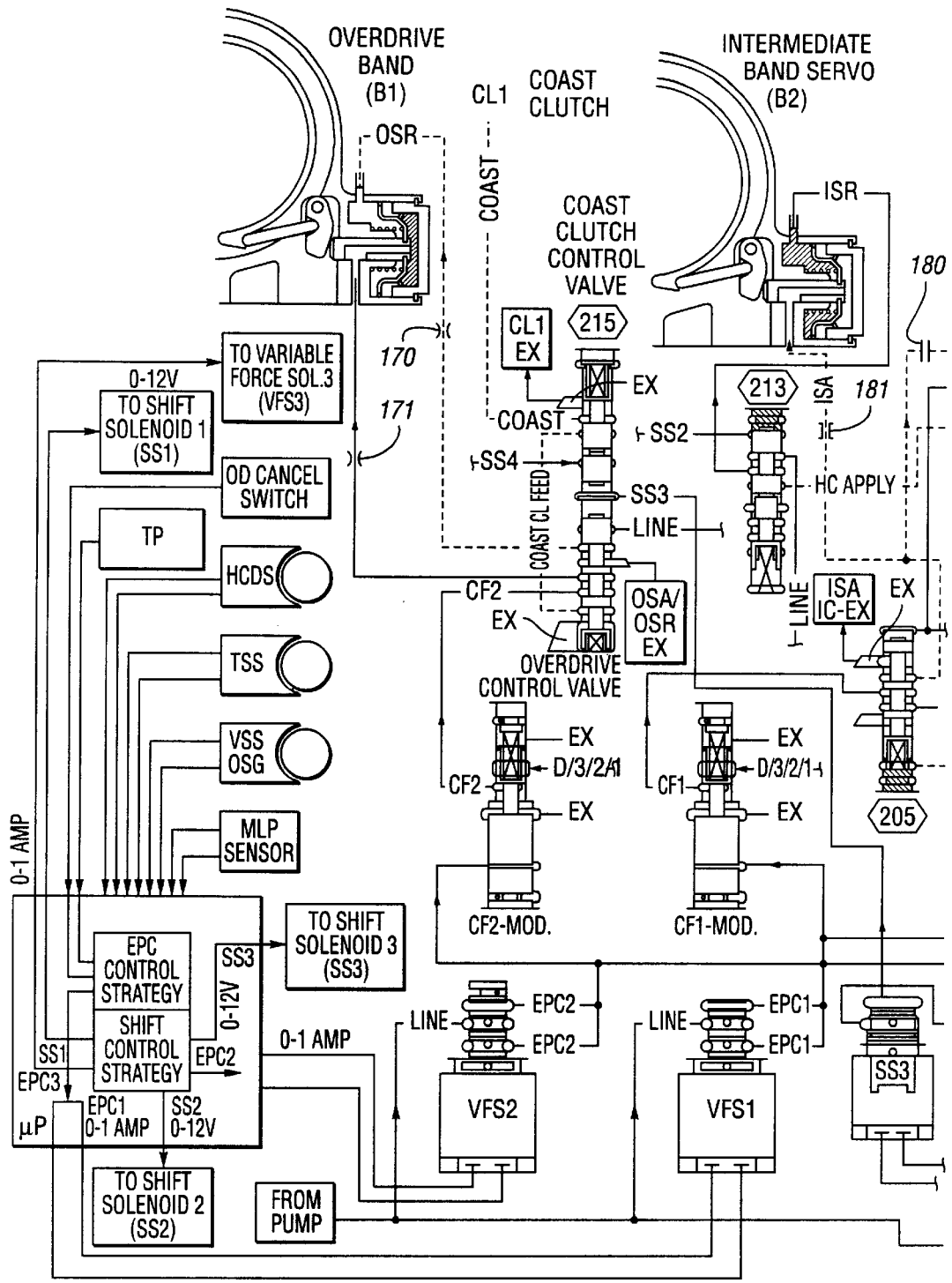
Fig. 22a-a

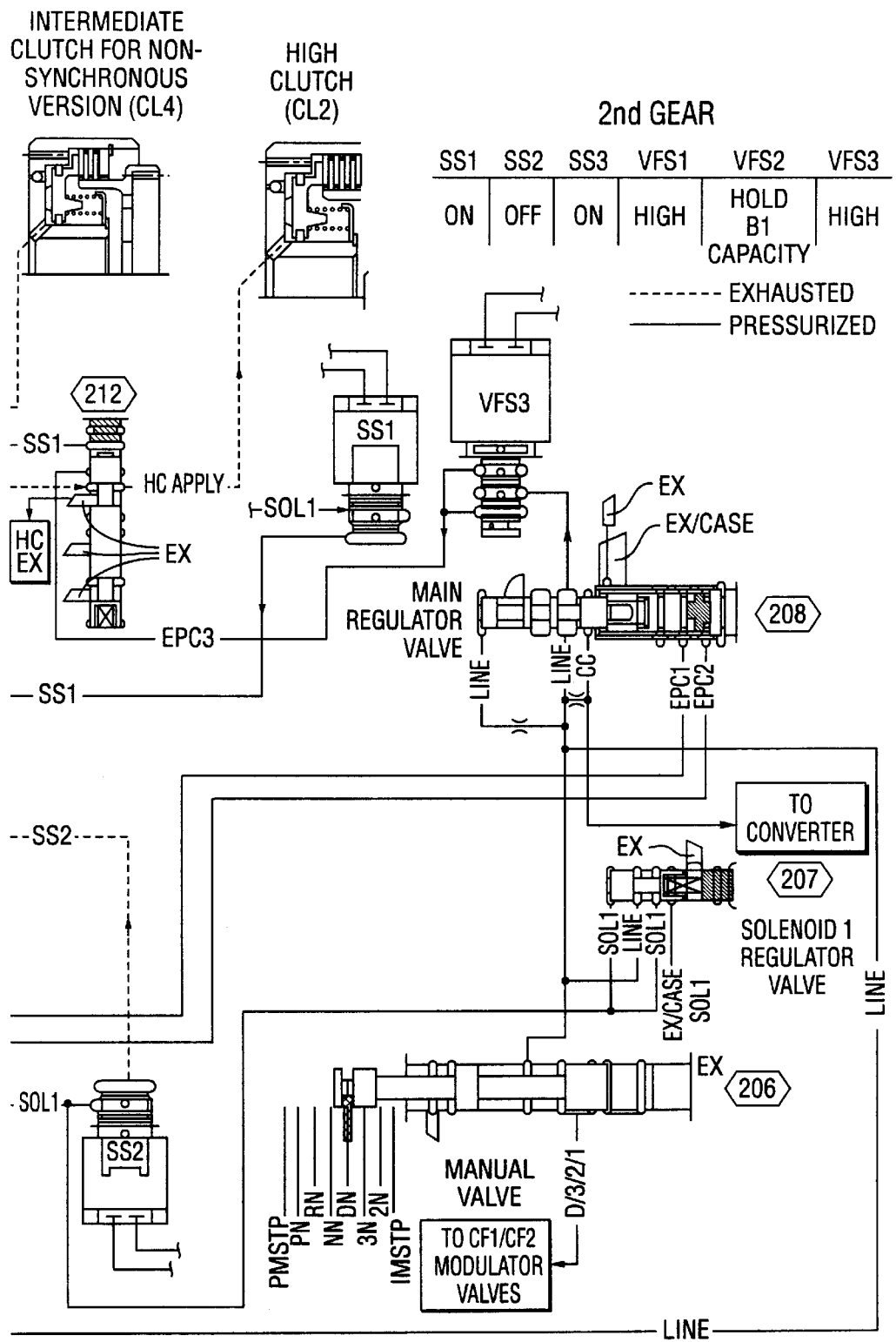
Fig. 22a-b

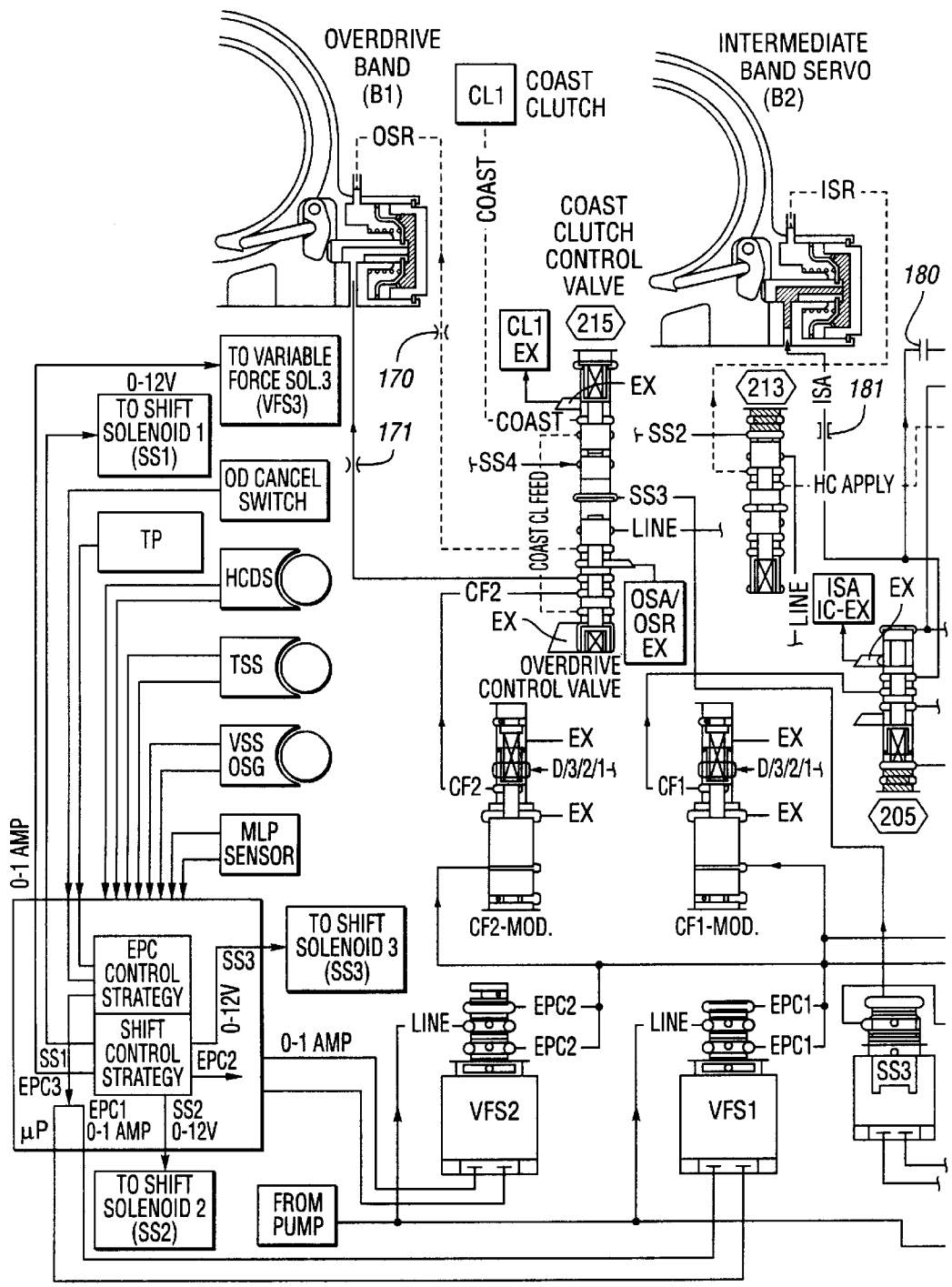
Fig. 22b-a

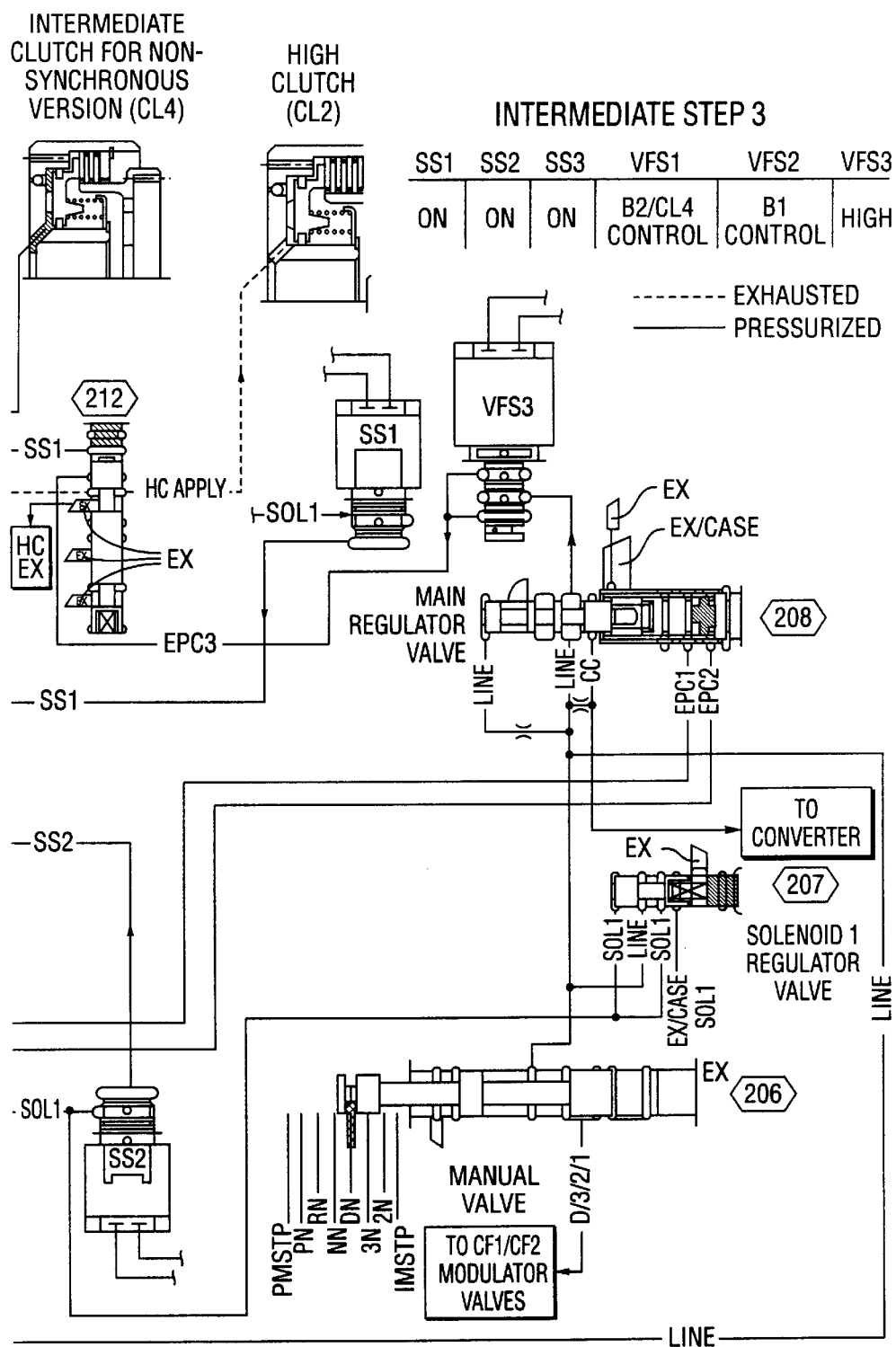
Fig. 22b-b

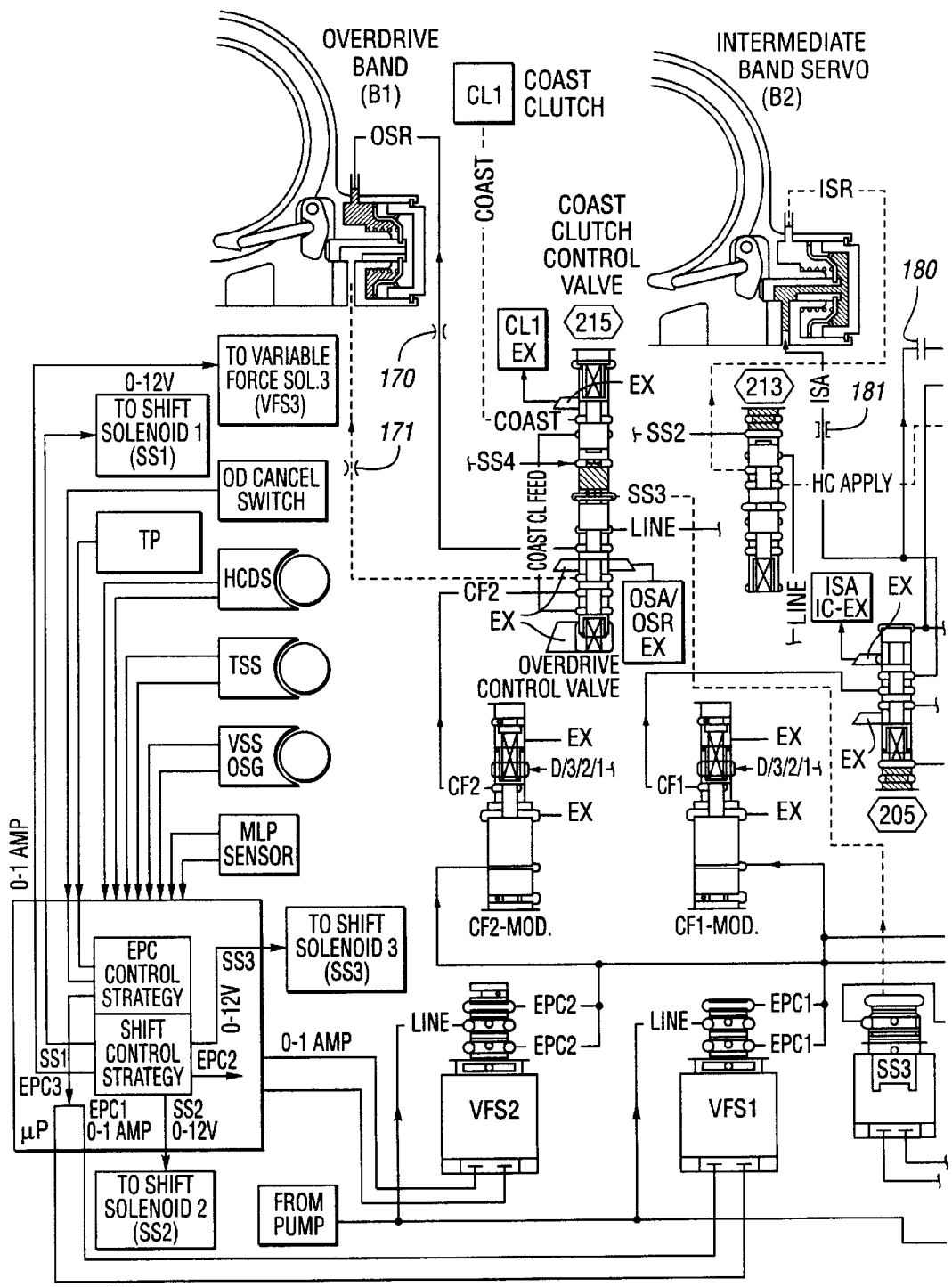
Fig. 22c-a

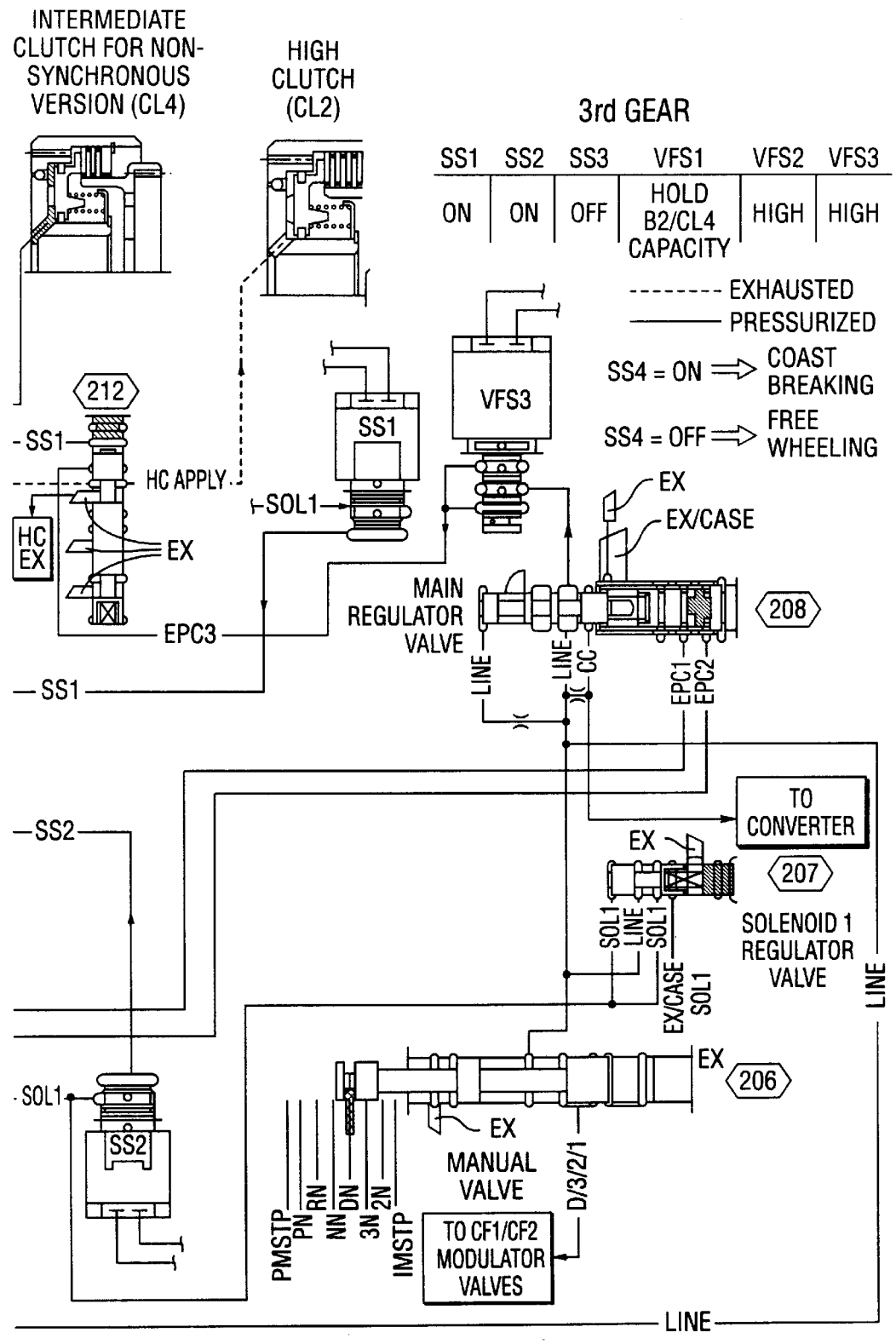
Fig. 22c-b

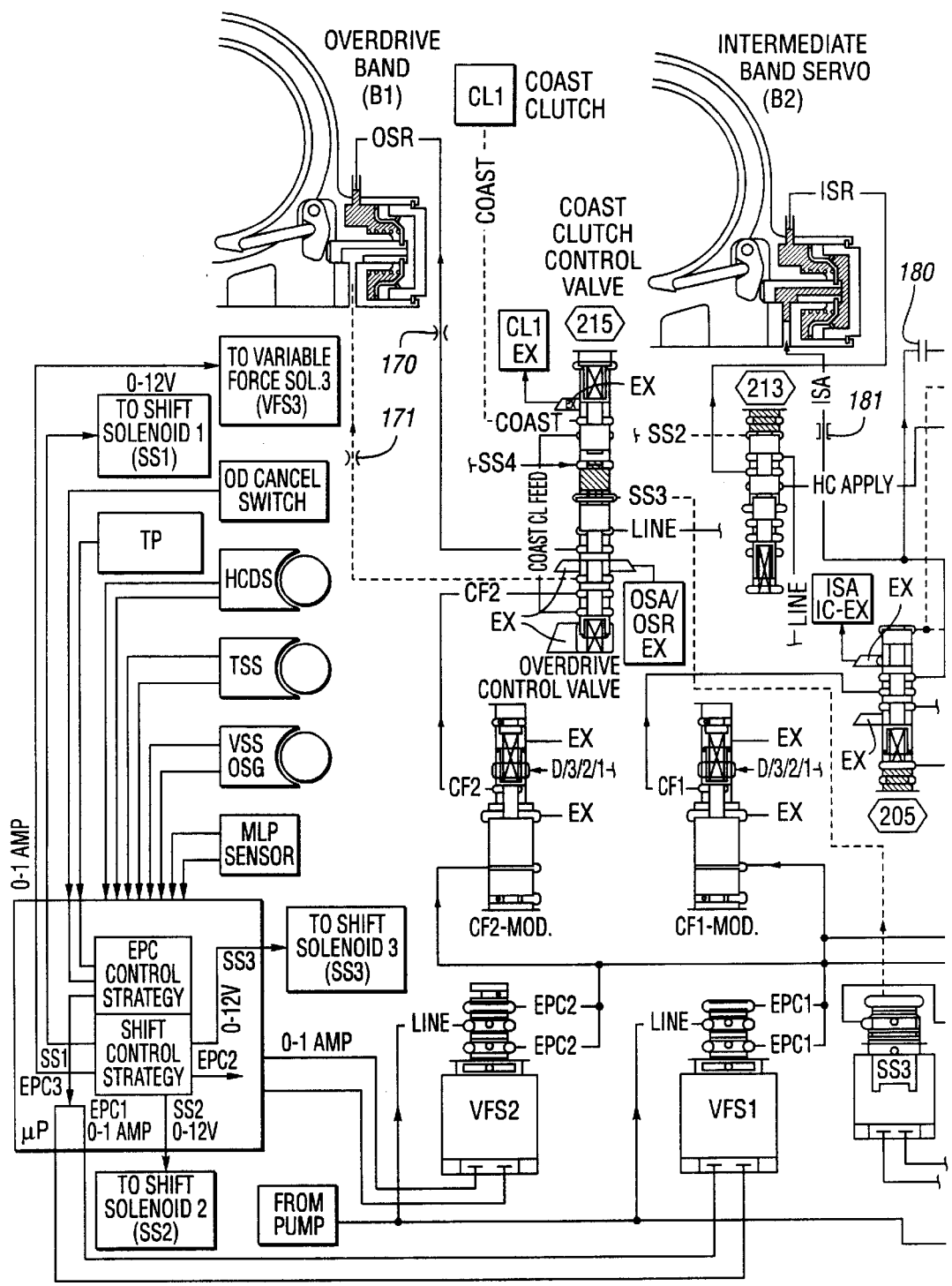
Fig. 22b-a

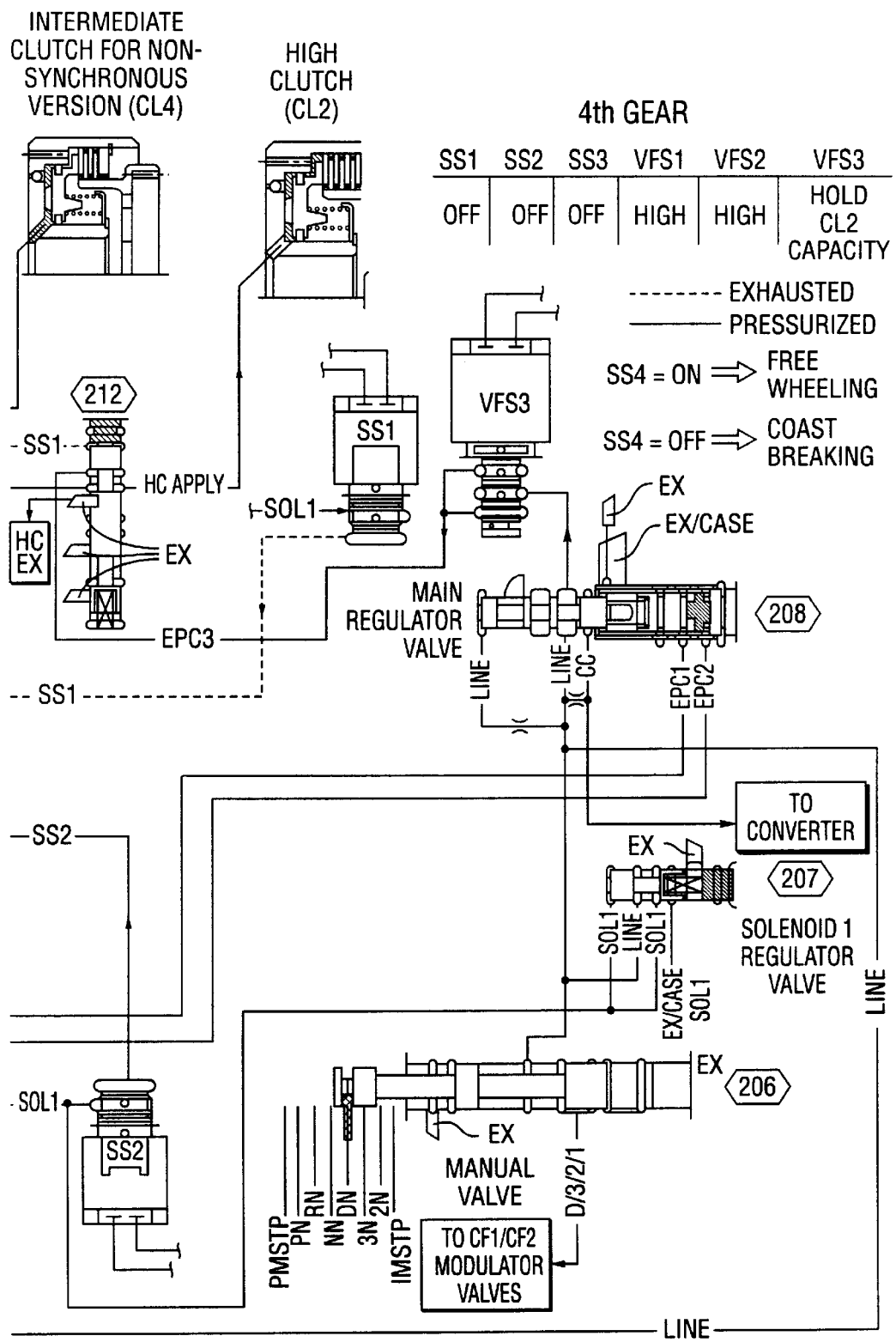
Fig. 22b-b

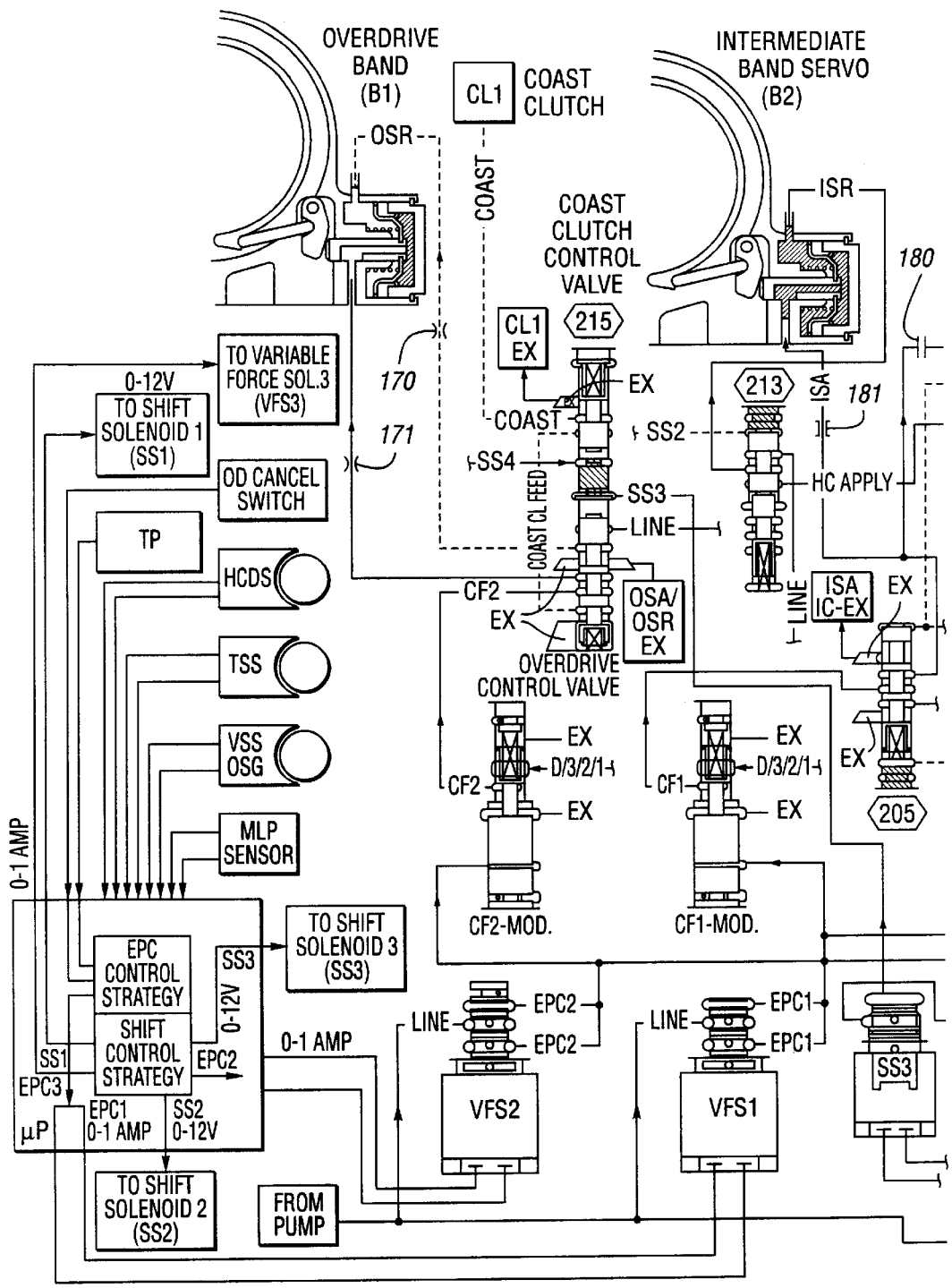
Fig. 22e-a

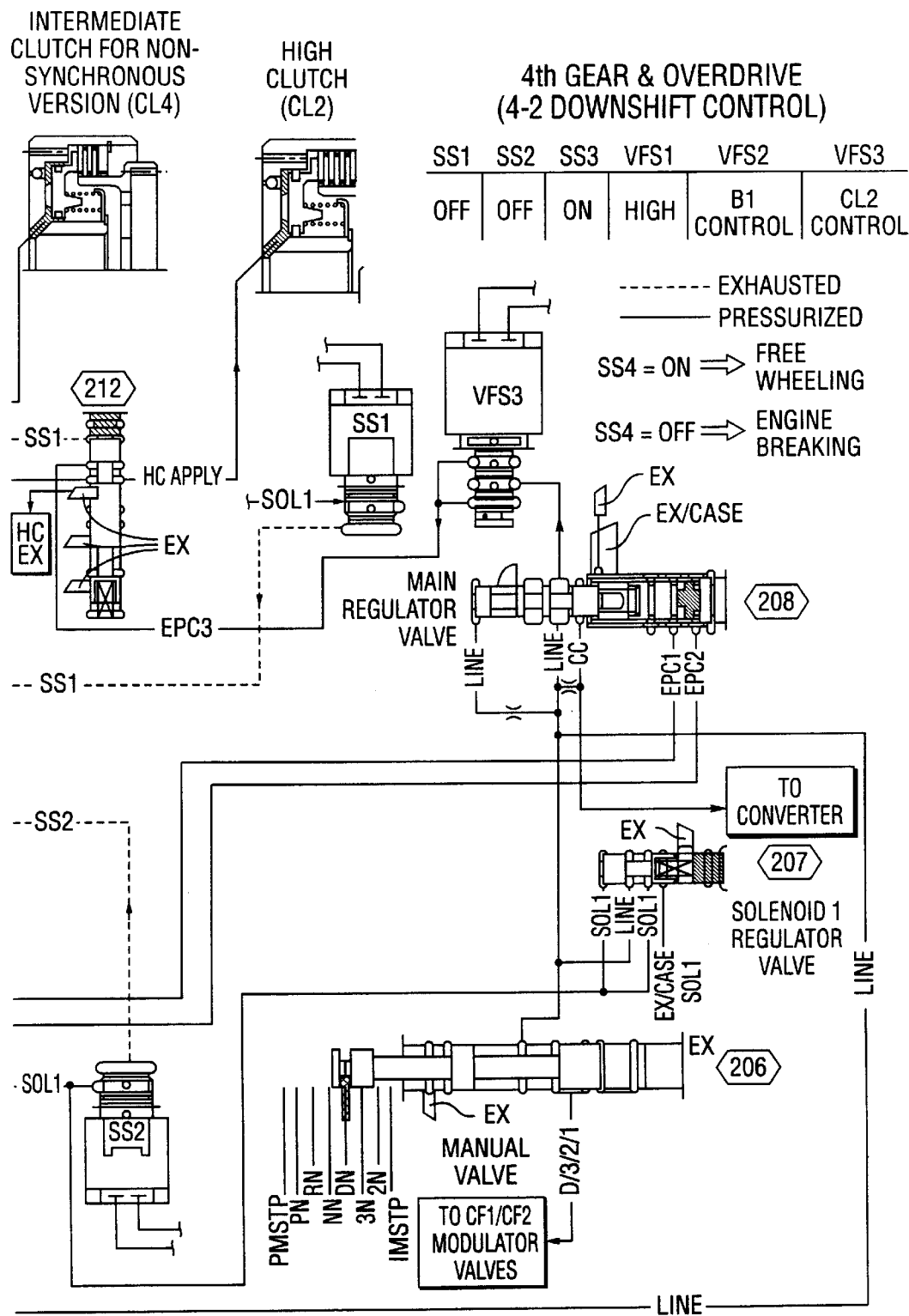
Fig. 22e-b

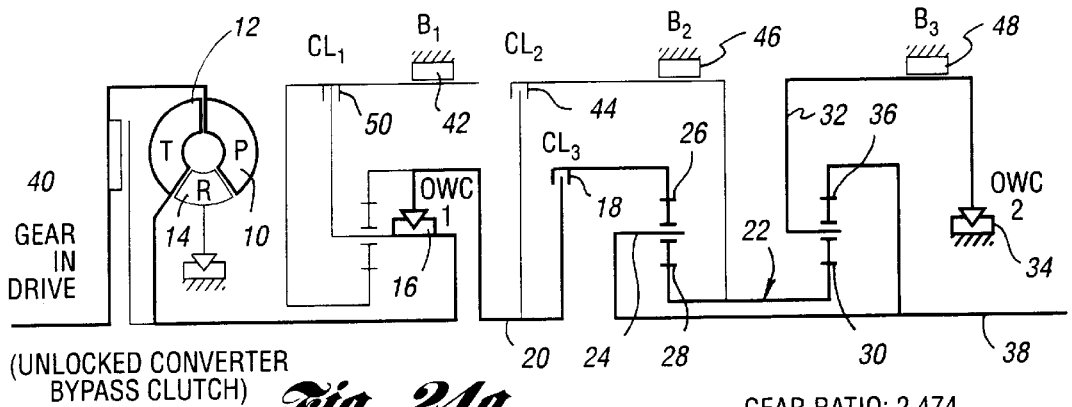
Fig. 24a  GEAR RATIO: 2.474
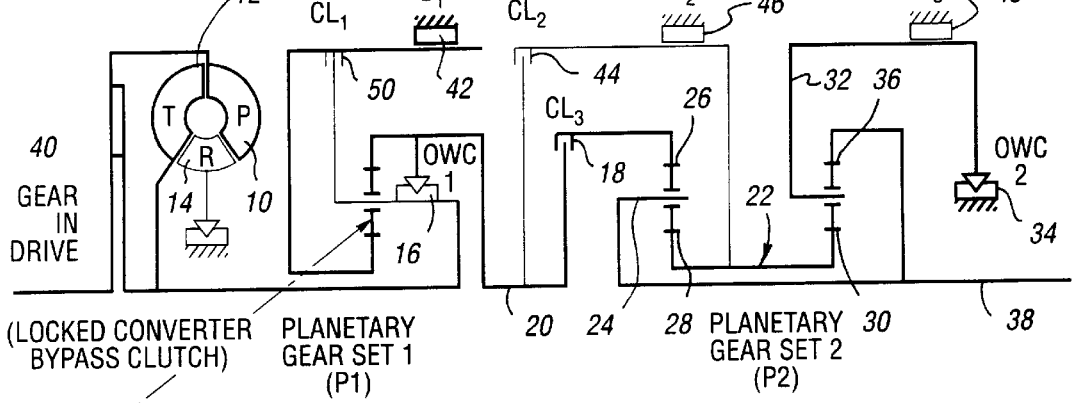
Fig. 24b  GEAR RATIO: 1.855
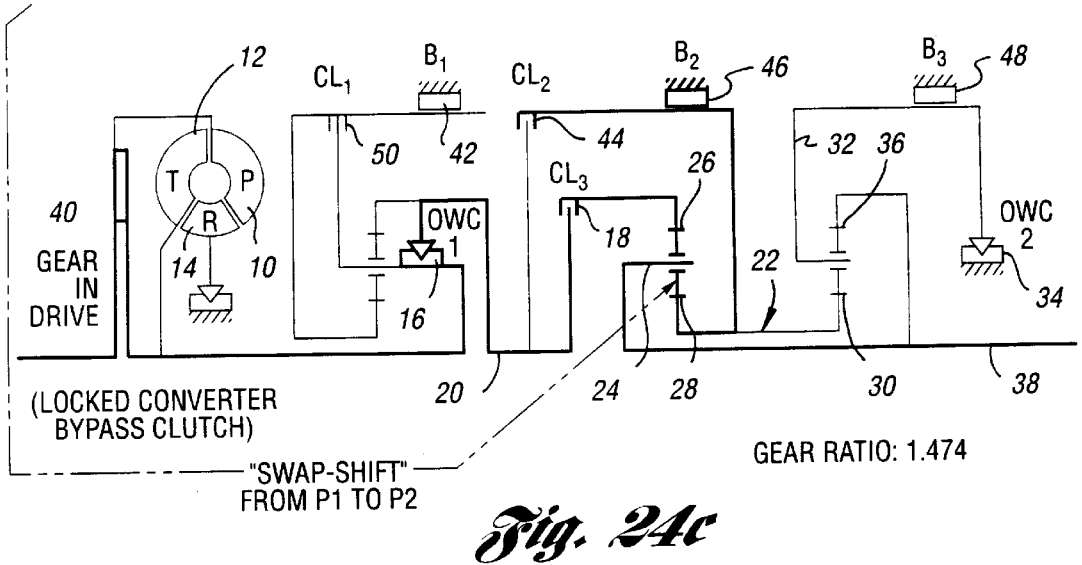
Fig. 24c  GEAR RATIO: 1.474

Fig. 24b

| MANUAL LEVER POSITION | | CL1 | B1 | OWC1 | CL2 | B2 | CL3 | B3 | OWC2 | CC | SS1 | SS2 | SS3 | SS4 | PWM |
|---|---|---|---|---|---|---|---|---|---|---|---|---|---|---|---|
| D | DRIVE 1st | ◸ | | ▨ | | | | | ▨ | ◸ | ▨ | | | ◹ | ◹ |
| | 2nd | | ▨ | ▨ | | | | | ▨ | ◸ | ▨ | ▨ | | ◹ | ◹ |
| | IS3 | ◸ | | | | | ▨ | | ▨ | ◸ | ▨ | ▨ | ▨ | ◹ | ◹ |
| | 3RD | ◸ | | | | | ▨ | | ▨ | ◸ | | ▨ | ▨ | ◹ | ◹ |
| | IS1 | ◸ | | | | ▨ | ▨ | | | ◸ | | ▨ | | ◹ | ◹ |
| | IS2 | ◸ | | | | ▨ | ▨ | | | ◸ | | | | ◹ | ◹ |
| | 4th ODC SWITCH = OFF | | | | ▨ | ▨ | ▨ | | | ◸ | | | ▨ | ◹ | ◹ |
| | 4th ODC SWITCH = ON | | | | ▨ | ▨ | ▨ | | | ◸ | ▨ | | ▨ | ◹ | ◹ |
| | 5th | | | | ▨ | | ▨ | | | | ▨ | ▨ | ▨ | | ◹ |
| 2 | MAN2 3rd+OD | ◸ | | | | | ▨ | | ▨ | ◸ | | ▨ | ▨ | | ◹ |
| | *3rd | ◸ | | | | | ▨ | | ▨ | ◸ | | ▨ | ▨ | | ◹ |
| 1 | MAN1 3rd+OD | ◸ | | | | | ▨ | | ▨ | ◸ | | ▨ | ▨ | | |
| | 3rd | ◸ | | | | | ▨ | | | | | | | | |
| | 1st | ▨ | | | | | | ▨ | | | ▨ | | ▨ | | |

FRICTION AND REACTION ELEMENTS | SHIFT SOLENOID STAGES

Legend:
- ▨ (cross-hatched) = SHIFT SOLENOID IS ENERGIZED OR CLUTCH ENGAGED
- ☐ (blank) = SHIFT SOLENOID IS DE-ENERGIZED OR CLUTCH IS RELEASED
- ◸ (triangle) = CLUTCH OR SOLENOID CAN BE ENERGIZED OR DE-ENERGIZED DEPENDING ON VEHICLE OPERATING CONDITION
- * = HYDRAULICALLY LOCKED

SWAP-SHIFT CONTROL SYSTEM FOR A MULTIPLE RATIO TRANSMISSION

CROSS-REFERENCE TO RELATED APPLICATIONS

This application is a continuation-in-part of U.S. patent application Ser. No. 08/549,438, filed Oct. 27, 1995, U.S. Pat. No. 5,642,283, and is related to U.S. patent application Ser. No. 08/509,571, filed Jul 31, 1995, U.S. Pat. No. 5,646,842, both of which are assigned to the assignee of the present invention and which are incorporated herein by reference.

TECHNICAL FIELD

An automatic transmission for an automotive vehicle comprising separate planetary gear units and controls for effecting upshifting of one gear unit while downshifting the other gear unit in timed relationship.

BACKGROUND OF THE INVENTION

As in the case of the invention disclosed in the copending application identified above, our invention is adapted to be used in a transmission having gearing defined by a Simpson gearset and a simple planetary gearset, both gearsets being situated between the turbine of a torque converter and the torque output shaft. The Simpson gearset establishes three forward-driving torque ratios and the simple planetary gear unit, acting in cooperation with the Simpson gearset, establishes an additional ratio. A friction brake for the reaction element of the simple planetary gear unit is used to establish a torque reaction and an overrunning coupling establishes torque flow between two elements of the simple planetary gear unit.

A second overrunning coupling in the Simpson gearset establishes a non-synchronous ratio shift. Forward engagement is achieved by engaging a forward clutch during a shift from neutral to drive. A separate reverse engagement clutch is used to establish a torque flow path for reverse.

Ratio changes on upshifts as well as downshifts in the transmission gearing are controlled electronically to establish optimum shift quality.

SUMMARY OF THE INVENTION

The present transmission and the transmission disclosed in application Ser. No. 08/549,438 both have features that are common to the transmission disclosed in U.S Pat. No. 4,966,050, assigned to the assignee of the present invention, but they include an additional gear ratio. That ratio is greater than the third ratio of the four-speed gearing of the '050 patent, but it is less than the first ratio of the four-speed gearing. Ratio changes in our improved five-speed transmission are controlled by an electronic microprocessor, which develops signals in response to operating variables of the driveline of the vehicle to actuate and to release four shift solenoids. The shift solenoids, in turn, control shift valves.

A variable force solenoid in the transmission of application '438 controls a pressure modulator valve for shift calibration. The input signals for the microprocessor have corresponding signals in the four-speed transmission of the '050 patent, but for one embodiment of the present invention and for the transmission of the copending application, additional input signals are included. The principal additional signal is the overdrive brake drum speed (ODS). Another additional signal is output shaft speed (OSS).

On an upshift from the second ratio to the third ratio, the gearing elements function to relieve reaction torque on one gear component and to apply a reaction torque to a companion gear element. The 2-3 upshift involves a downshift of an auxiliary overdrive simple planetary gearset while the Simpson gearing is upshifted. Both of these shifts are synchronized without losing capacity of the affected elements during the shift interval. This shift control is referred to as a "swap-shift".

Following initiation of the inertia phase of the upshifting event, the gear ratio of the overall shifting event is monitored. When a predetermined portion of the upshifting event is completed, the downshifting of the overdrive set is enabled. The ratio changing characteristics of the simple planetary gear unit and the compound gearing of the Simpson gearset thus are controlled by the microprocessor so as to synchronize the swap-shift and to complete the shifting event before the end of the inertia phase of the upshifting Simpson gearing.

As in the case of a conventional automatic transmission, ratio changes occur in response to movement of solenoid actuated shift valves that selectively distribute actuating pressure to pressure operated brake servos and pressure operated clutches. The control system of application Ser. No. 08/549,438 is capable of using the solenoid for one of the shift valves to effect pressure control for a brake servo involved in an upshift as well as to effect selective coast clutch pressure distribution during a ratio change. This multiplexing of functions simplifies the control system, and makes possible a minimum number of valve elements.

A 3-2 shift in the transmission disclosed in application Ser. No. 08/549,438 includes a single variable force solenoid valve for developing a so-called CF pressure that is distributed through the shift valve elements to the apply side of both the brake servo for the overdrive gear unit and the brake servo for the Simpson gear unit. The shift valves, in turn, are triggered by shift solenoid actuators SS1, SS2 and SS3.

A fourth solenoid actuator, SS4, triggers the shift valve assembly to apply pressure to the release side of the overdrive brake servo. The pressure on the release side of the overdrive brake servo is PID-controlled during a swap-shift from a second ratio to the third ratio and during a swap-shift.

The improved control system of the present invention, in contrast to the control system of application Ser. No. 08/549,438, is capable of achieving smooth 2-3 upshifts using a closed loop control on the brake servos and also using a closed loop control of 3-2 downshifts and 4-2 downshifts. This eliminates harshness that may be characteristic of the control system of application Ser. No. 08/549,438, where the 2-3 upshift is achieved using a closed loop control on the brake servos. The 3-2 downshift and the 4-2 downshift are achieved using open loop control. This control of the brake servos in the control system of application Ser. No. 08/549, 438 is carried out using a single variable force solenoid valve for developing a common CF pressure for each of the brake servos. There is no effective way to independently control the brake servos of the control system of application Ser. No. 08/549,438.

In contrast to the control system of application Ser. No. 08/549,438, the control system of our present invention uses two independent variable force solenoids for developing separate CF pressures for brake servos. A first pressure, namely, CF1 pressure, is used to activate the brake servo for the Simpson gearset, and the separate and independent CF pressure (namely, CF2 pressure) is used to pressurize the apply side of the overdrive brake servo. It thus is possible to achieve a smooth 3-2 downshift with our improved control system by controlling the slip of the Simpson intermediate speed brake servo and by achieving a smooth engagement of the overrunning coupling for the Simpson gear unit, which is the second overrunning coupling referred to in the preceding discussion.

The capacity of the intermediate speed ratio brake in the Simpson gearset is controlled by controlling the value for CF1 pressure, which is achieved by controlling the capacity of the first of the two variable force solenoid valves. This is achieved while a separate variable force solenoid control establishes a value for CF2 pressure that is unique for the requirements of the brake servo pressure apply chamber of the overdrive gear unit.

In the case of a downshift from the fourth ratio to the second ratio, closed loop control of torque input clutch for the sun gear of the Simpson gearset must be used in conjunction with the reaction brake for the sun gear of the overdrive gearset. This is accomplished by using a third variable force solenoid. This feature is in contrast to a corresponding 4-2 downshift using the control system disclosed in U.S. application Ser. No. 08/549,438, where the control system uses only a single variable force solenoid which requires an open loop control of a 3-2 downshift and a 4-2 downshift. In this way, harshness in the swap-shift for the transmission disclosed in application Ser. No. 08/549,438 is avoided. The improvement is due to the ability of the transmission to be separately calibrated for optimum shift smoothness for 3-2 shifts and 4-2 shifts. The calibration of one shift need not be compromised because of differing timing requirements of the reaction brakes involved in these shifts and the separate requirements on a 4-2 shift for the torque delivery clutch for the sun gears of the Simpson gearset.

The 3-2 and 4-2 downshifts of the control system unlike the open loop control of the control system of application Ser. No. 08/549,438, is accomplished in a closed loop fashion having a high clutch drum speed sensor input.

BRIEF DESCRIPTION OF THE DRAWINGS

FIGS. 13a and 13b show a timing diagram for the transmission elements involved in a 3-2/4-2 downshift;

FIGS. 14a and 14b show a timing diagram for the transmission elements involved in a 2-3 upshift;

FIGS. 22a-a and 22a-b show the control valve system including the elements involved in second gear ratio operation;

FIGS. 22b-a and 22b-b show the control valve system including the elements involved in an intermediate step 3 on a 2-3 upshift;

FIGS. 22c-a and 22c-b show the control valve system including the elements involved in third gear ratio operation;

FIGS. 22d-a and 22d-b show the control valve system including the elements involved in fourth gear ratio operation;

FIGS. 22e-a and 22e-b show the control valve system including the elements involved in a 4-2 downshift;

FIGS. 24a, 24b and 24c are schematic representations of the torque flow paths for the base transmission when the transmission is conditioned for first gear operation, second gear operation, and third gear operation, respectively;

FIG. 24d is a clutch and brake engagement and release pattern for the base transmission as speed ratio upshifts and downshifts occur;

PARTICULAR DESCRIPTION OF THE BASE TRANSMISSION

Figure 1:
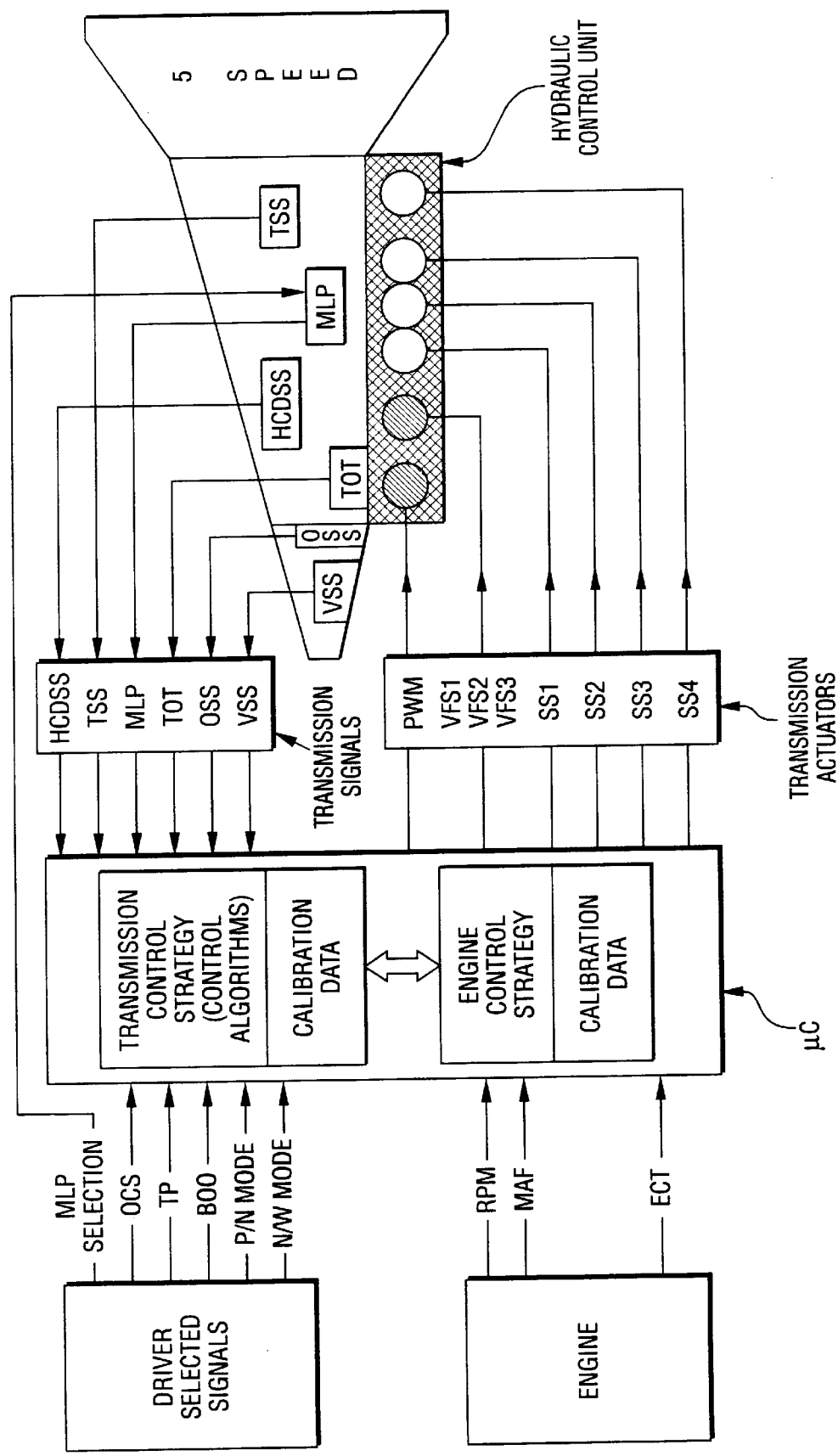
FIG. 1 is a schematic representation of the transmission control system including a microprocessor transmission actuator and the hydraulic control unit.

The portions of the control valve system and strategy dealing with 2-3 shifts, 3-2 shifts and 4-2 shifts in the transmission disclosed in copending patent application Ser. No. 08/549,438 are presented in this specification in order to emphasize the distinction between those functions in the transmission of application Ser. No. 549,438 and the corresponding improved function in the transmission of the present invention. That presentation will be followed by a description of the improvements of the present invention.

The transmission disclosed in application Ser. No. 549,438 (the base swap-shift transmission, hereafter called the base transmission) has features that are common to the four-speed transmission of U.S. patent application Ser. No. 08/323,464. Unlike the gearing of the four-speed transmission, however, the gearing of the base transmission and the transmission of the present invention effects an upshift to the next higher ratio by downshifting the simple planetary gear unit located between the converter and the Simpson gearset. This produces an underdrive ratio that has no counterpart in the four-speed transmission.

The gear ratio of the simple planetary gear unit times the gear ratio of the Simpson gearset, in a preferred embodiment in the transmission of the base transmission, is 1.855 (i.e., 2.474×0.75).

The following chart shows the ratio spread for the base transmission and the transmission of the present invention as well as the ratio spread for a four-speed transmission, each having a common simple planetary gear unit:

| FIVE-SPEED TRANSMISSION | | FOUR-SPEED TRANSMISSION | |
|---|---|---|---|
| GEAR | GEAR RATIO | GEAR | GEAR RATIO |
| 1ST | 2.474 | 1ST | 2.474 |
| 2ND | 1.855 | — | — |
| 3RD | 1.474 | 2ND | 1.474 |
| 4TH | 1.0 | 3RD | 1.0 |
| 5TH | 0.75 | 4TH | 0.75 |

The additional ratio of 1.855 does not exist in the four-speed transmission. The third, fourth, and fifth gear in the base transmission are equivalent, respectively, to the second, third, and fourth gears in the four-speed transmission. The additional ratio of 1.855 is obtained by engaging the overdrive planetary gearset while the Simpson gearing is in first gear.

The gear change from second gear to third gear in the five-speed transmission involves downshifting the overdrive planetary gearset and upshifting the Simpson set. This requires synchronizing the release of the sun gear reaction brake for the simple planetary gear unit with the application of the sun gear reaction brake for the Simpson gearset during the upshifting event. This is called a SWAP-SHIFT. Similarly, the 3-2 downshift and the 4-2 downshift involve downshifting of the Simpson gearset and the upshifting of the simple planetary gear unit. These downshift events also are synchronized.

The remaining gear changes for the four-speed transmission and the base transmission, as well as the transmission of the present invention, are similar, one with respect to the other. The swapshift control therefore will be described in detail whereas the other ratio shifts will be described only generally. Reference may be made to copending application Ser. No. 08/323,464, filed Oct. 14, 1995, identified above, for a particular description of these other ratio shifts. The '464 application is assigned to the assignee of the present invention.

Control System

The electronic control system for the base transmission is a hybrid system in which solenoids, actuated by an enhanced microprocessor controller, control both gear selection and system pressure buildup, the latter being disclosed in the copending '464 application identified above. The different friction elements (bands and clutches) are applied and released by hydraulic pressure determined by a hydraulic control unit (main control assembly). This hydraulic control unit contains four shift solenoids, shift valves, one variable force solenoid and pressure modulator valves for shift execution. The transmission control strategy determines the conditions under which the transmission is operated based on various signal inputs generated by the driver, by the engine and by the transmission itself.

Figure 23:
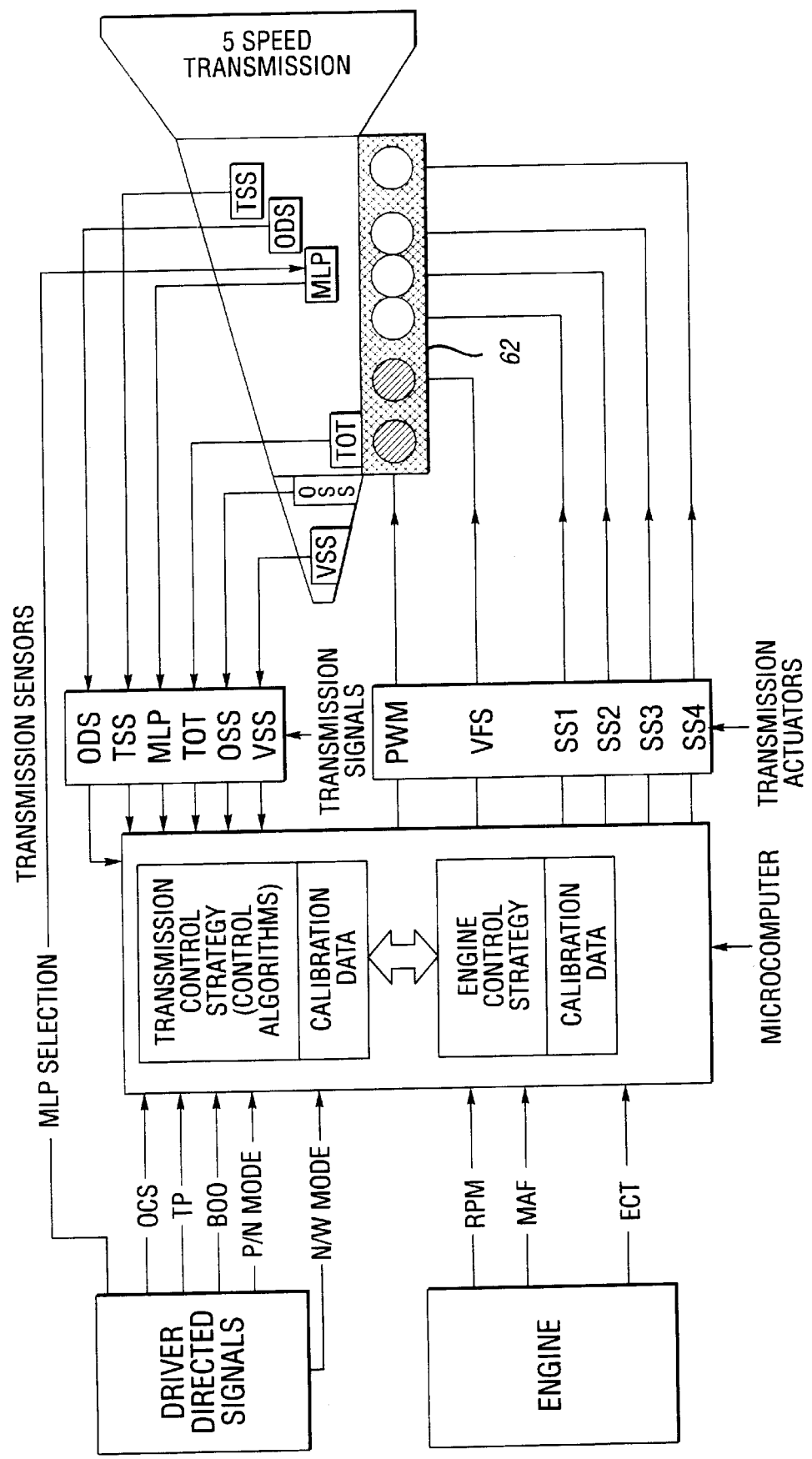
FIG. 23 is a schematic representation of the transmission control system for the base transmission including a microprocessor transmission actuator and the hydraulic control unit.

FIG. 23 shows a signal flow overview for the base transmission. The shift solenoid and shift valve configuration is generally similar to the four-speed transmission of the copending '464 application. As far as the signals are concerned, two additional signals have been added, which are the overdrive drum speed (ODS) and the output shaft speed (OSS).

The following signals are used by the transmission control strategy of the base transmission to execute the 2-3 shift, the 3-2 shift and the 4-2 shift. The signals are generated from the following inputs:

A) Driver:
 OCS, TP
B) Transmission:
 VSS, TSS, MLP, TOT, ODS, OSS
C) Engine:
 N, MAF The control algorithms of the base transmission strategy determine in which manner the 2-3 upshift and the 3-2/4-2 downshift are executed based on the input signals and calibration data. The transmission operation during swap-shift execution is broken down into the following two major events:

1) shifting event, and
2) clutch capacity determination.

The following actuators are responsible for execution of these operating events:
 3 ON/OFF solenoids for shifts (SS1–SS3)
 1 VFS for clutch capacity
 SS4 for overdrive band capacity control, which may be a duty-cycled ON/OFF solenoid.

The transmission actuators of the base transmission convert the electrical signals generated from the control algorithm into either a hydraulic signal pressure or pressures directly applied to clutches or brake bands. Shift valves and modulator valves are actuated by these signal pressures. It is the purpose of these shift valves to release or to apply hydraulic pressure for the torque transmitting elements (clutches and bands). The pressure modulator valves adjust the amount of frictional capacity applied on the friction elements.

Transmission Torque Flow (General)

The torque flow pattern for the base transmission and the transmission of the present invention is generally similar to that of the previously mentioned four-speed transmission except that the overdrive planetary gearset is engaged in first gear to generate the 1.855 gear ratio. FIGS. 24a–24c show the torque flow only in the first three gears; which are first, second, and third gears. The fourth gear is the same as third gear in the four speed transmission and the fifth gear is the same as fourth gear in the four speed transmission.

Torque Flow—First Gear In DRIVE

Engine torque is delivered, as seen in FIGS. 24a–24c, to the impeller housing; i.e., the torque converter impeller 10. The converter impeller is a centrifugal pump that accelerates fluid inside of the torque converter toward the turbine blades 12. The accelerated oil is then decelerated over the turbine blades, and the remaining oil is redirected over the reactor 14 back into the impeller, which achieves a torque multiplication effect. From the input shaft, the torque is transmitted to OWC1, which holds the reactor or stator against rotation in the rotational direction of the engine and overruns in the opposite direction.

The engaged clutch CL3, shown at 18, carries the torque from the center shaft to the input element of the Simpson planetary gear arrangement 22 (see FIG. 24a). The torque is distributed to the ring gear and is then split into two components. One torque component is delivered over the planetary carrier 24 to the output shaft, which turns in the same rotational direction as the ring gear 26. The sun gear 28 carries the remaining component of the torque in reverse motion to the rear sun gear 30 of the Simpson planetary gearset.

The planetary carrier 32 of the rear planetary gearset is held by OWC2, shown at 34. The torque delivered by the sun gear 30 is then transmitted over the planetaries to the ring gear 36, which reduces the velocity and multiplies the torque to the output shaft 38. This arrangement provides a 2.474 gear ratio.

In coast mode, OWC1 and OWC2 overrun and freewheeling is in effect. The converter clutch 40 stays open until no torque multiplication occurs. It can be locked afterward.

Torque Flow—Second Gear In DRIVE

Second gear is generated by the engagement of brake 42 (B1), which is the overdrive band. CL2, B2, and B3, shown at 44, 46 and 48, respectively, are still disengaged. B1 (see FIG. 24b) carries 0.25*engine torque as a reaction torque. The sun gear of the overdrive planetary gearset is decelerated to zero speed and generates an overall gear ratio of 1.855, which consists of the first gear ratio 2.474 times the overdrive gear ratio, which is 0.75. The engagement of CL1, shown at 50, is hydraulically inhibited when B1 is applied. With the engagement of B1, the reaction torque on OWC1 is reduced until the one-way clutch overruns. The converter clutch can be locked or unlocked in second gear depending on the driving condition.

Torque Flow—Third Gear In DRIVE

The torque flow is the same as in second gear, except that B2 is applied and B1 is released. With the engagement of B2, the sun gear speed of the rear Simpson set 22 is reduced to zero. Here, the brake band (B2) serves as a reaction element for the front gear unit of the Simpson planetary gearset. An output torque multiplication of 1.474 occurs by holding 0.474*engine torque as a reaction torque. The output of the rear Simpson planetary gearset is zero since the sun gear has zero speed. The converter clutch can be locked or unlocked in third gear depending on the driving condition.

The gear change from second to third is illustrated in FIG. 24c. The gear ratio change is accomplished by releasing B1 and applying B2 at the same time. This disengages planetary gearset P1 and engages planetary gearset P2. During a downshift, the engaging sequence is reversed.

Synchronous Shift Control Of 2-3 Upshift (SWAP-SHIFT) And A 3-2/4-2 Downshift (SWAP-SHIFT)

The base transmission has the following additional types of synchronous shifts:

| SHIFTS | SYNCHRONOUS |
|---|---|
| 2–3 | Reaction-to-Reaction (B1/OWC1 to B2/OWC2) |
| 3–2 | Reaction-to-Reaction (B2/OWC2 TO B1/OWC1) |
| 4–2 | Drive-to-Reaction (CL2 to B1/OWC1) |

This section describes the shift dynamics of synchronous 2-3 upshifts and 3-2/4-2 downshifts. Pressure control and the resulting torque disturbance of the electronic control system is described in general to accomplish the SWAP-SHIFT. How the electronic control system executes the upshifts and downshifts is described subsequently.

Synchronous Upshift Control, 2-3 Upshift (SWAP-SHIFT)

Figure 25:
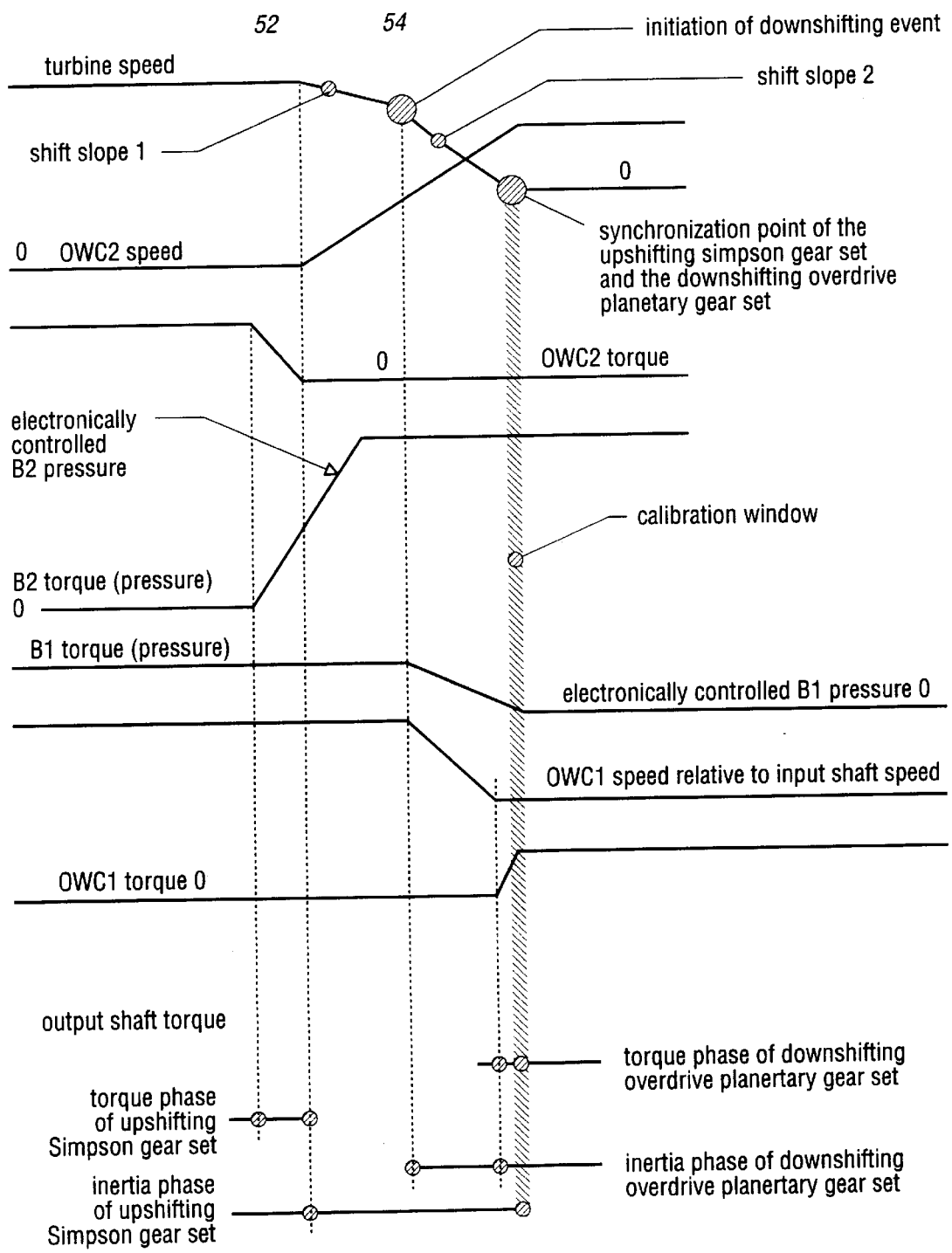
FIG. 25 is a timing chart showing the turbine speed, the pressures in the brake servos, the overrunning coupling speeds, and the output shaft torque during a 2-3 upshift of the base transmission.

The synchronous 2-3 upshift is a reaction-to-reaction shift. Reaction-to-reaction means, in this case, a change from one reaction element to another reaction element. As mentioned earlier, the 2-3 upshift of the base transmission is a gear ratio change where two independent, in-series, compounded planetary gearsets are upshifted and downshifted, respectively. In this case, the overdrive planetary gearset (P1) is downshifted and the Simpson planetary gearset 22 is upshifted. The ultimate goal is to synchronize both shifting events without losing capacity of one of the affected elements at the finishing point of the upshifted Simpson gearset (see FIG. 25).

The shift is initiated by engaging B2 and increasing B2 capacity. This reduces the OWC2 torque down to zero level. The output shaft torque follows the OWC2 torque up to the point where B2 torque is equal to the reaction torque of OWC2. At this point, the output shaft torque follows the B2 pressure characteristic and OWC2 starts to rotate, as shown at 52 in FIG. 25. The inertia phase of the upshifting event is initiated and "shift slope 1" is generated. When a certain fraction of the upshifting event has been reached, the downshifting event of the overdrive planetary gearset is enabled. This is accomplished by reducing B1 capacity. The output shaft torque characteristic follows the B1 pressure characteristic, and the OWC2 speed relative to input shaft speed is reduced. A second shift slope, called "shift slope 2", is started at 54 (see FIG. 25). When the inertia phase of the downshifting event is completed, OWC2 carries torque. The torque phase of the downshifting overdrive planetary gearset is then complete.

The electronic control system has to satisfy the following requirements in order to accomplish satisfactory 2-3 upshift quality:

B1 capacity has to be controlled electronically,

B2 capacity has to be controlled electronically,

B1 and B2 have to be controlled independently,

The electronically controlled B1 and B2 characteristics have to be able to control capacity with regard to OWC1 and OWC2 engagement quality, Turbine speed has to be monitored, OWC1 acceleration and deceleration has to be monitored by sensing CL1 speed, which is overdrive drum speed, and Electronic control of upshift and downshift execution.

Each one of the above-mentioned items affects the upshift quality. The synchronization of both shifting events has to be completed at the completion, or just before the completion, of the inertia phase of the upshifting Simpson set 22. The engagement of OWC2 has to be controlled by accumulating the B1 capacity. This requires electronic control of band capacity and electronic control of upshift and downshift execution as well as monitoring the upshifting and downshifting events. The synchronization has to take place within a defined calibration window (see FIG. 25) in order to prevent a gear ratio change into the next higher gear. This can occur when the downshifting takes place too late. Similarly, if the downshifting event takes place too early, capacity loss takes place since the transmission shifts back into first gear. A conventional, hydraulically-controlled transmission is not capable of executing these two upshifting events.

Synchronous Downshift Control, 3-2/4-2 Downshift (SWAP-SHIFT)

The synchronous 3-2/4-2 downshift is reaction-to-reaction (3-2) and a drive-to-reaction (4-2) shift. Drive-to-reaction means that a rotating clutch is shifted to a reaction element, which is B1. This is the inverse of the 2-3 upshift in which the overdrive planetary gearset is downshifted as the Simpson gearset is upshifted. On a downshift, the overdrive planetary gearset is upshifted, whereas the Simpson gearset 22 is downshifted. In the case of a 3-2 downshift, B2 is released; and in the case of a 4-2 downshift, CL2 is released. Here, the upshifting event of the overdrive planetary gearset must take place first; and when B1 carries full capacity, the downshifting of the Simpson set can be initiated.

Figure 26:
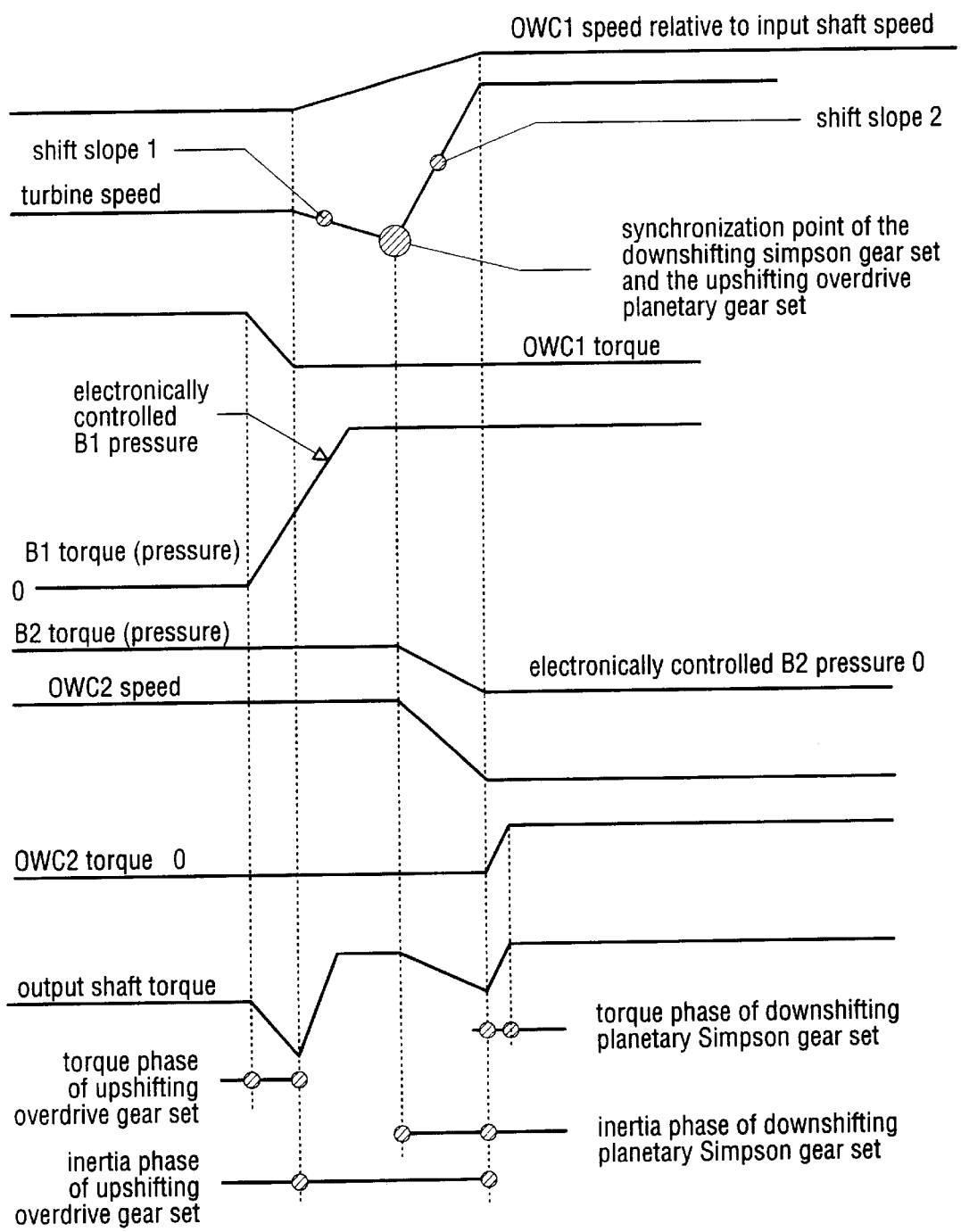
FIG. 26 is a timing chart, similar to that of FIG. 3, showing a 3-2 downshift event.

The graph of FIG. 26 illustrates this shifting process. B1 pressure is increased, which reduces OWC1 torque to zero. The inertia phase of the upshifting overdrive planetary gearset is initiated when OWC1 torque is zero, generating "shift slope 1". The transmission shifts first to the next possible higher gear. The synchronization point is determined by the amount of the overdrive upshift progression. When the synchronization point has been reached, the downshifting event of the Simpson planetary gearset is initiated. B2 pressure is released and OWC2 speed is reduced by input shaft torque and the "shift slope 2" is started. Here again, the B2 pressure characteristic must be capable of accumulating torque to ensure a smooth OWC2 engagement. The downshift is complete when OWC2 transmits full torque.

The electronic control system must satisfy the same requirements as those identified above. B1 and B2 have to be electronically controlled; and they require independent control systems. Both B1 and B2 pressure characteristics should be able to accumulate for smooth one-way clutch engagements. The synchronization point has to be detected by monitoring turbine speed and overdrive drum speed, which basically represents the OWC1 speed relative to input shaft speed.

The electronic control system of the five-speed transmission of the invention is capable of controlling the above described shifts. The complete control system and its functional requirements, explained above, are described subsequently.

Electronic—Mechanical Interface

FIG. 24d shows the functional matrix of the five-speed transmission. This functional matrix represents the active solenoid stages dedicated to the gears and the manual lever positions.

Manual Lever Position: DRIVE

In addition to the four-speed solenoid stages, two solenoid stages have been added to achieve the five-speed ratios. These are second gear solenoid stage and intermediate step 3 (IS3). This intermediate step 3 is used to initiate the 2-3 upshift and the 3-2 downshift. The solenoid stages for first, third, 1S1, 1S2, fourth and fifth gears are the same as those stages found in the previously described four-speed transmission except that third, fourth, and fifth gear are equivalent to second, third, and fourth gear for the four-speed transmission.

Figure 27:
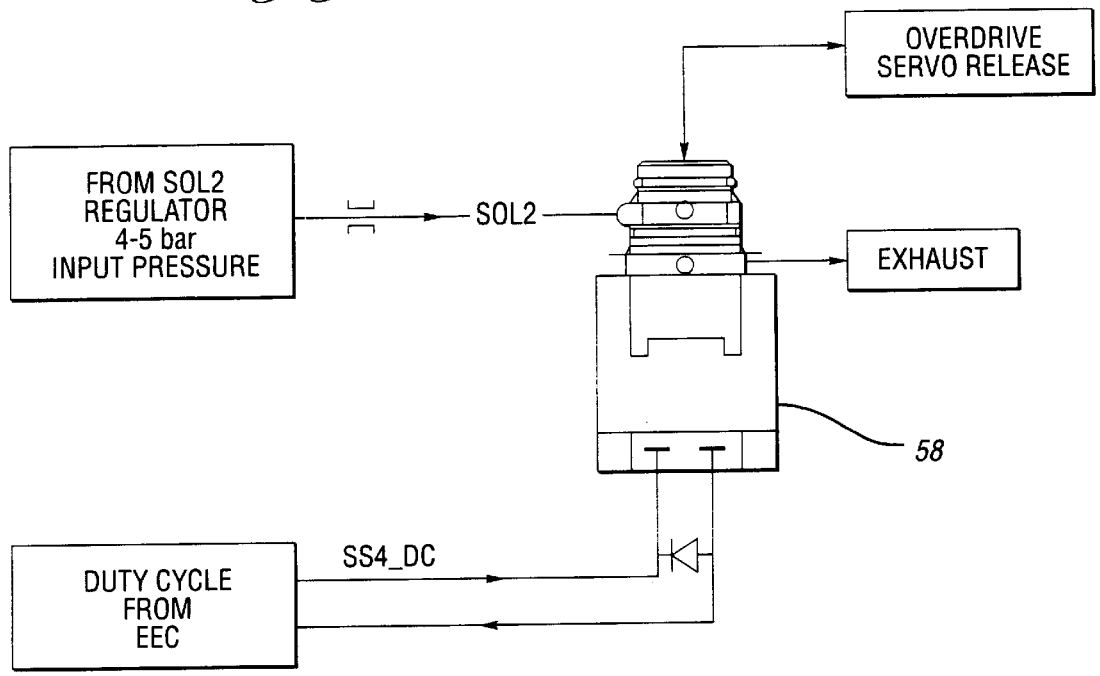
FIG. 27 is a schematic representation of a shift solenoid that controls the application and release of the overdrive servo.
Figure 28:
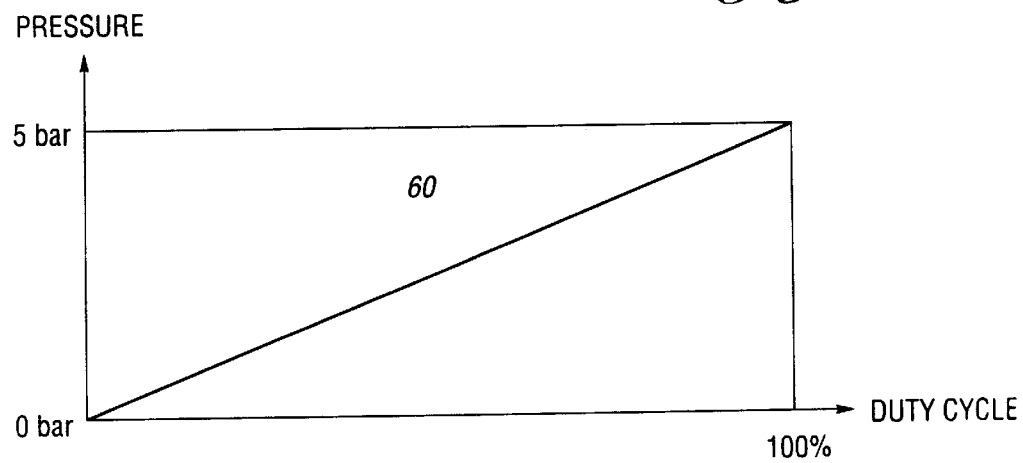
FIG. 28 is a plot of the transfer function for the shift solenoid illustrated in FIG. 6 wherein solenoid pressure is plotted against duty cycle.

The control system of the base transmission contains three shift solenoids SS1, SS2, and SS3 for shift execution. SS2 and SS3 are seen in FIGS. 31–36. In the five-speed base transmission, eight solenoid stages are required to realize first, second, 1S3, third, 1S2, 1S1, fourth, and fifth gear. Shift solenoid SS4, seen at 58 in FIGS. 27 and 28, is used for the overdrive cancel function and for overdrive band capacity control. This will be explained subsequently.

The electronic-mechanical interface for the base transmission (seen in FIG. 23) contains also the hydraulic control system which transforms the solenoid stages into shifting action. This part of the description is concerned principally with second gear stage, intermediate step 3 and third gear stage.

Manual Lever Position: MAN1/MAN2

The solenoid stages in these positions are common to those of the four-speed transmission. The only difference is that third gear in the five-speed transmission of the invention is equivalent to second gear in the four-speed transmission.

Manual Lever Position: PARK; REVERSE; NEUTRAL

Figure 12:
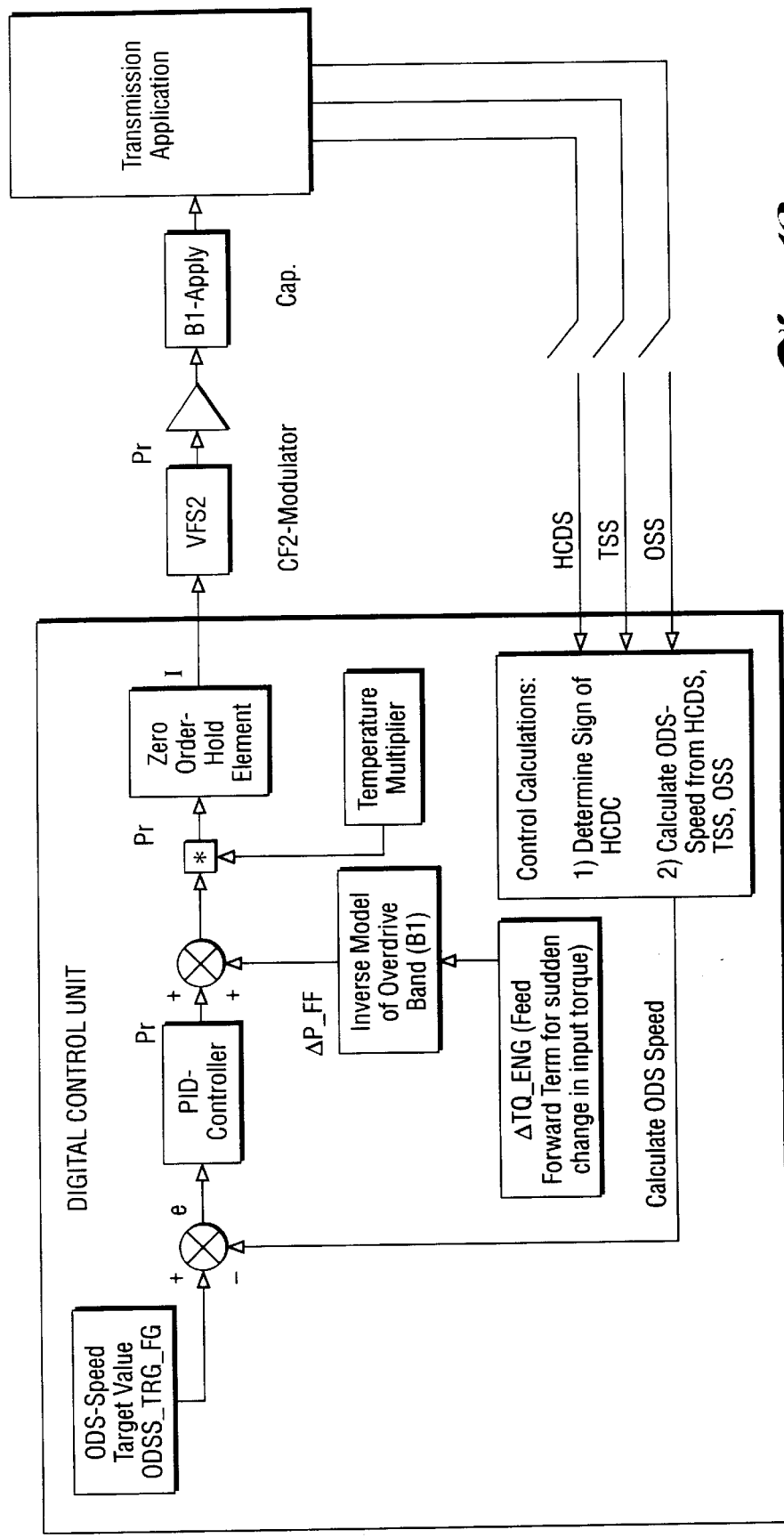
FIG. 12 is a system diagram for the downshifting overdrive gearset during a 2-3 upshift.

The solenoid stage in these positions is the first gear stage, which is equivalent to that of the four-speed transmission (see FIG. 12d).

Sensors And Actuators

The sensors and actuators for the base transmission are the same as those of the four-speed transmission. There are two additional transmission sensors added, which are the overdrive drum speed sensor (ODS) and the output shaft speed sensor (OSS). With the output shaft speed and overdrive drum speed signals, along with the turbine speed signal (TS), all velocities and ratios for the overdrive planetary gearset, as well as the Simpson planetary gearset, are determined.

Overdrive Drum Speed Sensor (ODS)

Overdrive drum speed sensor 56 (ODS) of the base transmission senses the speed of the overdrive drum (CL1). It is a variable reluctance sensor. The overdrive drum contains 24 teeth in order to trigger the overdrive drum speed signal. The overdrive drum is connected to the sun gear of the overdrive planetary gearset, and the overdrive drum speed sensor (ODS) monitors the sun gear speed. The sensor has the following characteristic data:

minimum detectable signal: 150 RPM with ±340 mV amplitude, maximum signal allowed: 7000 RPM ±90 V amplitude, For noise immunity, the sensor 56 needs a separate signal wire to the EEC module.

The ODS sensor monitors the sun gear speed of the overdrive planetary gearset to effect control of the overdrive band capacity during a 2-3 upshift as well as the 3-2/4-2 downshifts. It will also be used for 5-4 downshifts and 4-5 upshifts.

Output Shaft Speed Sensor (OSS)

The output shaft speed sensor 97 (OSS) of the base transmission as well as the transmission of the present invention, which senses the speed of the output shaft, is a variable reluctance sensor. An output shaft trigger wheel contains 8 teeth in order to trigger the output shaft signal.

The sensor OSS has the following characteristic data:

minimum detectable signal: 150 RPM with ±340 mV amplitude, maximum signal allowed: 7000 RPM with ±90 V amplitude;

for noise immunity, the sensor 56 needs a separate signal wire to the EEC module.

Figure 31:
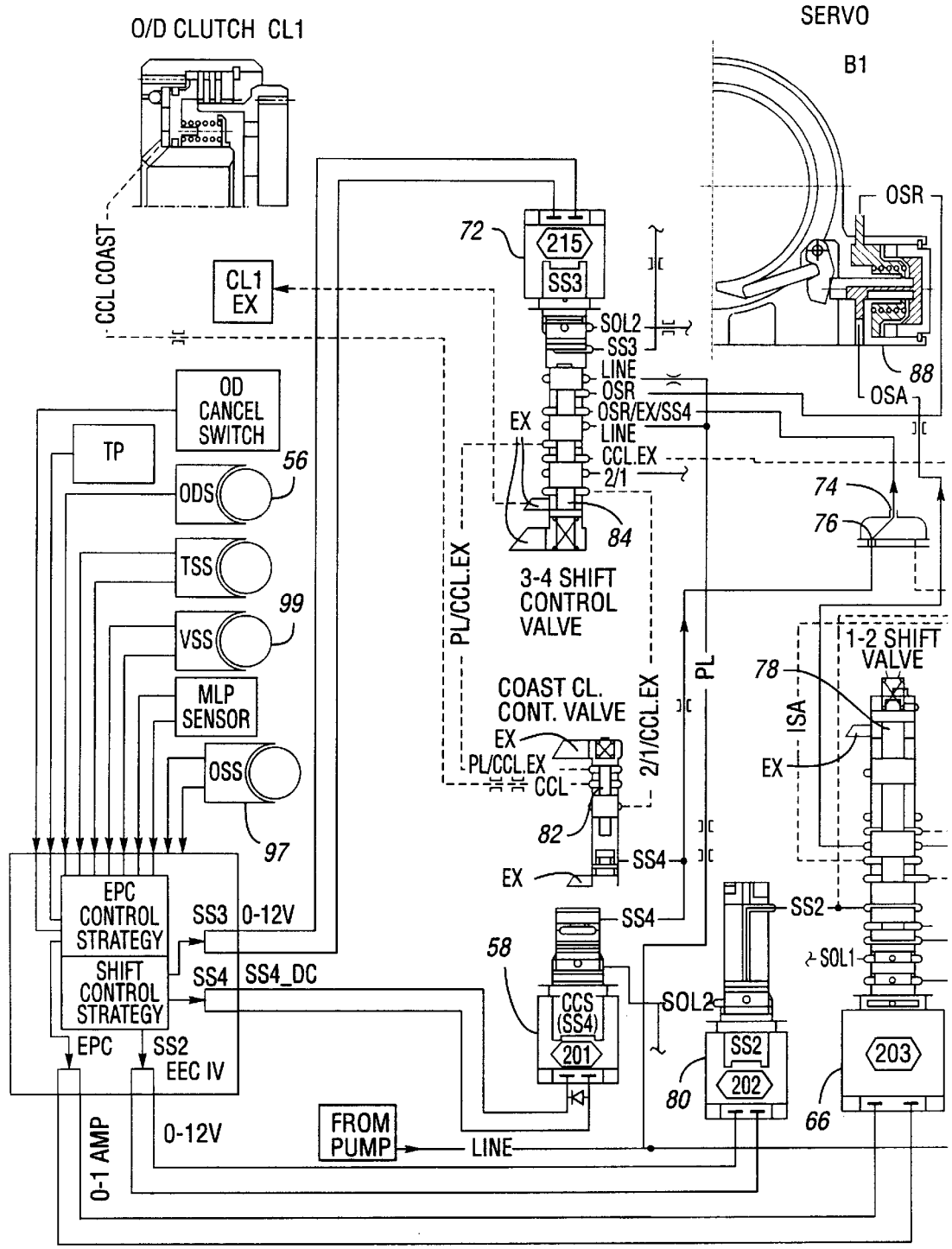
FIGS. 31 and 32 show a portion of the control valve circuit for the five-speed transmission of FIGS. 2a, 2b and 2c illustrating the states of the valve elements of the system in second gear.

The output shaft speed sensor 97 in FIG. 31 is used to generate a more accurate signal compared to the vehicle speed sensor, shown at 99 in FIG. 31. The output shaft speed signal is required to determine a reliable value for the transmission ratio variable (RT_TRANS).

Shift Solenoid SS4

Figure 6:
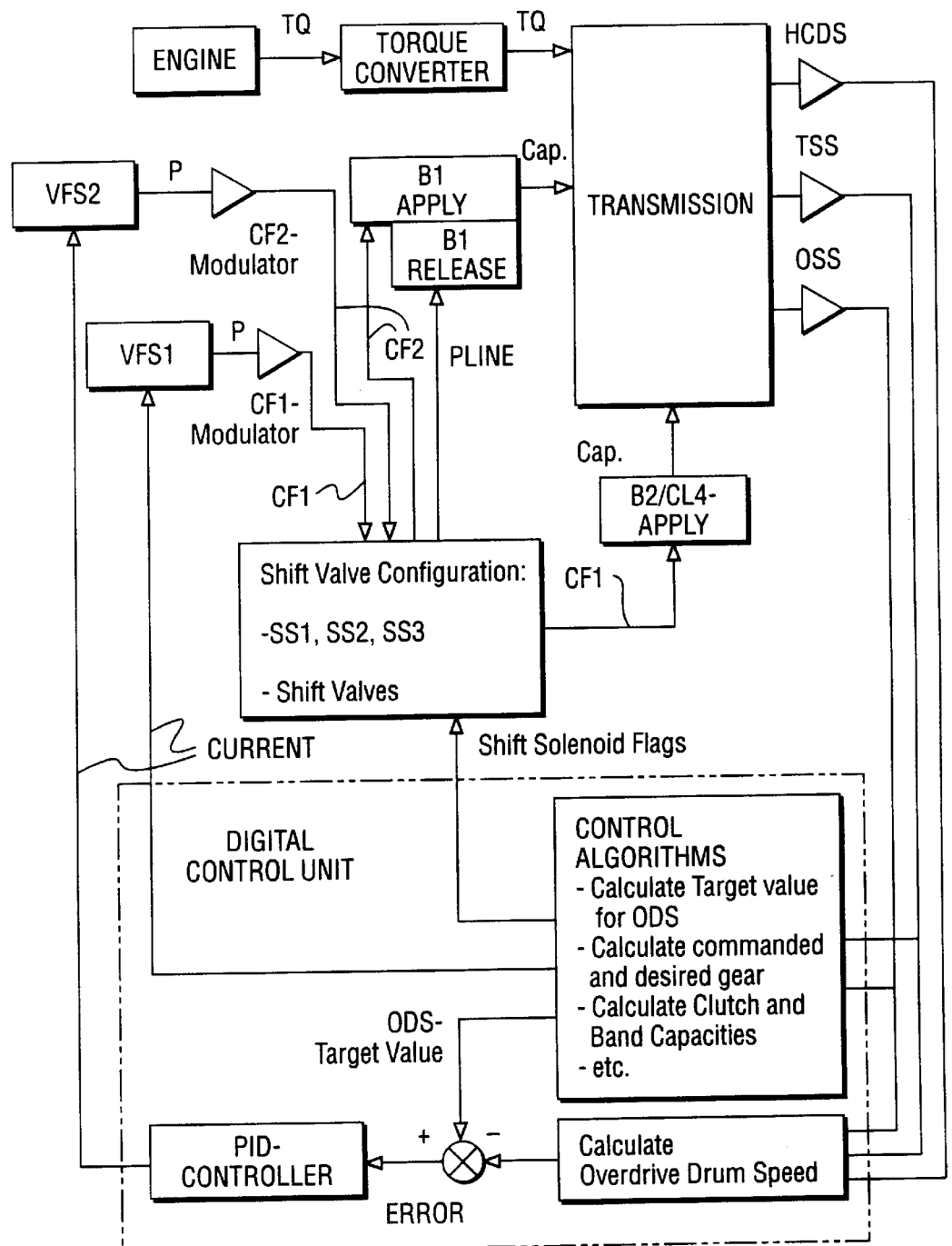
FIG. 6 is a system diagram for the 2-3 upshift control system of the invention.

The shift solenoids are used to transform an electrical signal of zero to 12 V into an output pressure of zero to 5 bar. With the four-speed transmission, the shift solenoid 58 (SS4), seen in FIG. 6, is used to control the coast clutch when the overdrive cancel function is executed. With the five-speed transmission, shift solenoid 58 (SS4) is used in addition to the overdrive cancel function as a capacity control actuator for the overdrive band capacity adjustment (see FIG. 27). The shift solenoid is applied with a duty cycled electrical input signal similar to the PWM solenoid for the converter clutch. The input pressure is SOL2 pressure, which varies between 4-5 bar.

This input pressure is modulated by the duty cycle input into a transfer function as shown in the graph of FIG. 28. The transfer function may be represented as a straight line 60. The output pressure is applied to the overdrive servo release side, thus controlling the overdrive band B1 capacity. SS4 now acts as an ON/OFF device as well as a pressure regulator system.

Control Strategy Overview (Software)

The basic control strategy for the base transmission in some respects is common to that of the four-speed transmission. The base five-speed transmission strategy is explained in detail subsequently.

Important Transmission Calculations

Two important transmission calculations, which are common to the four-speed transmission, are listed below:

PCSFTCMPT=percentage shift complete This calculates the percentage of the gear ratio depending on the old gear and the command gear.

PCSFTCMPT=(RT_TRANS−GRRAT[GR_OLD])/(GRRAT[GR_CM]GRRAT[GR_OLD])

RT_TRANS=current calculated gear ratio
GRRAT=gear ratio in each gear
GR_CM=commanded gear
GR_OLD=old gear
RT_TRANS=instantaneous calculated gear ratio

RT_TRANS=NT/NO

NT=turbine speed
NO=output shaft speed

Additional calculations are added which are specific to the 2-3 upshift execution of the base transmission. These are:

RT_SFT_END=The transmission ratio where the shift solenoid stages are controlled.

This calculation is used to determine, based on calibration data, the transmission gear ratio threshold when the solenoid stages should be changed from the intermediate step 3 (IS3) to third gear.

RT_SFT_END=GRRAT2+[FNPCSFT23(TP_REL)* (GRRAT3−GRRAT2)]

where
GRRAT2=gear ratio in 2nd gear
GRRAT3=gear ratio in 3rd gear
FNPCSFT23(TP_REL)=function TP_REL versus PCSFTCMPT to determine the percentage shift complete value when the solenoid stages change
TP_REL=relative throttle position
RT_23_TRIG=ratio threshold when capacity control by shift solenoid 58 (SS4) takes place

RT_23_TRG=GRRAT2+[FN23CMPF(NOBART)* (GRRAT3−GRRAT2)], where
FN23CMPF=function NOBART versus PCSFTCMPT to determine the percentage shift complete value when capacity control on the overdrive band should take place
NOBART=output shaft speed
ODS_TRG=target overdrive drum speed

ODS_TRG=NOBART*GRRAT3*FNODS_CMPT(NOBART)

This calculates the overdrive drum speed target based on the output shaft speed NOBART and a function NOBART versus a multiplier FNODS_CMPT(NOBART)=function NOBART versus a multiplier to determine the target overdrive drum speed ODSS_TRG_FG=target overdrive drum speed dependent on the gear ratio This calculates the target overdrive drum speed as a function depending on actual gear ratio RT_TRANS. The target overdrive drum speed ODSS_TRG is increased and synchronized with the execution of the shift.

ODSS_TRG_FG=ODSS_TRG* [(GRRAT2−RT_TRANS_RT_CORR)/−(GRRAT2−GRRAT3)]

RT_CORR is a calibratable value used to control the starting point of the ODS_TRG_FG signal in shift interval to enhance upshift and downshift control.

Functional Description Of The Five-Speed Base Transmission Control System

The hydraulic control system for the base transmission, as well as the control strategy for the dedicated functions of the transmission, now will be described. The hydraulic control system is basically the same as that of the four-speed system, except shift solenoid 58 is controlled differently and the overdrive drum speed sensor 56 is used for feedback control. The functional description includes only the 2-3 upshift control and the 3-2/4-2 downshift control since everything else is common to the four-speed transmission. The hydraulic control system for accomplishing a 2-3 upshift, as well as a 3-2/4-2 downshift, consists of the following hardware components:

valve body and connecting labyrinth 62 (see FIG. 1),
    3 ON/OFF solenoids,
    SS4 shift solenoid 58,
    1 main regulator valve 68 (includes a booster valve),
    2 modulator valves,
    5 shift valves,
    1 variable force solenoid 66,
    1 separator plate with connecting holes, and
    springs and sleeves.

All these components are used by the hydraulic control system to execute a 2-3 upshift or 3-2/4-2 downshift.

Pressure Buildup System

The pressure buildup system is common to the four-speed transmission, as mentioned above. The detailed description of the four-speed version of the '464 application is incorporated by reference in this disclosure.

Pressure Systems Used For 2-3/3-2/4-2 Shift Control

The hydraulic control system consists of three different pressure systems:

The electronic pressure control systems (EPC/EPCB);
        Electronic pressure control with VFS
        EPCB boost pressure system
        SS4 pressure system (PWM-pressure)
    Pressures generated by the manual valve;
    The system pressures (PL, CC, SOL1, SOL2);
        Main regulator valve system (PL)
        SOL1, SOL2 regulator valve system
        Clutch pressure modulator forward (CF).

2-3 Upshift System (SWAP-SHIFT)

Hydraulic Control System

The hydraulic control system for controlling execution of a 2-3 upshift is shown in FIGS. 31–36.

Figure 32:
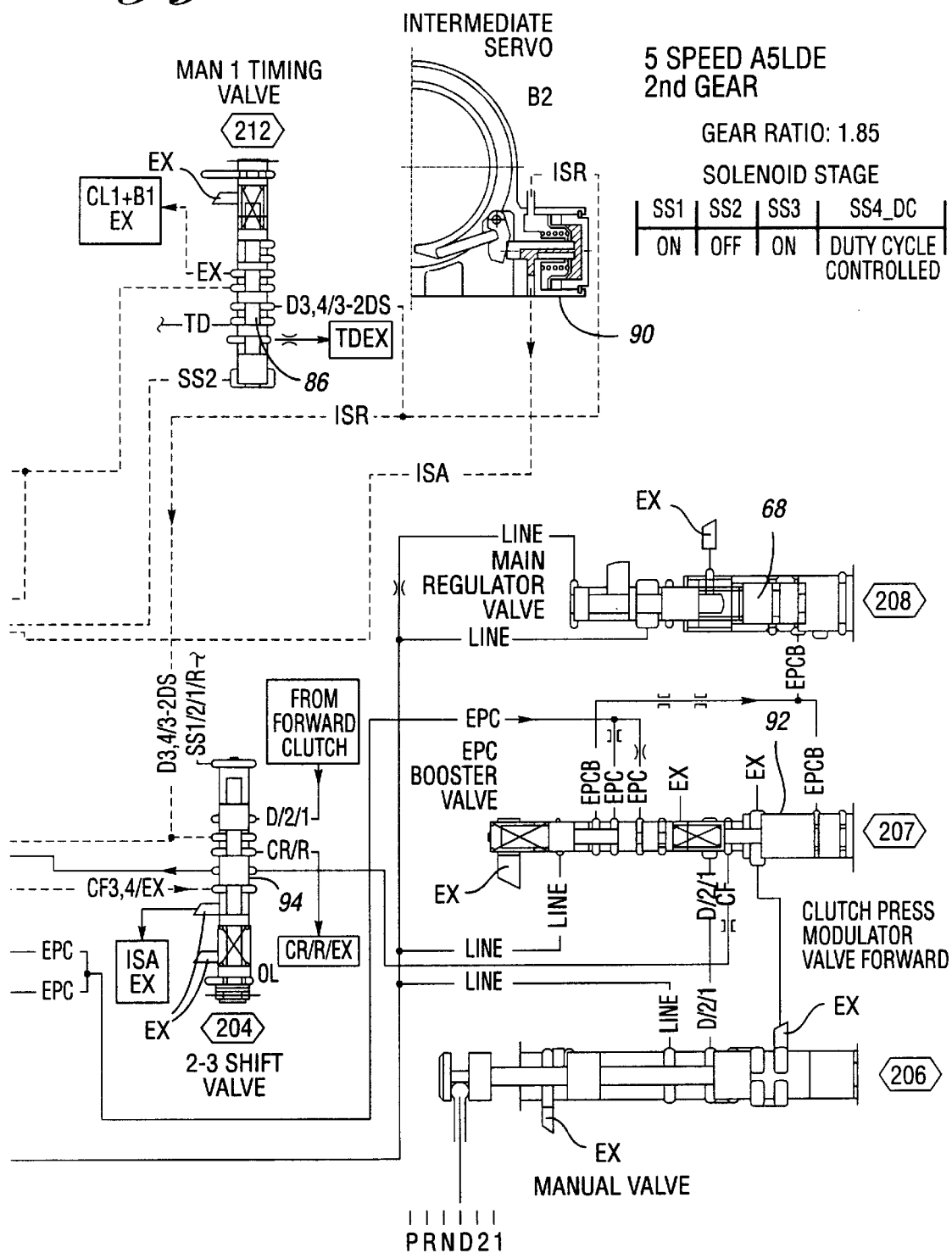
Figure 33:
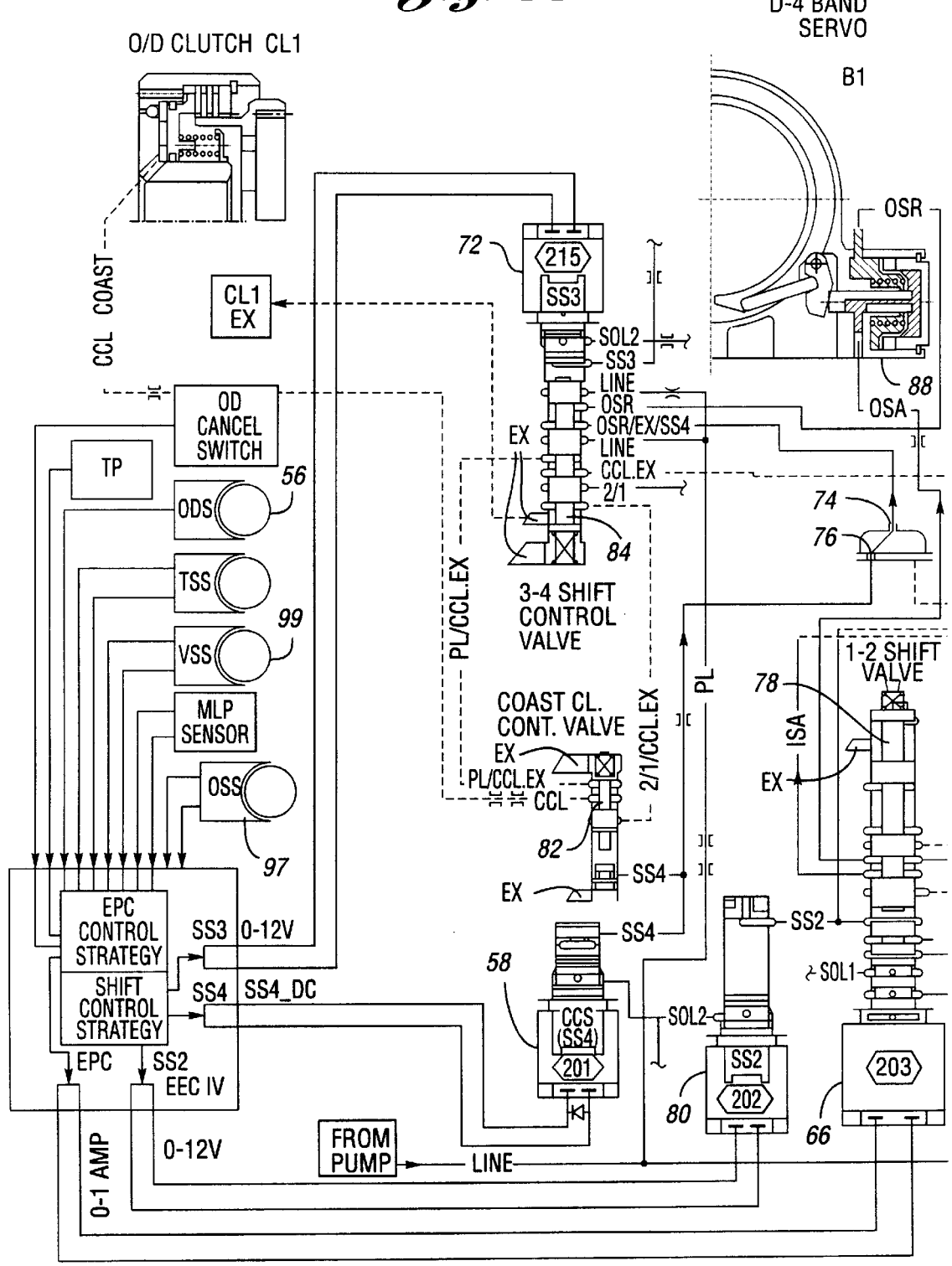
FIGS. 33 and 34 show a schematic illustration of a portion of the control valve system for the base transmission including the valve elements that effect a 2-3 upshift (intermediate step 3)
Figure 34:
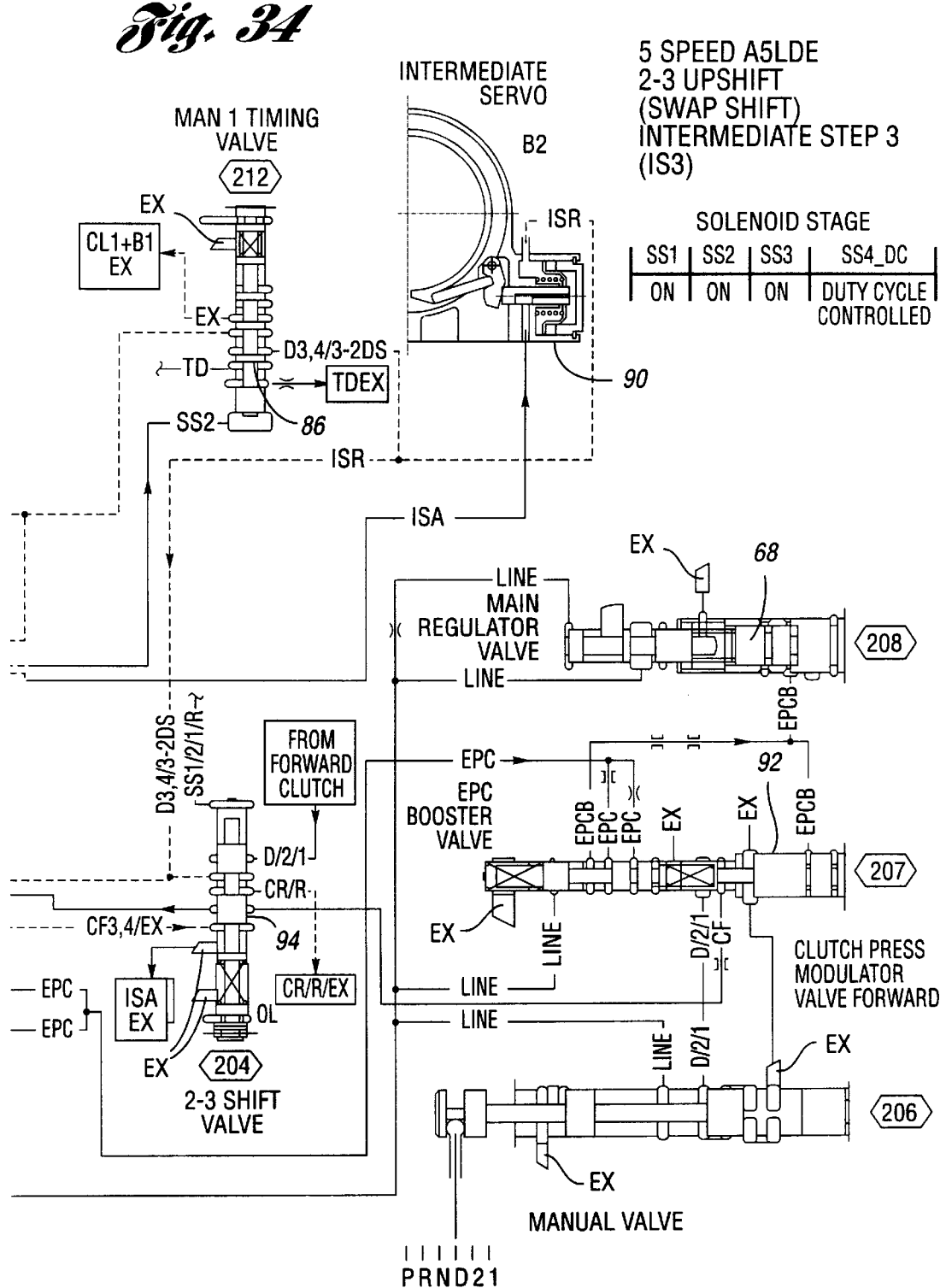

The new second gear embodied in the base five-speed transmission is shown in FIGS. 31 and 32. The solenoid stage is SS1=ON, SS2=OFF and SS3=ON. The shift solenoid (SS4), shown at 58, can be duty-cycle controlled or actuated as an ON/OFF solenoid. During the transition from second gear to third gear, an intermediate step 3 is introduced, which initiates the upshifting event of the Simpson planetary gearset 22.

The following chart shows the solenoid stages during a 2-3 upshift, which are then explained in detail in the following description.

|  | Solenoid Stages | SS1 | SS2 | SS3 | SS4 |
|---|---|---|---|---|---|
| 2–3 UPSHIFT SHIFT SEQUENCE | 2nd Gear | ON | OFF | ON | Duty Cycle Controlled |
|  | Intermediate Step 3 | ON | ON | ON | Duty Cycle Controlled |
|  | 3rd Gear | ON | ON | OFF | OFF |

With the second gear solenoid stage, the overdrive planetary gearset is upshifted, in addition to the first gear ratio of the Simpson sets, giving a gear ratio of 1.85. With shift solenoid 72 (SS3) energized, the 3-4 shift control valve moves into upshift position. This disconnects line pressure from the overdrive servo release (OSR) side and connects the OSR side with the shift solenoid 58 circuitry. This circuitry is called OSR/EX/SS4. With orifice 74 closed and orifice 76 opened and with the upshifting of valve 84 in bore 215, the OSR side is connected to the duty cycle controlled shift solenoid 58. The overdrive servo apply side is always applied with CF-pressure produced by the clutch pressure modulator forward in bore 207. When the shift solenoid 58 is turned off or no duty cycle is applied, the OSR release oil is exhausted through shift solenoid 58. This basically produces the capability of independent capacity control of the overdrive band by adjusting the overdrive servo release pressure. This is important when the swap-shift is initiated. The intermediate servo apply side is exhausted over the 1-2 shift valve in bore 203 and the 2-3 upshift valve in bore 204 into the ISA/EX port. The intermediate servo release side and the high clutch CL2 are exhausted also over the 1-2 upshift valve 94 in bore 204 and the 2-3 upshift valve 78 (FIG. 11b) in bore 204 into the CR/R/EX port.

When a 2-3 upshift is initiated, shift solenoid 80 (SS2) is energized. The energized shift solenoid 80 moves the 1-2 upshift valve 78 into upshift position. This is shown in FIG. 11a. The upshifted 1-2 upshift valve 78 connects the intermediate servo apply side (ISA) with CF-pressure and the intermediate servo starts to engage. This initiates the 2-3 upshift by upshifting the Simpson planetary gearset 22, as explainer earlier. Considering the fact that both elements (the overdrive servo as well as the intermediate servo) are applied with CF-pressure, independent capacity control would not be possible if a signal pressure controller were to be used. With the shift solenoid 58 connected to the OSR side, however, independent control of the overdrive band capacity is possible relative to the intermediate band capacity. The transmission is in the intermediate step 3 (IS3) stage.

Figure 35:
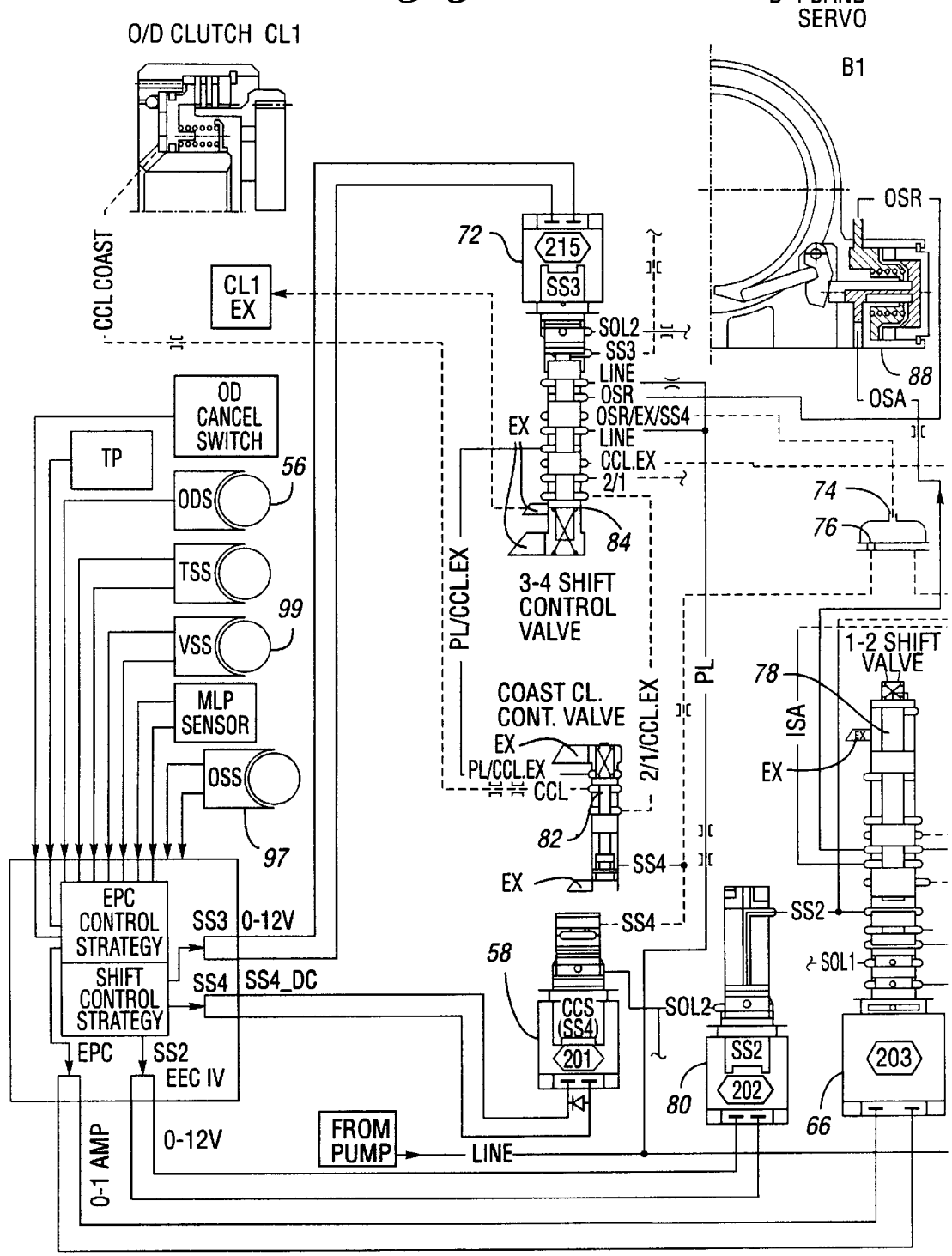
FIGS. 35 and 36 show a schematic illustration of the control valve elements of the control valve system of the base transmission including the valves that effect third gear operation.
Figure 36:
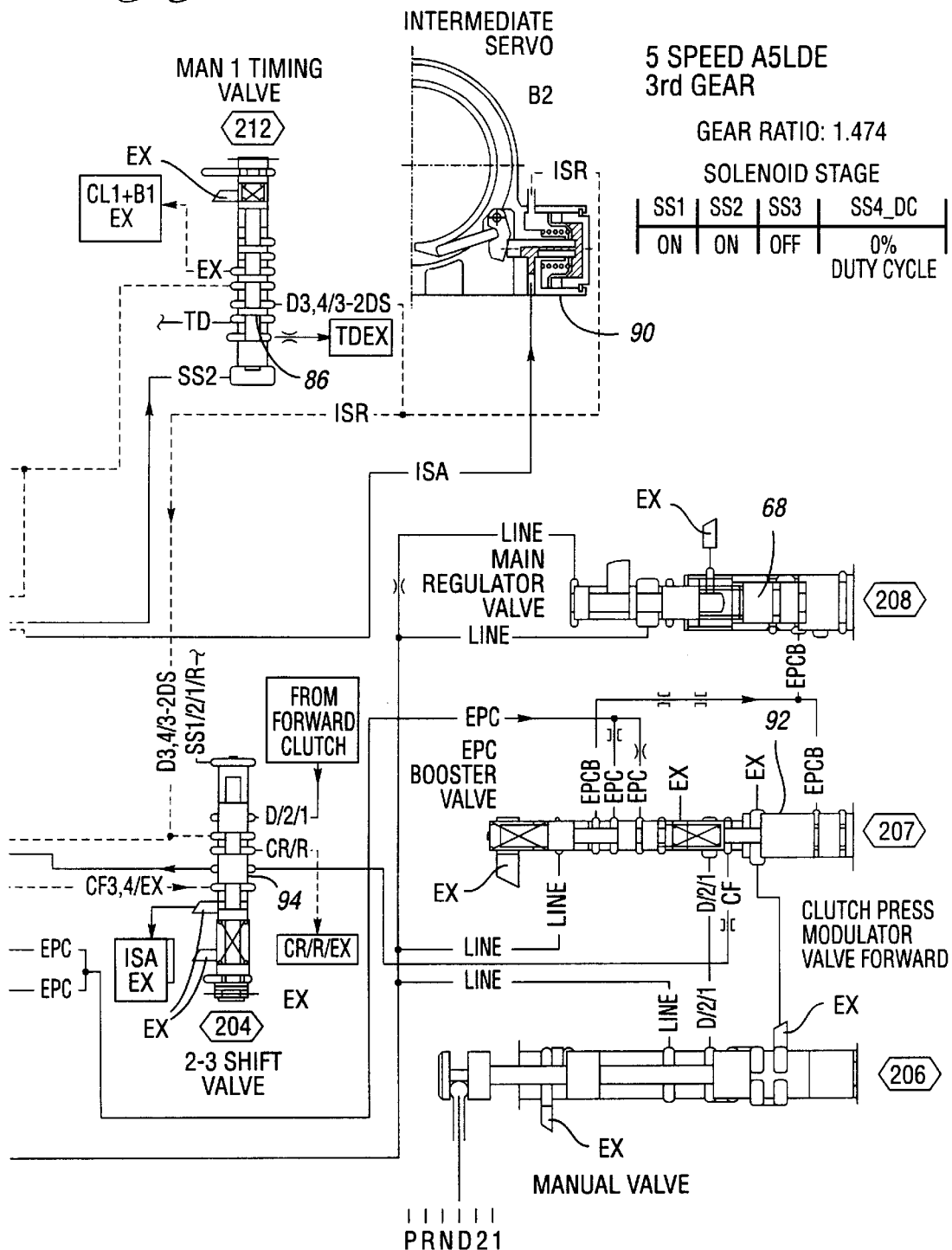

When the intermediate band transmits full capacity, the downshifting of the overdrive planetary gearset is controlled; first of all by controlling the pressure on the overdrive servo release side by applying a duty cycle to shift solenoid 4. This controls capacity of overdrive band 42 and thereby controls the amount of torque applied to OWC1. By monitoring turbine speed (TS) and overdrive drum speed (ODS), the upshifting of the Simpson set 22 and the downshifting of the overdrive planetary gearset can be synchronized. During this OSR capacity control phase, the coast clutch 50 (CL1) is exhausted over the upshifted coast clutch control valve 82 in bore 201 and upshifted 3-4 shift valve 84 in bore 215. At the point where sufficient overdrive band capacity control has been achieved and the transmission approaches the third gear ratio value, the transmission can then shift into third gear completely. The shift solenoid 72 (SS3) is now de-energized and the 3-4 upshift valve 84 in bore 215 moves into downshift position. This is shown in FIG. 35.

Upon downshifting of valve 84 in bore 215, the overdrive servo release side is disconnected from the shift solenoid 58 (SS4) circuit and line pressure is applied to the overdrive servo release side. The line pressure fully strokes the overdrive band 42 and the downshifting of the overdrive planetary gearset is completed. The duty cycle of the shift solenoid (SS4_DC) then is set to zero. This exhausts the SS4 pressure completely and moves the coast clutch control valve 82 into downshift position. The coast clutch 50 (CL1) is now exhausted over the CCL circuit and the coast clutch control valve in bore 201 through the 2/1/CCL/EX circuit and the downshifted 3-4 shift control valve 84 into the manual 2/1 circuit. The 2-3 upshift then is complete and the gear ratio is 1.474.

Optional Shift Control

The same swap-shift can be controlled in an optional construction without capacity control of the overdrive band. This is accomplished by closing orifice 76 and opening orifice 74. This disconnects the overdrive servo release side from shift solenoid 58 and connects the OSR side over the shift valve in bore 212 to the CL1/B1/EX port. However, this disables the independent control feature of the overdrive band 42, but it produces the option of engaging and releasing the overdrive band through a wide open exhaust. This protects the overdrive band lifetime durability in case of an overloading of the overdrive band using SS4 capacity control. The shift quality, however, will be influenced by this optional shift control method. The same effect is also accomplished without using this optional feature and leaving the shift solenoid turned off.

Control Strategy For 2-3 Upshift

In order to describe the complete control system of the base transmission, including the control strategy, the following parameters during a 2-3 upshift event are identified:

Control strategy:
GR-DS desired gear,
GR-CM commanded gear,
EPC control pressure register,
FLG_SS_1 shift solenoid flag 1
FLG_SS_2 shift solenoid flag 2,
FLG_SS_3 shift solenoid flag 3,
RT_TRANS calculated gear ratio,
SS4_DC shift solenoid 4 duty cycle,
TM_23_STRT timer to enable start duty cycle,
ODS overdrive drum speed,
N engine speed,
NT turbine speed,
NOBART output shaft speed,
Hydraulic and transmission parameters:
SS1 shift solenoid pressure 1,
SS2 shift solenoid pressure 2,
SS3 shift solenoid pressure 3,
OSA overdrive servo apply pressure,
OSR overdrive servo release pressure,
ISA intermediate servo apply pressure,
HCDS high clutch drum (CL2) speed (not calculated by control strategy), and
Output shaft torque.

The execution of a 2-3 upshift involves a sequence of events and control actions with interaction between the control strategy and the control hardware. The timing diagram shown in FIG. 13 shows the execution of a 2-3 upshift. Control strategy as well as the hardware behavior are illustrated in this timing diagram.

t1:
Control Strategy (Refer To FIG. 29):

A 2-3 upshift is triggered by the control strategy based on functions of vehicle speed versus throttle position. Desired gear (GR_DS) is changed from second gear to third gear and the shift verification timer (TM_VER_SFT) is loaded. The dynamic EPC value is added for third gear.

Control Hardware:
The EPC values are raised according to the commanded EPC values.

t2:
Control Strategy (Refer To FIG. 29):

The shift verification timer TM_VER_SFT is expired and the gear commanded register GR_CM is changed from second to third gear. An initial duty cycle of shift solenoid 58 is loaded into the SS4_DC register. This initial duty cycle is required to pre-fill the release side of the overdrive servo 88 prior to the shift execution. In addition, the 2-3 upshift start timer TM_23_STRT is loaded. This timer is required to initiate a start duty cycle independent of the expiration of the shift verification timer TM_VER_SFT. When this timer is expired, a start duty cycle is set prior to closed loop capacity control of the overdrive band 42. An initial slip value, depending on the duty cycle value, could be introduced to the overdrive band in an open loop control manner. The TM_23_STRT timer is a function of transmission oil temperature since the applied pressure varies with duty cycle and temperature. At this point, the following important calibration parameters are calculated:

ODS_TRG=NOBART*GRRAT3*FNODS_CMPT(NOBART)
RT_SFT_END=GRRAT2+[FNPCSFT23(TP_
REL)*(GRRAT3−GRRAT2)]RT_23_TRG=GRRAT2+
[FN23CMPF(NOBART)*(GRRAT3−GRRAT2)].

The overdrive drum speed target value ODS_TRG is calculated based on a function FNODS_CMPT, which contains a multiplier of overdrive drum speed as a function of output shaft speed NOBART. This is calculated based on the actual output shaft speed times the gear ratio after completion of the shift (GRRAT3).

The gear ratio threshold value RT_23_TRG then is calculated based on a function FN23CMPF, percentage shift complete PCSFTCMPT, versus output shaft speed NOBART in order to initiate the start of closed loop capacity control of the overdrive band using the shift solenoid duty cycle SS4_DC.

A further gear ratio threshold value RT_SFT_END is calculated to decide the end of closed loop capacity control and to release the overdrive band capacity completely. These values are compared later with the continuously calculated variable RT_TRANS and are used for the above described functions. Shift solenoid flag 2 (FLG_SS_2) is set to 1 and the EPC-RMP timer is loaded. The EPC ramp is now executed.

Figure 29:
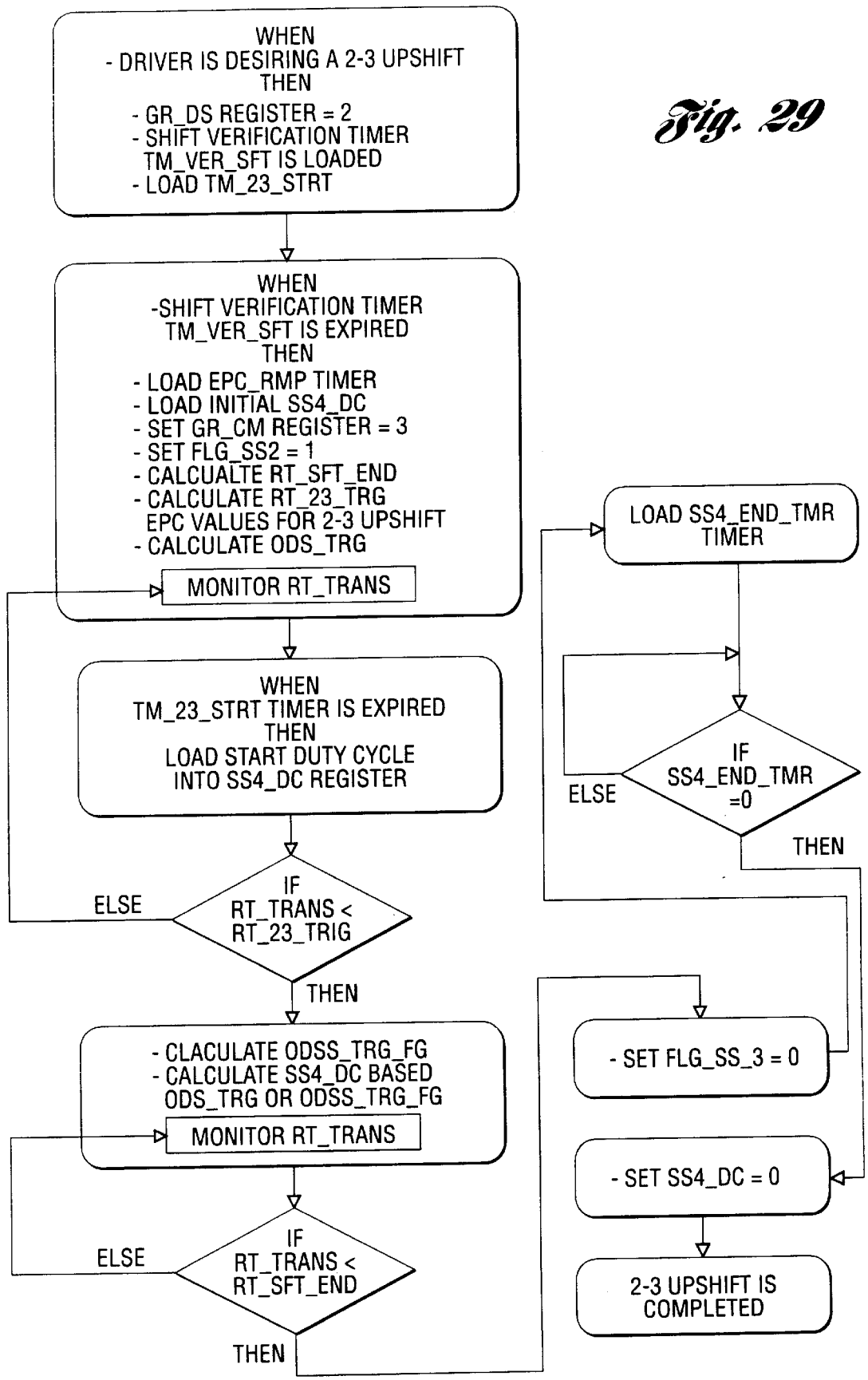
FIG. 29 is a flow diagram illustrating the electronic control strategy for a 2-3 upshift.
Figure 37:
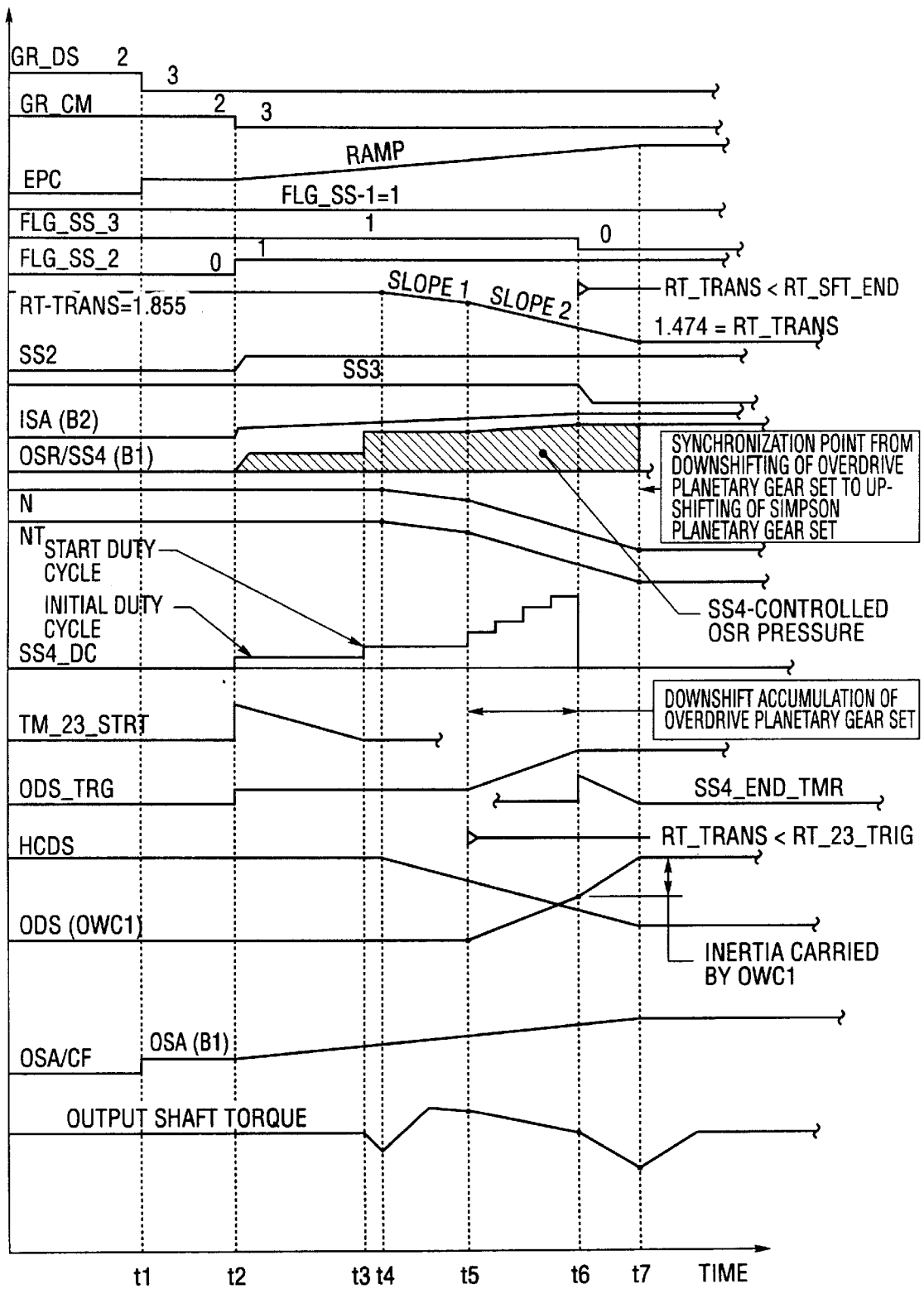
FIG. 37 is a timing chart showing the variables that are involved during a 2-3 upshift of the base transmission.

Control Hardware:
Shift solenoid 80 is energized and the 1-2 upshift valve 78 in bore 203 moves into upshift position. CF-pressure produced from the clutch pressure modulator forward in bore 207 is applied to the apply side of the intermediate servo 90. The characteristic of this forward modulator 92 allows capacity control from zero to maximum capacity. The intermediate band is engaged and takes the torque of the sun gear of the Simpson planetary gearset 22. At the same time, the reaction torque on overrunning brake 34 (OWC2) is reduced. The output shaft torque follows first the reaction torque characteristic of OWC2. The torque phase of the 2-3 swap-shift is initiated (see also FIG. 25). The overdrive servo release pressure, which is actual SS4 output pressure, builds up to a level where no capacity loss on the overdrive band takes place.

t3:
Control Strategy:
The duty cycle start timer (TM_23_STRT) is expired. The start duty cycle (SS4_DC_BRK) is loaded into the SS4_DC register, as seen in FIG. 29 and FIG. 37. SS4_DC_BRK is the break-away duty cycle for overdrive brake capacity.

Control Hardware:

The pressure is increased on the release side of the overdrive servo 88 since the shift solenoid duty cycle has been increased. The overdrive band capacity can be manipulated by SS4 duty cycle settings and an overdrive drum slip can be introduced prior to closed loop control of the overdrive band capacity.

t4:

Control Strategy:

The RT_TRANS value is continuously calculated based on turbine speed and output shaft speed. The RT_TRANS value starts to decrease when the inertia phase of the 2-3 upshift is started and the torque phase is completed. The shift starts with a "shift slope 1" (FIG. 37) which is entirely dependent on the CF pressure settings and the commanded EPC ramp.

Control Hardware:

The torque phase of the upshifting event of the Simpson planetary gearset 22 is completed, and the output shaft torque is completely dependent on the applied capacity of the intermediate band. The reaction torque on one-way clutch 34 (OWC2) is zero, and the high clutch drum speed (HCDS) starts to decelerate. The output shaft torque is reversed since the reaction torque is zero and ISA pressure increases capacity. The overdrive drum speed remains at zero speed.

t5:

Control Strategy:

At this point, the RT_TRANS value is smaller than the RT_23_TRIG calibration value. The closed loop control of the overdrive band capacity is now executed. Here, there are two options for control of the overdrive band capacity:

Option 1: With this option, the ODS_TRG value is directly converted into an SS4 duty cycle with the following calculation:

$$SS4\_DC=SS\$\_DC\_BRK+([ODS\_TRG-ODS)/ODS\_TRG] *OL\_CORR$$

where

OL_CORR is a calibration constant to determine the gain of duty cycles change.

Option 2: With option 2, the ODS_TRG value is converted into a target value which is synchronized with the continuation of the shifting event. The overdrive drum speed target value is directly connected to the RT_TRANS calculation. The overdrive drum target speed value is then decreased from the initial value calculated previously by following calculation:

$$ODSS\_TRG\_FG=ODS\_TRG*(GRRAT2-RT\_TRANS-RT\_CORR)/(GRRAT2-GRRAT3)$$

where

ODSS_TRG_FG is the overdrive drum speed target value depending on the actual gear ratio.

Then, the SS4_DC value is calculated based on the ODSS_TRG_FG value as follows:

$$SS4\ DC=SS4\_DC\_BRK+(ODS-ODSS\_TRG\_FG)*OL\_CORR$$

The duty cycle calculation in each option takes the error between the actual overdrive drum speed ODS and the target overdrive drum speed into account and converts the calculated error in the duty cycle for shift solenoid 58. This adjusts the overdrive band capacity accordingly. Based on the capacity control on the overdrive band 42, a "shift slope 2" is initiated, which begins the downshifting event of the overdrive planetary gearset.

The timer SS4_END_TMR is loaded and kept high. This timer is needed to compensate for the SS3 pressure exhaust delay time.

Control Hardware:

The overdrive servo release pressure is either increased or decreased based on the duty cycle of solenoid 58. A second shift slope, as mentioned earlier, is introduced due to overdrive band capacity control and the additional overdrive band slip. The overdrive drum speed starts to follow the target value ODS_TRG. Independent control of the overdrive planetary gearset is initiated. The output shaft torque decreases since the capacity on the overdrive band is decreased as well.

t6:

Control Strategy:

At this point, the RT_TRANS value is smaller than the second ratio threshold RT_SFT_END. At this point in time the closed loop control of the overdrive band is terminated by setting the shift solenoid flag 3 FLG_SS_3 to zero. The duty cycle calculation for SS4 shift solenoid 58 is still kept high. This is the initiation of the synchronization between the downshifting of the overdrive planetary gearset and the upshifting of the Simpson gearset 22.

Control Hardware:

Shift solenoid 72 (SS3) is de-energized and the 3-4 upshift valve 84 moves into downshift position. The shift solenoid 58 output pressure is disconnected from the overdrive servo release side and line pressure is connected. This reduces the overdrive band capacity completely, and OWC1 takes the remaining inertia and starts to transmit full torque. The output pressure of the shift solenoid 58 stays high in order to keep the overdrive servo release area pressurized. From time point t5 to time point t6, downshift accumulation takes place for the overdrive planetary gearset in order to accomplish a smooth one-way clutch engagement of OWC1. This accumulation phase is also used to synchronize the downshifting of the overdrive planetary gearset and the upshifting of the Simpson set 22 using feedback control with overdrive drum speed. The hatched area of the overdrive servo release area (FIG. 37) indicates the time where independent capacity control takes place following time t3 using open loop control and closed loop control executed by SS4 for the overdrive gearset and the Simpson set.

Beyond timing point t2, the overdrive servo release pressure is line pressure. The output shaft torque characteristic shows another negative slope since the overdrive band has zero capacity.

t7:

Control Strategy:

The EPC_RMP timer has expired and the EPC ramp is terminated. The timer SS4_END_TMR can expire before or beyond t7 since this time is used for SS3 pressure exhaust synchronization. When timer SS4_END_TMR is expired, the SS4_DC register is set to zero since full line pressure is then connected to the overdrive servo release chamber.

Control Hardware:

The overdrive drum has reached engine speed and OWC1 is fully engaged. The high clutch drum speed (HCDS) is at zero speed. The output shaft torque characteristic is now reversed again since OWC1 then carries full torque. The torque phase of the downshifting event is initiated and the 2-3 upshift is complete. Time pressure is connected to the overdrive servo release chamber. This is the synchronization point for the downshifting overdrive gearset and the upshifting Simpson set within the calibration window shown in FIG. 3.

3-2/4-2 Downshift System

The functioning of the 3-2/4-2 downshift control system is the inverse of the 2-3 upshift event; i.e., the overdrive planetary gearset upshifts and the Simpson set 22 downshifts in a synchronized manner. During a 3-2 downshift, the Simpson set is downshifted by releasing the intermediate servo 90 for band (B2), and the OWC2 engages after the inertia phase. During a 4-2 downshift, the Simpson set 22 is downshifted by releasing the high clutch (CL2). During a 3-2 downshift, the gear ratio is changed from 1.474 to 1.86, and during a 4-2 downshift, the gear ratio is changed from 1 to 1.86.

Hydraulic Control System

The solenoid stages during a 3-2 downshift is the inverse of the 2-3 upshift, except shift solenoid 58 (SS4) is not duty cycle controlled.

|  | Solenoid Stages | SS1 | SS2 | SS3 |
|---|---|---|---|---|
| 3–2 DOWNSHIFT SHIFT SEQUENCE | 3rd Gear | ON | ON | OFF |
|  | Intermediate Step 3 | ON | ON | ON |
|  | 2nd Gear | ON | OFF | ON |

The 4-2 downshift can be executed either in sequence, which means 4-3-2, or directly as a 4-2 downshift. The shift sequence is shown as follows:

|  | Solenoid Stages | SS1 | SS2 | SS3 |
|---|---|---|---|---|
| 4–2 DOWNSHIFT SHIFT SEQUENCE | 4th Gear | OFF | OFF | OFF |
|  | Intermediate Step "5th Gear" | OFF | OFF | ON |
|  | 2nd Gear | ON | OFF | ON |

|  | Solenoid Stages | SS1 | SS2 | SS3 |
|---|---|---|---|---|
| 4–3–2 DOWNSHIFT SHIFT SEQUENCE | 4th Gear | OFF | OFF | OFF |
|  | 3rd Gear | ON | ON | OFF |
|  | Intermediate Step 3 | ON | ON | ON |
|  | 2nd Gear | ON | OFF | ON |

The sequenced 4-3-2 downshift is basically the execution of a 4-3 downshift, which is the same as the 3-2 downshift of the four-speed transmission, followed by the 3-2 (SWAP-SHIFT) downshift. During the direct 4-2 downshift, the control hardware uses the 5th gear solenoid stage as an intermediate step to initiate the 4-2 downshift, as shown in the above tables.

3-2 Downshift:

FIGS. 31, 32, 33, 34, 35 and 36 show the 3-2 downshift hydraulic control system for the base transmission. The solenoid stage in third gear is SS2=ON, SS1=ON, and SS3=OFF. The intermediate servo (i.e., band B2) is engaged when the 1-2 upshift valve in bore 203 is upshifted upon being energized by shift solenoid 80. The high clutch (CL2) is exhausted over the 2-3 upshift valve 94 in bore 204. When the 3-2 downshift is initiated, the shift solenoid 3 is energized and the 3-4 upshift valve moves into upshift position. The transmission is now in intermediate step 3 shown in FIG. 34. The overdrive servo release circuit, which was previously applied with line pressure, is now exhausted over orifice 76 through the exhaust port of shift solenoid 58. The overdrive servo apply side is continuously applied with CF modulator pressure produced by the clutch pressure modulator valve 92 in bore 207. The overdrive servo is applied and initiates a 3-2 downshift by upshifting the overdrive planetary gearset.

When a certain gear ratio has been monitored by the control strategy, the transmission is commanded to execute the second gear solenoid stage as shown in FIGS. 31 and 32. The duty cycle controlled shift solenoid 58 is de-energized. Shift solenoid 80 (SS2) is turned off. With the shift solenoid 80 de-energized, the 1-2 upshift valve 78 in bore 203 moves into downshift position and the intermediate servo apply pressure is exhausted over the CF/3/4/EX circuit through the ISA/EX port located on the downshifted 2-3 upshift valve 94. Shift solenoid SS1 always stays on during the 3-2 downshift event and keeps the high clutch 44 always exhausted, together with upshifted 2-3 upshift valve 94 in bore 204. The 3-2 downshift is now complete.

4-2 Downshift:

The solenoid stage in fourth gear is SS1=OFF; SS2=OFF, and SS3=OFF. With shift solenoid SS1 turned off, the 2-3 upshift valve 94 is in the downshift position and D/2/1 pressure is present in the high clutch circuit. This can be seen in FIG. 36 where the shift valve 94 in bore 204 is shown in upshift position.

In order to initiate a direct 4-2 downshift, the overdrive planetary gearset has to be upshifted. This can only be accomplished by energizing shift solenoid 72 (SS3) first. With shift solenoid 72 turned on, the transmission is in the 5th gear solenoid stage, which corresponds to the 4th gear solenoid stage in the four-speed transmission. When shift solenoid 72 is energized, the overdrive servo release pressure is exhausted over orifice 76 through the exhaust port of shift solenoid 58 (SS4). The overdrive servo apply is pressurized with CF pressure and the overdrive band engages. This initiates the 4-2 downshift.

When the control system has monitored a certain instantaneous gear ratio level, the downshifting event of the Simpson planetary gearset is initiated. This is done by energizing shift solenoid SS1. Shift solenoid 80 (SS2) stays de-energized. With shift solenoid SS1 energized, the 2-3 upshift valve 94 moves into upshift position. The 1-2 upshift valve 78 in bore 203 is in downshift position. The upshifted 2-3 shift valve 94 in bore 204 opens the ISA/EX port as well as the CR/R/EX port. The intermediate servo apply pressure is exhausted over the ISA/EX port and the high clutch (CL2) is exhausted through the CR/R/EX port. The 4-2 downshift is now complete.

Control Strategy For 3-2/4-2 Downshift Of Base Transmission

In order to describe the complete control system, including the control strategy, the following parameters during a 3-2 downshift event for the base transmission are referred to:

Control Strategy:
GR_DS desired gear
GR_CM commanded gear
EPC control pressure register
FLG_SS_1 shift solenoid flag 1
FLG_SS_2 shift solenoid flag 2
FLG_SS_3 shift solenoid flag 3
ODS overdrive drum speed
N engine speed
NT turbine speed
Hydraulic and Transmission Parameters:
SS1 shift solenoid pressure 1

SS2 shift solenoid pressure 2

SS3 shift solenoid pressure 3

OSA overdrive servo apply pressure

OSR overdrive servo release pressure

ISA intermediate servo apply pressure

HCDS high clutch drum speed (not calculated by control strategy)

Output shaft torque.

Figure 38:
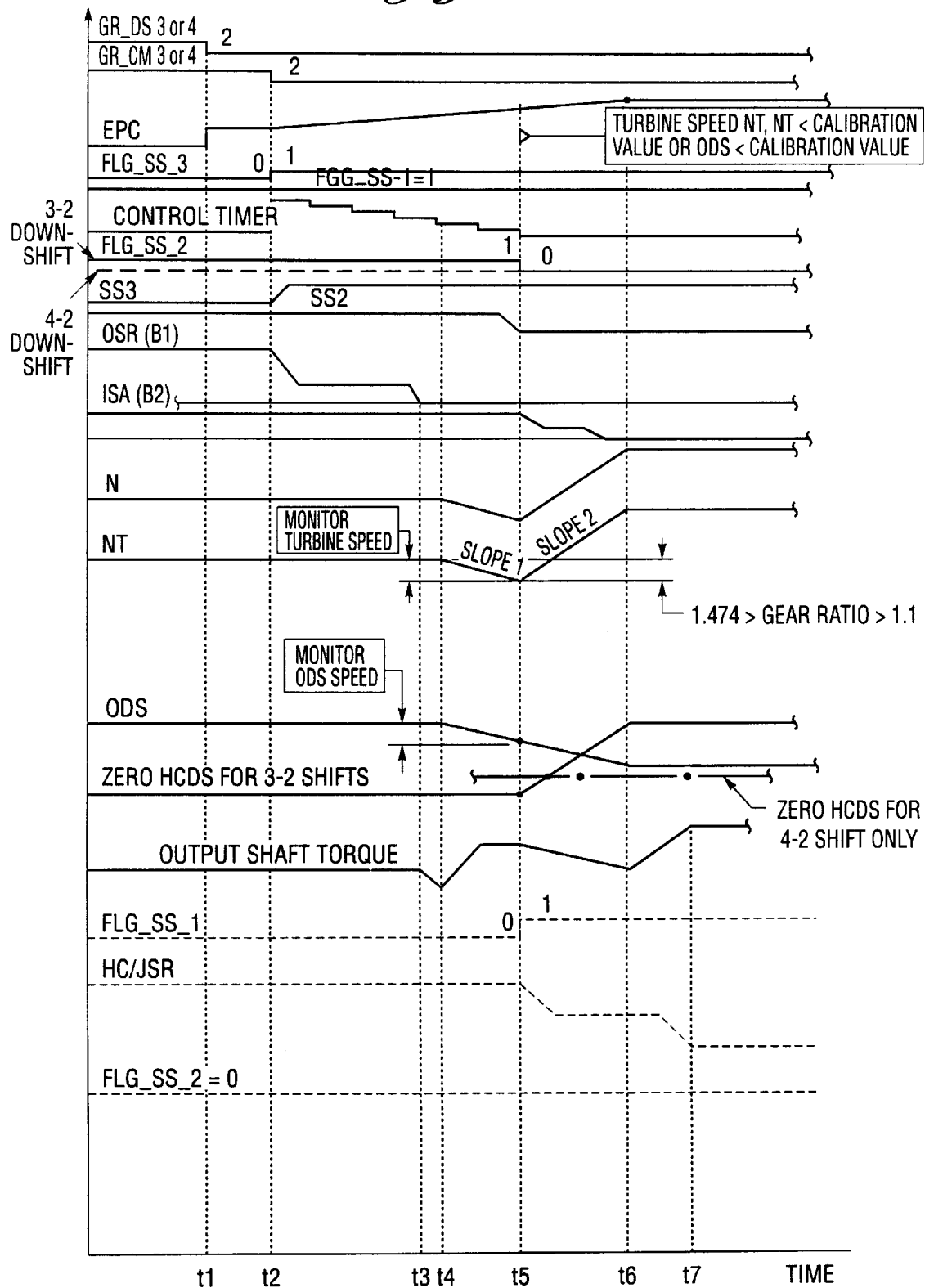
FIG. 38 is a timing chart, corresponding to the timing chart of FIG. 37, illustrating the variables involved during a 3-2/4-2 swap-shift of the base transmission.

FIG. 38 shows the timing diagram for a 3-2/4-2 downshift. This illustrates the interactive functions of hardware and control strategy during the 3-2/4-2 downshift event. The broken lines in FIG. 14 show the additional and actions in a 4-2 downshift.

t1:

Control Strategy:

A 3-2/4-2 downshift is triggered by the control strategy based on the function of vehicle speed versus throttle position. GR_DS is changed from third gear or fourth gear to second gear, and the shift verification timer TM_VER_SFT is loaded. The dynamic EPC value is added for second gear.

Control Hardware:

The EPC values are raised according to the commanded EPC values.

t2:

Control Strategy:

The shift verification timer TM_VER_SFT is expired, and the gear commanded register GR_CM is changed from fourth or third to second gear. A 3-2/4-2 control timer is loaded. At the same time, overdrive drum speed and turbine speed are monitored to sense the start of the downshifting event. The control timer is required in order to control the 3-2/4-2 downshift independently of the speed signals. This is needed in the event that the speed signals are not available. Shift solenoid flag 3 FLG_SS_3 is set to 1 and the EPC-RMP timer is loaded. The EPC ramp then is executed.

Control Hardware:

Shift solenoid 72 (SS3) is energized and the 3-4 shift control valve 84 in bore 215 moves into upshift position. CF-pressure produced from the clutch pressure modulator valve (forward) 92 in bore 207 is applied to the overdrive servo apply side, and the overdrive servo starts to stroke.

t3:

Control Strategy:

The control strategy monitors overdrive drum speed (ODS) and turbine speed (NT).

Control Hardware:

The overdrive servo is engaged with CF pressure. The characteristic of this modulator valve 92 allows capacity control from 0 to maximum capacity. The overdrive band engages and takes the torque of the sun gear from the overdrive planetary gearset. At the same time, the reaction torque on OWC1 relative to the input torque is reduced. The output shaft torque is determined first by the reaction torque characteristic of OWC1. The torque phase of the 3-2/4-2 swap-shift is initiated with the upshifting of the overdrive planetary gearset.

t4:

Control Strategy:

The turbine speed value (NT) and the overdrive drum speed value (ODS) start to decrease since the inertia phase of the 3-2/4-2 shift is started and the torque phase is completed. Both speed signals are still being monitored. The shift starts with a "shift slope 1" (see FIG. 38), which is entirely dependent on the CF pressure settings on the overdrive band according to the commanded EPC ramp.

Control Hardware:

The torque phase of the upshifting overdrive planetary gearset is completed and the output shaft torque is completely dependent on the applied capacity on the overdrive band 42. The reaction torque on one-way clutch 16 (OWC1) is zero and the overdrive drum speed (ODS) starts to decrease. The output shaft torque is reversed since the reaction torque is zero and OSA pressure is increasing. During a 3-2 downshift, the high drum still stays at zero speed. When a 4-2 downshift is commanded, the intermediate band is released and the high clutch is applied for 4th gear. The high clutch drum turns clockwise in this case, the same direction as engine speed.

t5:

Control Strategy:

At this point, the ODS value or the NT value is smaller than a calibration value. The downshifting event of Simpson set 22 now is initiated. The shift solenoid flag 2 (FLG_SS_2) is set to zero during a 3-2 downshift. At this time, the 3-2/4-2 control timer is expired, allowing 3-2/4-2 downshift execution. Because the Simpson planetary gearset is downshifted, a "shift slope 2" is initiated (see FIG. 14). The control strategy has sensed that enough capacity is transmitted by the engaged overdrive band. This represents the feedback of the control system for executing a 3-2/4-2 downshift. During a 4-2 downshift, the shift solenoid flag 2, FLG_SS_2 is zero and stays zero. Here, the shift solenoid flag 1, FLG_SS_1 is set to 1, initiating the downshift of Simpson planetary gearset 22.

Control Hardware:

For a 3-2 downshift, the intermediate servo apply pressure is exhausted by the de-energized shift solenoid 80 (SS2), which makes the 1-2 upshift valve 78 in bore 203 move to downshift position. In this case, the shift solenoid SS1 is energized and the 2-3 upshift valve 94 in bore 204 is in downshift position. This opens the ISA/EX exhaust port to the intermediate servo. A second shift slope, as mentioned earlier, is introduced due to the reduced capacity of the intermediate band 46. The high clutch drum speed starts to accelerate from zero rpm. The output shaft torque decreases since the capacity of the intermediate band 46 is decreased as well. For a 4-2 downshift, the shift solenoid 80 (SS2) stays de-energized. High clutch 44 is pressurized with D/2/1 pressure and the apply side of the intermediate servo is energized with CF pressure. The high clutch drum rotates in the direction of the engine speed with the value of engine speed. When shift solenoid SS1 is energized, the intermediate servo apply pressure and the high clutch pressure are exhausted, and the high clutch drum is first decelerated down to zero speed by the input torque. Then the high clutch is accelerated in the direction opposite to the rotational direction of the engine speed up to the point when overrunning clutch 34 (OWC2) is engaged. The inertia phase of the downshifting of the Simpson planetary gearset 22 thus is initiated.

t6:

Control Strategy:

The EPC_RMP timer expires and the EPC ramp is terminated.

Control Hardware:

The high clutch drum has reached its rotational speed and the overrunning clutch 34 (OWC2) is fully engaged. The overdrive drum speed (ODS) is zero. The output shaft torque characteristic is now reversed again since OWC2 now carries full torque. The torque phase of the downshifting Simpson gearset is initiated and the inertia phase is completed. The 3-2/4-2 downshift then is completed.

Figure 30:
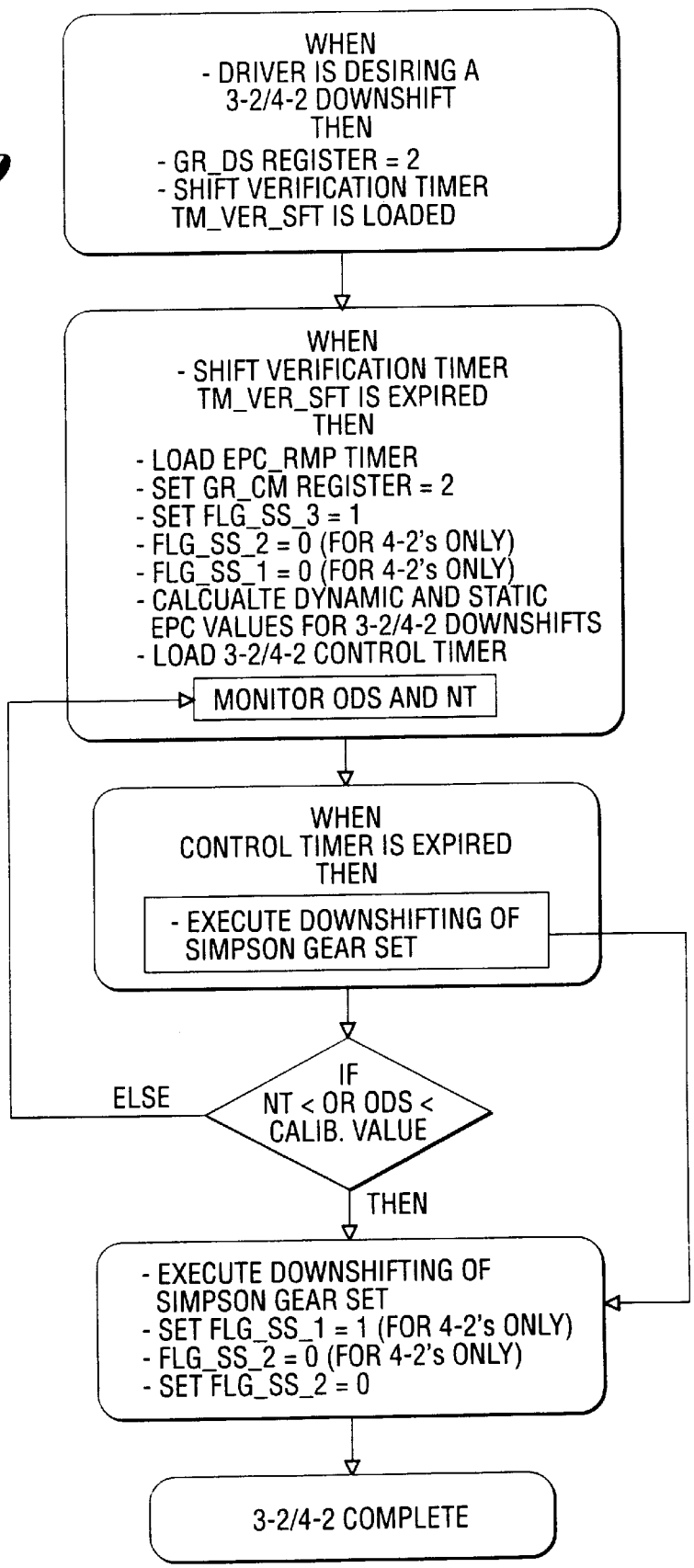
FIG. 30 is a flowchart illustrating the control strategy for a 3-2 downshift and a 4-2 downshift.

The flowchart of FIG. 30 shows the control strategy during a 3-2/4-2 downshift.

Summary Of Operation Of Base Transmission

The base five-speed transmission control system controls two independent gearing units of the transmission, the overdrive planetary gearset and the Simpson planetary gearset. These two independent gearing units are compounded together in series. The electronic control system controls the upshifting event of the overdrive planetary gearset and the downshifting event of the Simpson planetary gearset during a 2-3 upshift, and vice-versa during a 3-2 downshift. Both events are synchronized and capacity control is executed during the synchronization process.

A conventional hydraulic control system is not capable of executing such a "swap-shift." With the control system of the base transmission, this shift execution is accomplished by applying electronic control and feedback control techniques. A further advantage of this control system is the independent capacity control.

Particular Description Of The Improvements Of The Present Swap-Shift Invention

General Overview Of The Transmission Of The Present Invention

Figure 3:
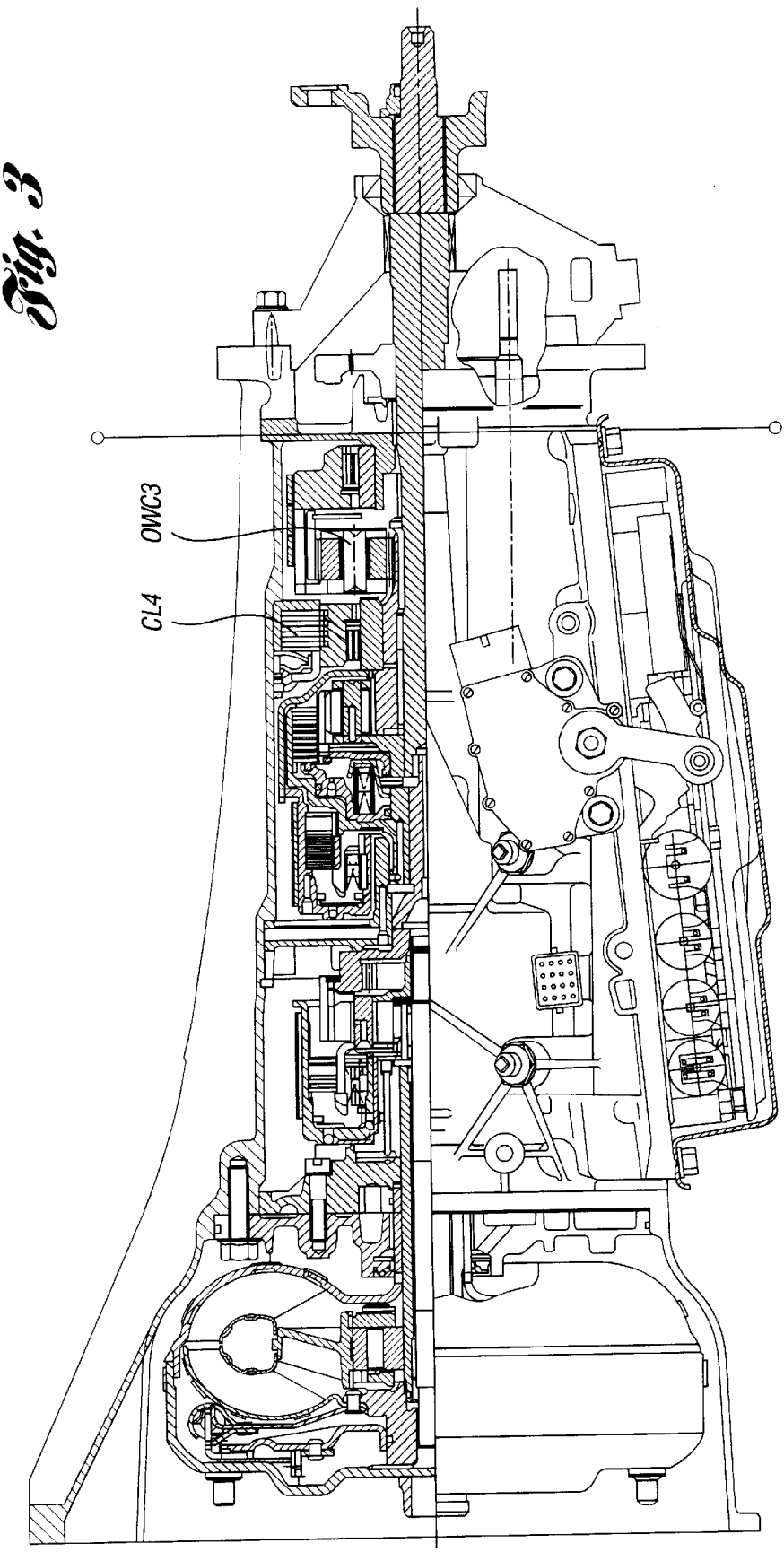
FIG. 3 is a cross-sectional view of a transmission corresponding to the schematic representation of FIG. 2.
Figure 5:
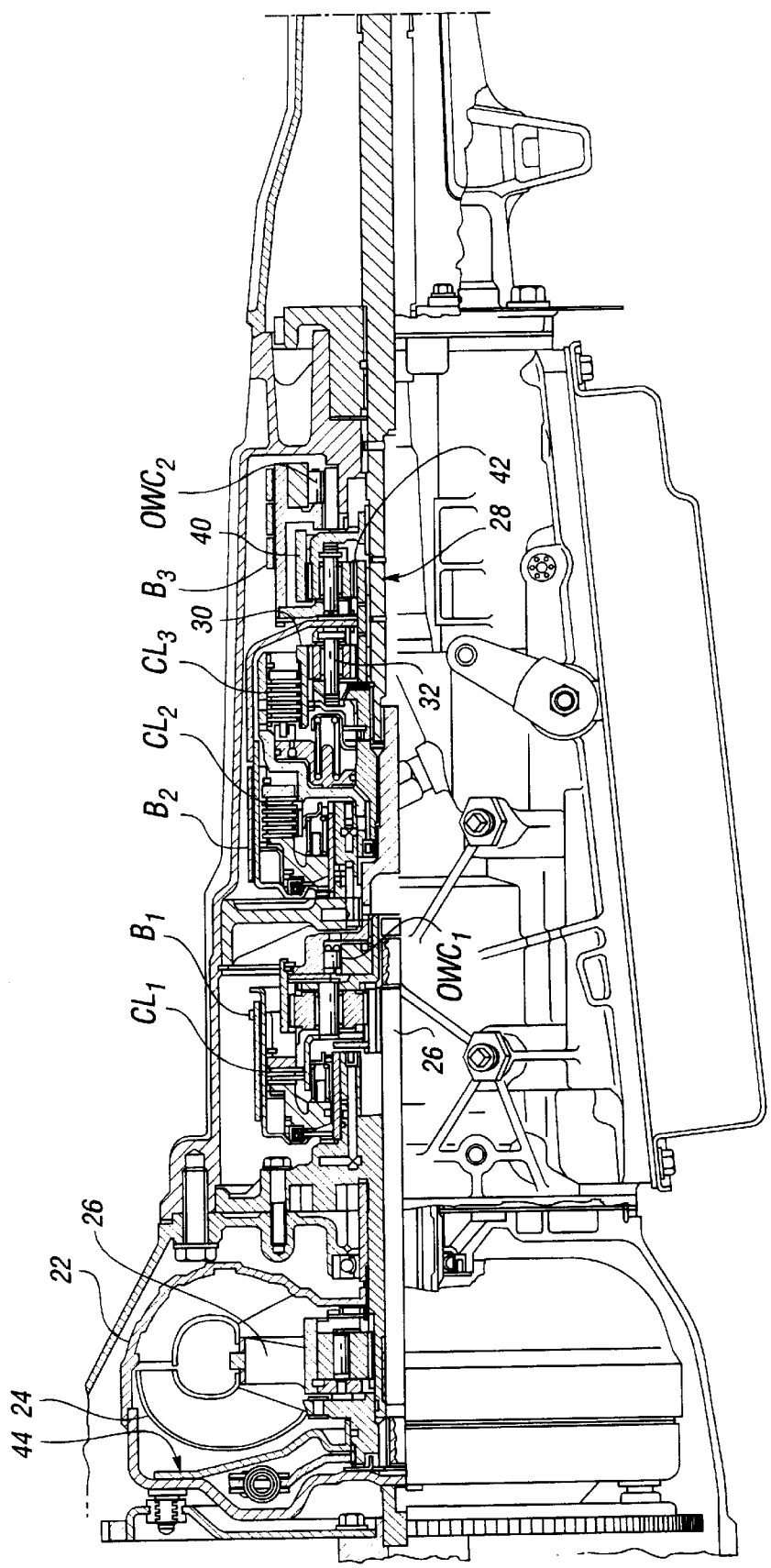
FIG. 5 is a cross-sectional view of a transmission corresponding to the schematic representation of FIG. 4.

The improvements of the present invention may be applied to each of the transmission embodiments shown in cross-section in FIGS. 3 and 5. The transmission of FIG. 3 uses an overrunning brake for the sun gears of the Simpson gearset. The overrunning brake is in parallel disposition with respect to a friction brake on a brake drum which is activated by a double-acting brake servo. The transmission of FIG. 5 uses a friction brake band for anchoring the sun gears of the Simpson gearset. In other respects, the transmission hardware embodiments of FIGS. 3 and 5 are essentially the same. Both transmissions have a Simpson planetary gearset in series with an overdrive planetary gearset. The difference between the transmission versions with respect to the swap-shift is shown below.

| Transmission | FIG. 3 | FIG. 5 | Base Transmission |
|---|---|---|---|
| Features: | | | |
| Wide Ratio Span of 4.32 | YES | YES | NO |
| Low Ratio Span of 3.29 | NO | NO | YES |
| Synchronous 3–4/4–3 Shift deleting OWC3 and Intermediate Clutch CL4 | NO | YES | YES |
| Non-synchronous 3–4/4–3 Shift by adding OWC3 and Intermediate Clutch CL4 | YES | NO | NO |
| Swap-shift Execution with respect to the applying clutches resp. bands | B1 versus CL4 | B1 versus B2 | B1 versus B2 |

The gear ratios of the various applications are as follows:

| Gear | Gear Ratio Base Trans. | Gear | Gear Ratio FIGS. 3 & 5 |
|---|---|---|---|
| 1st | 2.474 | 1st | 3.25 |
| 2nd | 1.855 | 2nd | 2.43 |
| 3rd | 1.474 | 3rd | 1.55 |
| 4th | 1.0 | 4th | 1.0 |
| 5th | 0.75 | 5th | 0.75 |

Figure 4:
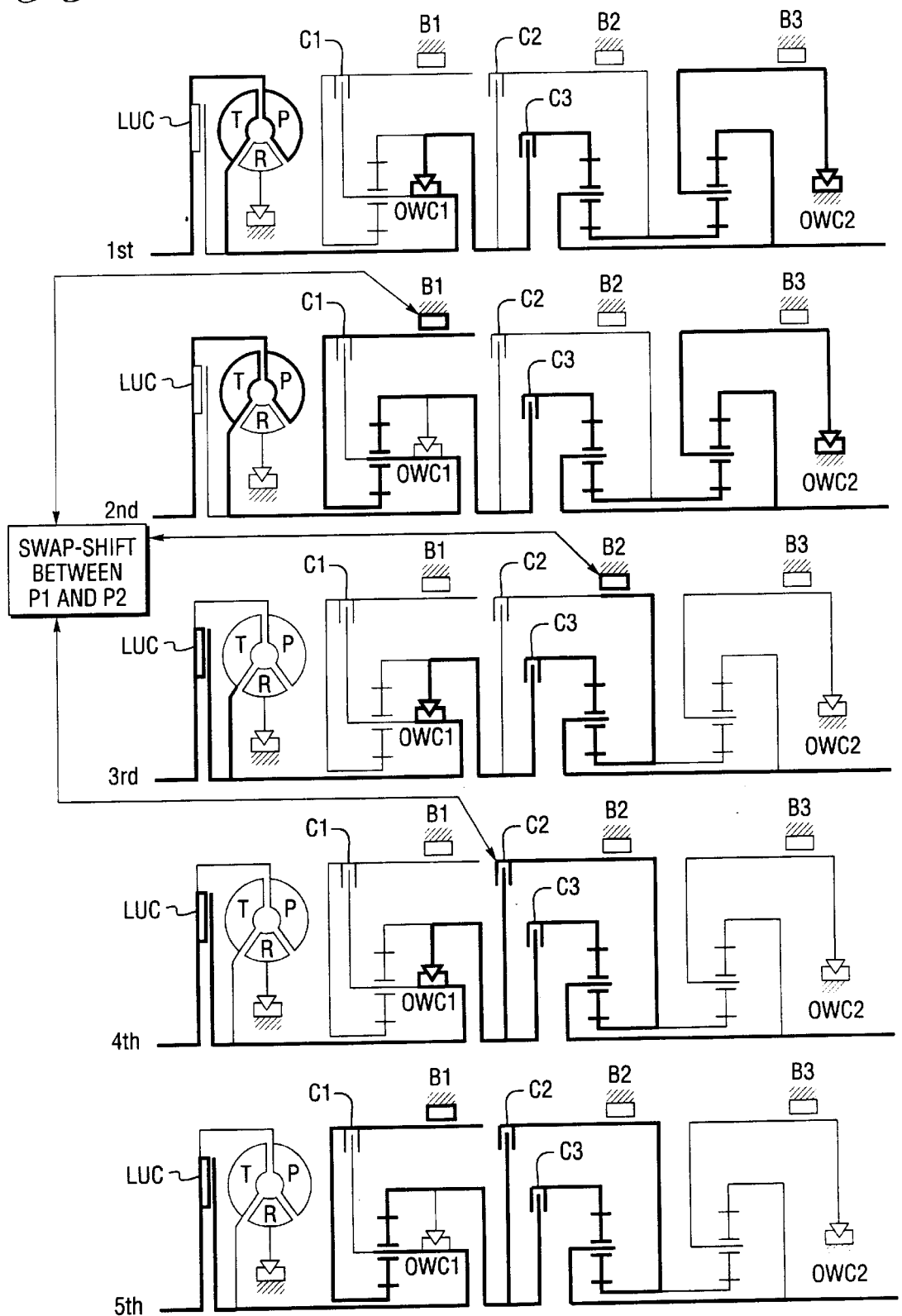
FIG. 4 is a schematic representation of torque flow paths for another embodiment of the transmission of our invention.

The 2nd gear ratio of the FIGS. 3 and 5 versions is 0.75*3.24, which equals 2.43. The base transmission and on the FIG. 5 version, the swapshift is executed by energizing or de-energizing the brake bands B1 and B2 (see FIGS. 4 and 5). The FIG. 3 transmission contains a mechanical system for desynchronizing the Simpson gearset 3-4/4-3 shifts. This system contains a one-way-clutch 3 (OWC3) and the Intermediate Clutch CL4. Here, the swap-shift is executed by energizing or de-energizing B1 and CL4 (see FIGS. 3 and 2).

The swap-shift control system for the transmissions in FIGS. 3 and 5 is the same except one actuator (VFS1) can be connected optionally to either B2 for the FIG. 5 version or to CL4 for the FIG. 3 version. This is accomplished by opening or closing a control orifice in the control valve system in the separator plate, which will be explained subsequently. The control system is explained in the following paragraphs in more detail.

Control System

The general overview of the control system is illustrated in FIG. 1. The control system is similar in some respects to the control system of the base transmission. The following signals interact between the driver, transmission and engine:

A) Driver
  OCS, TP, BOO, P/N Switch, W/N—Switch
B) Transmission Sensors
  VSS, TSS, MLP, TOT, OSS, HCDS
C) Engine
  N, MAF, ECT The following actuators are used to execute a 2-3/3-2/4-2 swap-shift for the version of FIGS. 3 and 5:

3 ON/OFF solenoids for shifts (SS1–SS3)
1 VFS for B1 capacity
1 VFS for B2 resp. CL4 capacity
1 VFS for CL2 capacity (for 4-2 downshifts only).

Shift solenoid 4 (SS4) is exclusively dedicated to the coast clutch and is not used for the swap-shift control as in the base transmission application. There is one pressure regulator (VFS1 through VFS3) dedicated for each affected element whereas in the base transmission, only one VFS was used and multiplexed for B1 and B2 capacity control. An arrangement of shift and modulator valves are actuated by these signal pressures. The purpose of these shift valves is to release or apply hydraulic pressure to the torque transmitting element (clutches and bands). Pressure modulator valves adjust the amount of capacity for the friction elements.

Transmission Gearing Overview

Figure 2:
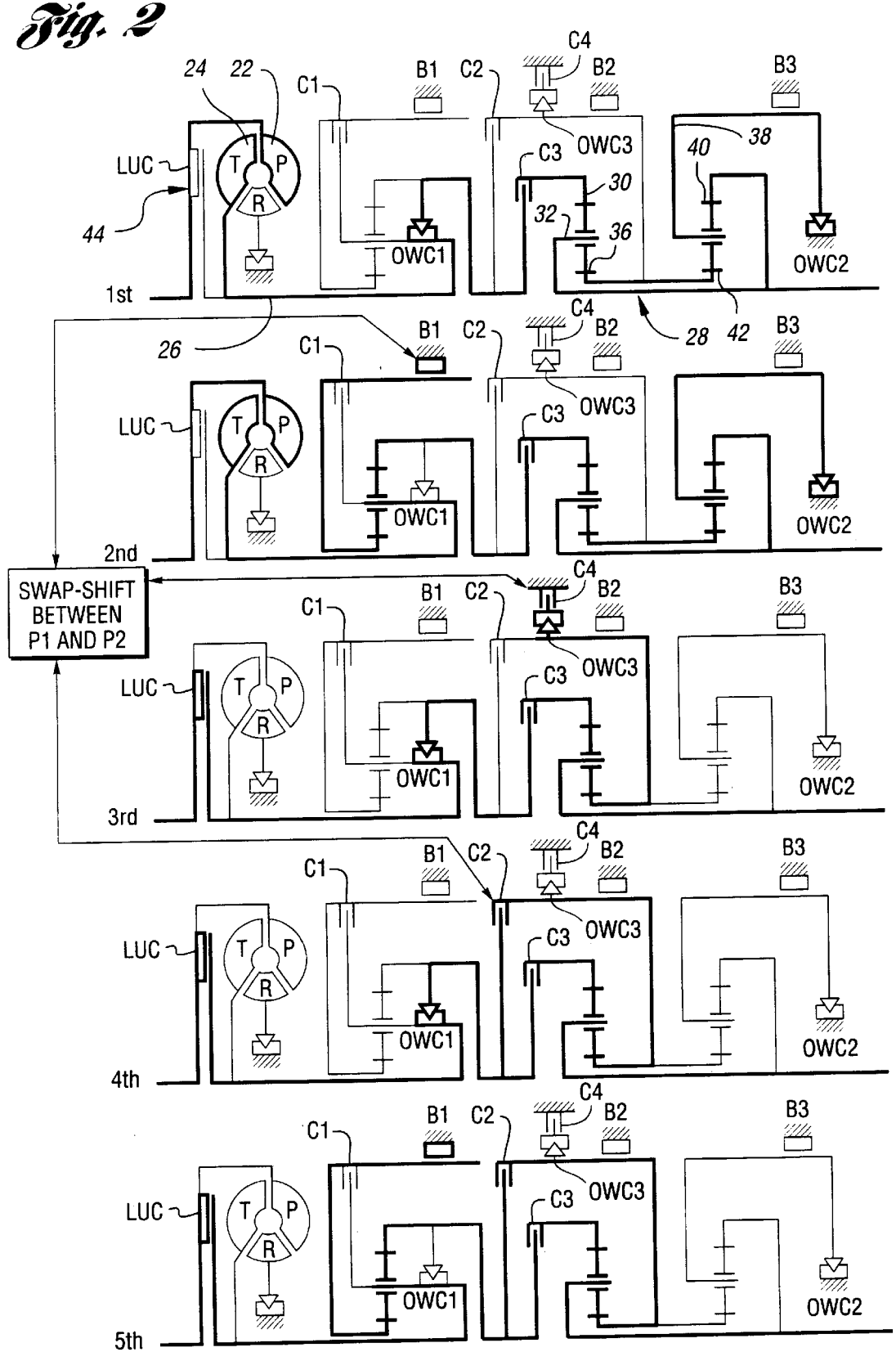
FIG. 2 is a schematic representation of torque flow paths for one embodiment of the transmission of our invention.

The transmission torque flow of the FIG. 5 transmission application is the same as that of the base transmission except that the friction elements carry different amounts of torque due to the different gear ratios. The torque flow for the FIG. 3 transmission is the same except for the following difference in third gear:

Torque Flow Third Gear In DRIVE (FIG. 3 Version—See FIG. 2

The torque flow in third is the same as in second gear except that CL4 is applied and B1 is released. The one-way clutch 3 holds the sun gear torque of the Simpson planetary gearset in the opposite direction from input speed direction. With the engagement of CL4, the sun gear speed of the rear Simpson set is reduced to zero. Here the intermediate clutch CL4 serves as a reaction element for the front part of the Simpson planetary gearset and generates an output torque multiplication of 1.55 by holding 0.55 engine torque as a reaction to the output. The output of the rear planetary gearset is zero since the sun gear has zero speed. The converter clutch can be locked or unlocked in third gear depending on the driving condition. Brake band B2 is used to provide engine braking in coast mode. In coast mode, OWC3 overruns and free-wheeling takes place. With the engagement of B2, the sun gear of the Simpson set is held at zero speed in coast mode, providing engine braking.

The gear change from second to third is illustrated in FIG. 2. The gear ratio change is accomplished by releasing B1 and applying CL4 and engaging OWC3 at the same time. This disengages the overdrive planetary gearset and engages the Simpson planetary gearset. During a downshift, the engaging sequence is vice versa. With a gear change from third to fourth, CL2 is applied and accelerates in the direction of the input speed up to input speed. This is initiated when the reaction torque of OWC3 is reduced to zero by the clutch torque CL2 and the OWC3 overruns.

Electronic—Mechanical Interface

The following chart shows the functional matrix of the transmission of our invention. This functional matrix represents the active solenoid states dedicated to the gears and the capacity elements in "Drive" position on the manual lever.

| GEAR | SS1 | SS2 | SS3 | VFS1 | VFS2 | VFS3 |
|---|---|---|---|---|---|---|
| 2nd | ON | OFF | ON | HIGH | HOLD B1-Capacity | HIGH |
| Intermediate step 3 (IS3) | ON | ON | ON | B2-Control for FIG. 5 Trans. or CL4-Control for FIG. 3 Trans. | B1 - Control | HIGH |
| 3rd | ON | ON | OFF | Hold B2-Capacity for FIG. 5 Trans. or Hold CL4-Capacity for FIG. 3 Trans. | HIGH | HIGH |
| 4th | OFF | OFF | OFF | HIGH | HIGH | Hold CL2-Capacity |
| 4th plus Overdrive (5th gear) | OFF | OFF | ON | HIGH | B1 - Control | CL2-Control |

Control = Open loop or closed loop capacity control depending on the upshifting or downshifting event.
HIGH = Any VFS state higher than zero pressure.

The electric-mechanical interface contains three ON/OFF solenoids and three variable force solenoids. The ON/OFF solenoids are required to activate and terminate the capacity control for each capacity element in each gear by applying or exhausting the various clutch pressures. A shift valve system actuated by the ON/OFF solenoids is used to apply or release the various clutch pressures. The solenoid stages are the same as the stages for the base transmission.

Three variable force solenoids are used for capacity control. VFS1 is used for B2 control for the FIG. 5 version and for CL4 control for the FIG. 3 version. VFS2 is used for B1 capacity control and VFS3 is used for CL2 capacity control. With this configuration, independent capacity control of each affected capacity element is possible for upshifts as well as for downshifts. Intermediate step 3 (IS3) is used to initiate a 2-3 upshift or a 3-2 downshift. The solenoid stage fourth gear plus overdrive, which is fifth gear, is used to initiate a 4-2 downshift. CL1 is controlled separately by an additional shift solenoid which is SS4. In contrast to this, the base transmission multiplexed one VFS for B1 and B2 and used SS4 for B1 pressure release control for upshifts only. For 3-2/4-2 downshifts, independent capacity control was not available.

Sensors And Speed Calculations

The sensors are the same as those used in the base transmission and are fully described in application Ser. No. 08/549,438. The only difference in this respect between the base transmission and the present invention is the replacement of the overdrive drum speed sensor by the high clutch drum speed (HCDS) sensor.

High Clutch Drum Speed Sensor (HCDS)

The high clutch drum speed sensor senses the speed of the high clutch drum (CL2). This sensor is a variable reluctance sensor. The overdrive drum contains 32 teeth in order to trigger the high clutch drum speed signal. The high clutch drum is connected to the sun gear of the Simpson planetary gearset and monitors the sun gear speed. The sensor has the following characteristic data:

minimum detectable speed: 50 rpm maximum detectable speed: 9000 rpm 3-2 Downshift Control:

The HCDS sensor is used to monitor the sun gear speed of the Simpson planetary gearset. With this information, the intermediate clutch (CL4) capacity during a 3-2 downshift for the transmission of FIG. 3 and the intermediate band (B2) capacity during the same downshift for the transmission of FIG. 5 is controlled. The signal is used for closed loop control of the downshifting event of the Simpson planetary gearset during a 3-2 downshift in order to accomplish a smooth OWC2 engagement.

4-2 Downshift Control:

The HCDS signal is also used to control the high clutch capacity (CL2) during a 4-2 downshift event. The high clutch drum turns in the opposite direction relative to input speed in second gear. The high clutch drum speed is zero in third gear and turns in the same direction as input speed in fourth gear. In order to use this speed signal for a 4-2 downshift, the following requirements have to be fulfilled:

(A) Determination Of The High Clutch Drum Direction During 4-2 Downshift Control A.1) During steady state conditions, the gear ratio in each gear, which is unique for each gear, is used to determine the sign of the high clutch drum speed as shown:

| SIGN DETECTION OF HIGH CLUTCH DRUM SPEED (CL2) | GEAR | GEAR RATIO |
|---|---|---|
| MINUS | 1ST | 3.25 |
| MINUS | 2ND | 2.43 |
| No Detection Required | 3RD | 1.55 |
| PLUS | 4TH | 1.0 |
| PLUS | 5TH | 0.75 |

Minus represents the turning direction opposite of input speed, and plus represents the turning direction with the input speed. The sign of the speed has to be known for closed loop 4-2 downshift control in order to initiate the closed loop downshift event.

A.2) During a 4-2 downshift, the derivative HCDS and the gear ratio can be used for sign detection as follows:

IF $$\frac{dHCDS}{dt} = (-)$$

AND

GEARRATIO < 3rd

THEN

SIGN = PLUS

IF $$\frac{dHCDS}{dt} = (+)$$

AND

GEARRATIO > 3rd

THEN

SIGN = MINUS

This detection strategy does not require a hardware modification for the trigger wheel to sense the direction of the high clutch drum. It is not relevant, however, to a 3-2 downshift because the high clutch drum speed is zero at the beginning of the downshift.

(B) Determination Of The High Clutch Drum Speed During Signal Loss Of Speed Sensor Within the speed limit band of +/−50 rpm of the speed sensor, no speed signal is available since the voltage amplitude is too small. In this case, the derivative of the HCDS can be used. The high clutch drum speed can be estimated by taking an arithmetic mean from previously collected derivative d(HCDS)/dt values during a 4-2 downshift event. The mean derivative HCDS value is then added in the discrete case to the 50 rpm threshold.

$$\text{ESTIMATED} HCDS = \text{SPEEDOFSENSOR}(50 \text{ rpm}) + \left( \text{``MEAN''} \frac{d(hCdS)}{DT} \right) * \Delta t$$

where Δt is the time interval of the calculation period representing the discrete case.

(C) Overdrive Drum Speed (ODS)

The overdrive drum speed is required to control the 2-3 upshift. It has to be derived from the available speed signals. The available speed signals are:

TSS—Turbine speed signal

OSS—Output shaft speed signal

HCDS—High clutch drum speed signal

With these three signals, any speed state of the transmission can be determined (overdrive speed states as well as speed states of the Simpson set). Determination of the sign of the high clutch drum speed is required as outlined above. With this detection method, the overdrive drum speed (ODS) can be determined for the speed calculations of the simple planetary gearset with the available speed signals. The overdrive drum speed is used as a feedback control signal for closed loop control of the downshifting of the overdrive planetary gearset during a 2-3 upshift.

Synchronous Shift Control Of A 2-3 Upshift (SWAP-SHIFT) And A 3-2/4-2 Downshift (SWAP-SHIFT) With The Improved Control System The following chart shows an overview of how the elements are shifted from the Simpson set to the overdrive planetary gearset or vice versa. It shows also a comparison between the five-speed transmissions discussed above. All shifts are synchronous shifts.

| Shifts | Base Trans. and Trans. of FIG. 5 | Trans. of FIG. 3 |
|---|---|---|
| 2–3 | Reaction to Reaction (B1/OWC1 to B2/OWC2) | SAME AS BASE TRANS. AND TRANS. OF FIG. 5 |
| 3–2 | Reaction to Reaction (B2/OWC2 to B1/OWC1) | REACTION TO REACTION CL4/OWC3/OWC4 to B1/OWC1 |
| 4–2 | Drive to Reaction (CL2/OWC2 to B1/OWC1) | SAME AS BASE TRANS. AND TRANS OF FIG. 5 |

The synchronous 2-3 upshift is a reaction-to-reaction shift. Reaction-to-reaction means in this case that a gear change from a reaction element to another reaction element takes place. The 2-3 upshift is a gear ratio change where two independent series compounded planetary gearsets are upshifted and downshifted individually.

In this case, the overdrive planetary gearset is downshifted and the Simpson planetary gearset is upshifted. The ultimate goal is to synchronize both shifting events without losing capacity of one of the affected elements at the finishing point of the upshifted Simpson gearset (see FIG. 7). The shift is initiated by engaging B2 and increasing B2 capacity for the FIG. 5 transmission or engaging CL4 and increasing CL4 capacity for the FIG. 3 transmission. This is accomplished by VFS1 control applied to the capacity elements. This reduces the OWC2 torque down to zero level. The output shaft torque follows the OWC2 torque up to the point where B2 torque, or CL4 torque, is equal to the reaction torque on OWC2. At this point, the output shaft torque follows the B2 or CL4 pressure characteristic and the OWC2 starts to rotate. The inertia phase of the upshifting event is initiated and the shift slope 1 is generated. The gradient of shift slope 1 is controlled open loop.

When a certain fraction of the upshifting event has been reached, the downshifting of the overdrive planetary gearset has to be enabled. This is accomplished by controlling the release of B1 pressure with VFS2 control. This is done in a closed loop controlled manner by applying PID control to B1 with calculated overdrive drum speed used as a feedback control signal. The overdrive drum speed target value is derived from the current gear ratio state and a desired overdrive drum speed. This ensures the proper synchronization of the upshifting of the Simpson set and the downshifting of the overdrive planetary gearset prior to completion of the entire 2-3 upshift. The 2-3 upshift control system is shown in FIG. 6.

Figure 7:
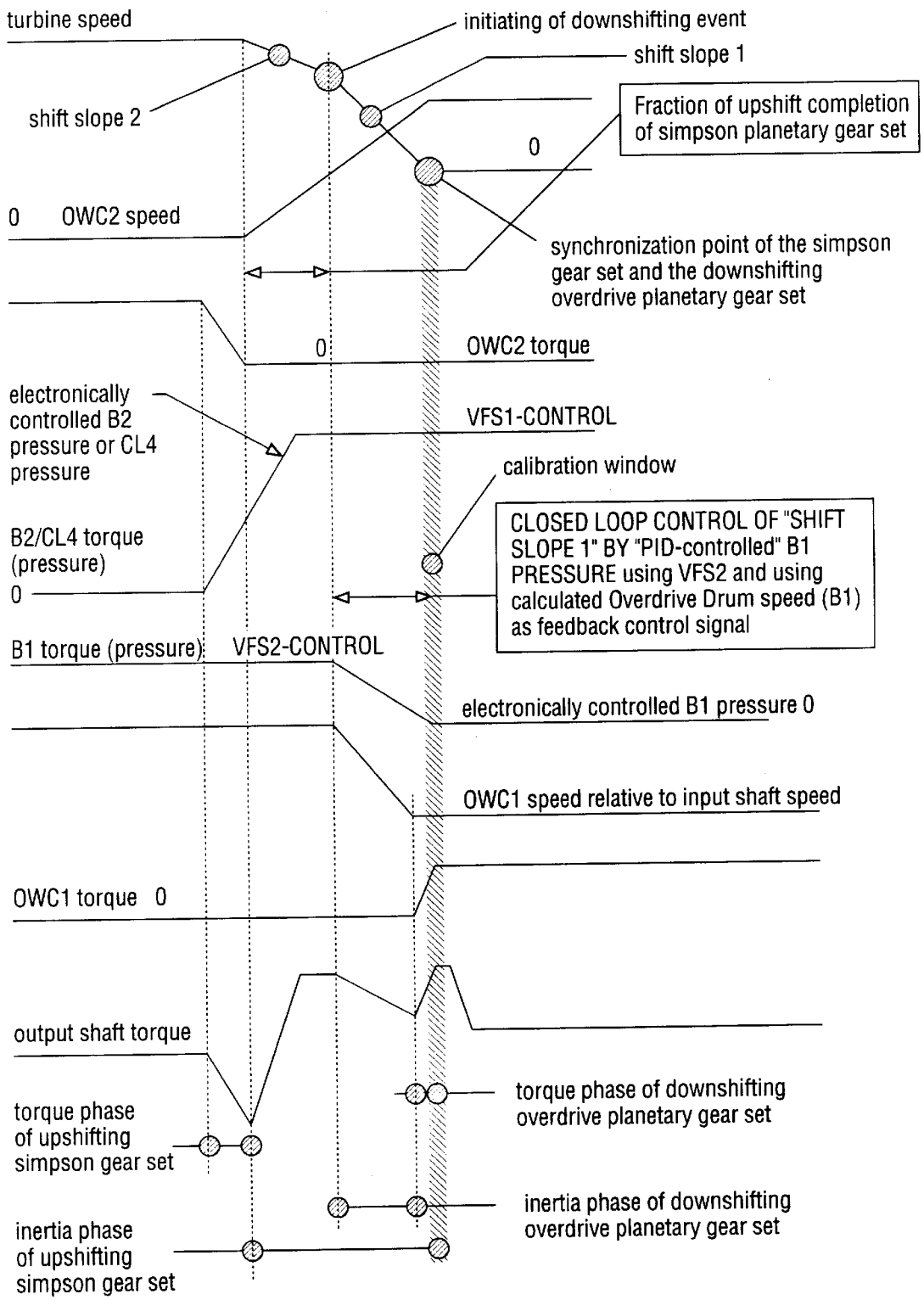
FIG. 7 is a plot of the speed and torque characteristics for the transmission elements during a 2-3 upshift of the transmission.

The output shaft torque characteristic shown in FIG. 7 follows the B1 pressure characteristic determined by the overdrive drum speed target value. A second shift slope called shift slope 2 then is started. When the inertia phase of the downshifting event is completed, OWC1 carries torque. The torque phase of the downshifting overdrive planetary gearset is then completed and synchronized with the inertia phase of the upshifting Simpson set.

The electronic control system has to satisfy the following requirements in order to accomplish a satisfactory 2-3 upshift quality:

B1 pressure has to be controlled electronically.

B2 pressure has to be controlled electronically.

B1 and B2 have to be controlled independently.

The electronically controlled B1, B2 characteristics have to be able to control capacity with respect to OWC1 and OWC2 engagement quality.

Turbine has to be monitored.

OWC1 acceleration and deceleration has to be monitored by calculating CL1 speed which is overdrive drum speed from turbine speed high clutch drum speed (CL2) and output shaft speed.

Electronically controlled upshift and downshift execution.

Each one of the above-mentioned items is critical to the upshift quality. The synchronizing of both shifting events has to be completed at the end or just before the completion of the inertia phase of the upshifting Simpson set. The engagement of OWC1 has to be controlled by accumulating the B1 capacity with VFS2 control. This requires closed loop, electronically controlled band capacity and electronically controlled upshift and downshift execution as well as monitoring of the upshifting and downshifting events. The synchronization has to take place within a defined calibration window in order to prevent a gear ratio change into the next higher gear. This can occur when the downshifting takes place too late. Similarly, when the downshifting event takes place too early, capacity loss occurs since the transmission shifts back into first gear.

A synchronous 3-2 downshift is a reaction-to-reaction shift. This is the inverse shift compared to the 2-3 upshift. The overdrive planetary gearset is upshifted, whereas the Simpson gearset is downshifted. In the case of a 3-2 downshift, B2 is released for the FIG. 5 transmission and CL4 is released for the FIG. 3 transmission. Here the upshifting of the overdrive planetary gearset has to take place first. When B1 is carrying full capacity by applying VFS2 control pressure, the downshifting of the Simpson set can be initiated. The downshift of the Simpson planetary gearset is closed loop controlled. The high clutch drum speed signal is used as a feedback control signal. PID control is used to determine B2 capacity for the FIG. 5 transmission, and CL4 capacity for the FIG. 3 transmission with VFS1 control. The acceleration of the high clutch drum speed is controlled by a target setting which minimizes the output shaft torque disturbance to accomplish a smooth OWC2 engagement.

Figure 8:
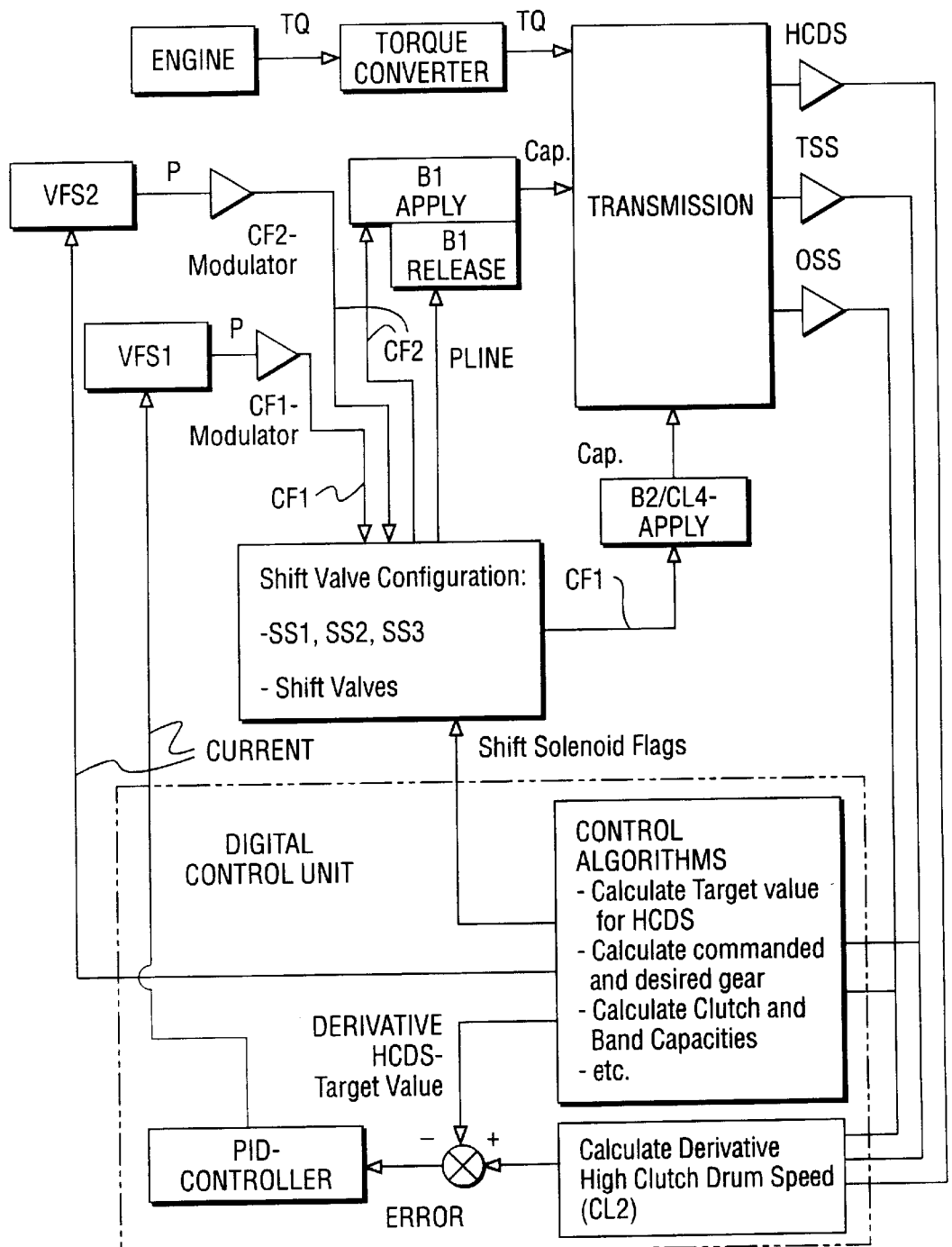
FIG. 8 is a system diagram for the 3-2 downshift control system of the invention.

This control method of controlling the downshifting of the Simpson planetary gearset is already described in the U.S. patent application Ser. No. 509,571 (2-1, 4-3 downshift control) described above. The 3-2 downshift control system is shown in general in FIG. 8.

Figure 9:
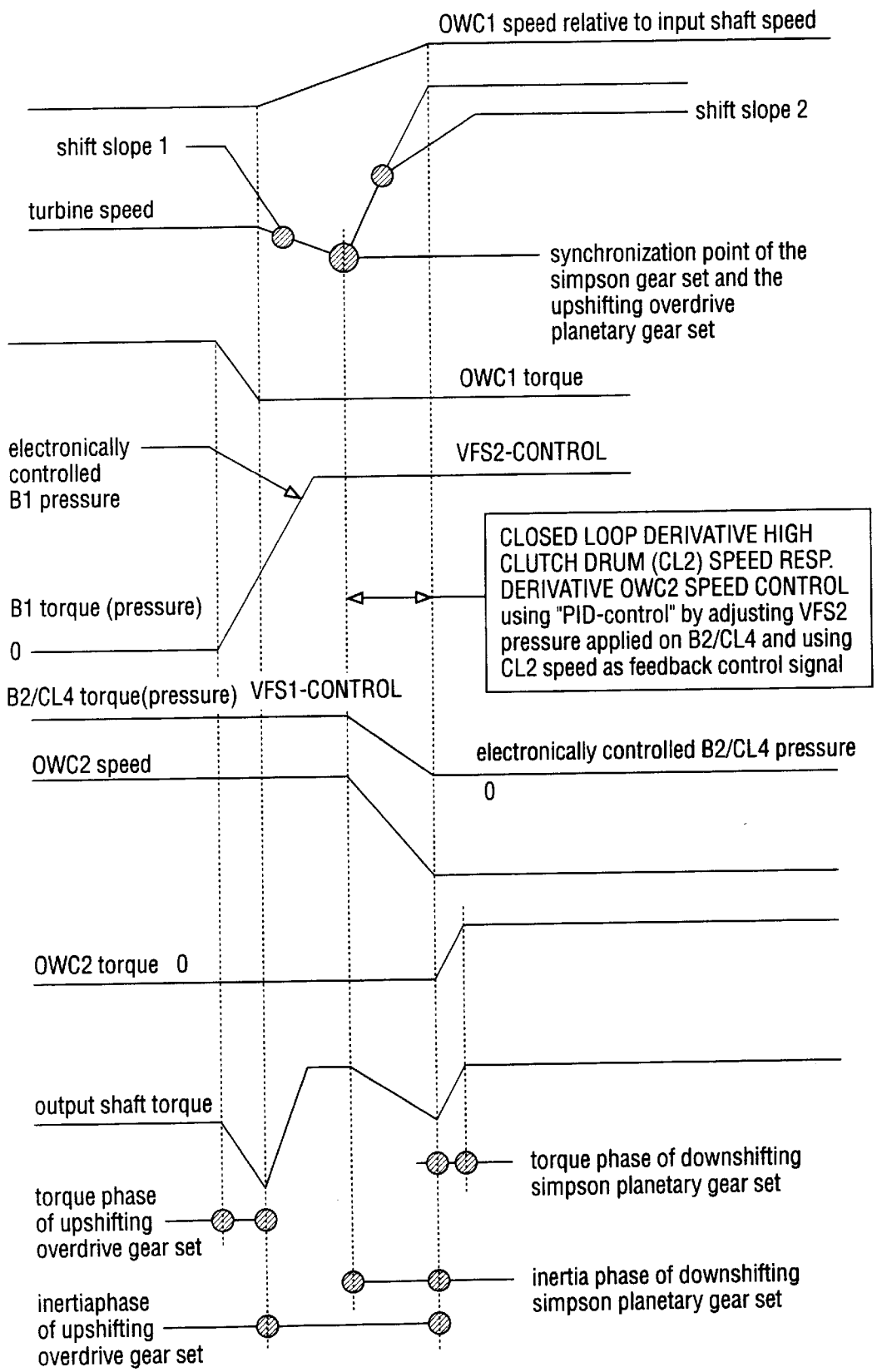
FIG. 9 is a plot of the speed and torque characteristics for the transmission elements during a 3-2 downshift of the transmission.

The graph shown in FIG. 9 illustrates the features of this shifting process. B1 pressure is increased by VFS2 control, which reduces OWC1 torque. At the point where the reaction torque of OWC1 is zero, the inertia phase of the upshifting overdrive planetary gearset is initiated, thereby generating shift slope 1. The transmission is shifted first in the next possible higher gear. The synchronization point is determined by a fraction of the overdrive upshift progression. When the synchronization point has been reached, the downshifting of the Simpson planetary gearset is initiated. B2/CL4 torque determined by VFS1 control pressure is released PID-controlled, and the OWC2 speed is reduced, initiating shift slope 2. Here again, the B2/CL4 pressure/torque characteristics must be capable of accumulating torque to ensure a smooth OWC2 engagement. The downshift is complete when OWC2 is completely transmitting torque. The B2/CL4 torque control can also be realized open loop with timer control and VFS1 control pressure ramps.

The electronic control system has to satisfy the same requirements as those listed for the 2-3 upshift control system.

The synchronous 4-2 downshift is a drive-to-reaction shift. This means a downshift is executed by releasing a rotating clutch (CL2) and engaging a reaction element (B1). Here the upshifting event of the overdrive planetary gearset must take place first, and when B1 carries full capacity by applying VFS2 control pressure, the downshift of the Simpson set can be initiated. The downshift of the Simpson planetary gearset is closed loop controlled. The high clutch drum speed signal is used as a feedback control signal. PID control is applied to adjust CL2 capacity with VFS3 control. The acceleration of the high clutch drum is controlled using a target setting which minimizes the output shaft torque disturbance to accomplish a smooth OWC2 engagement during a 4-2 downshift.

Figure 10:
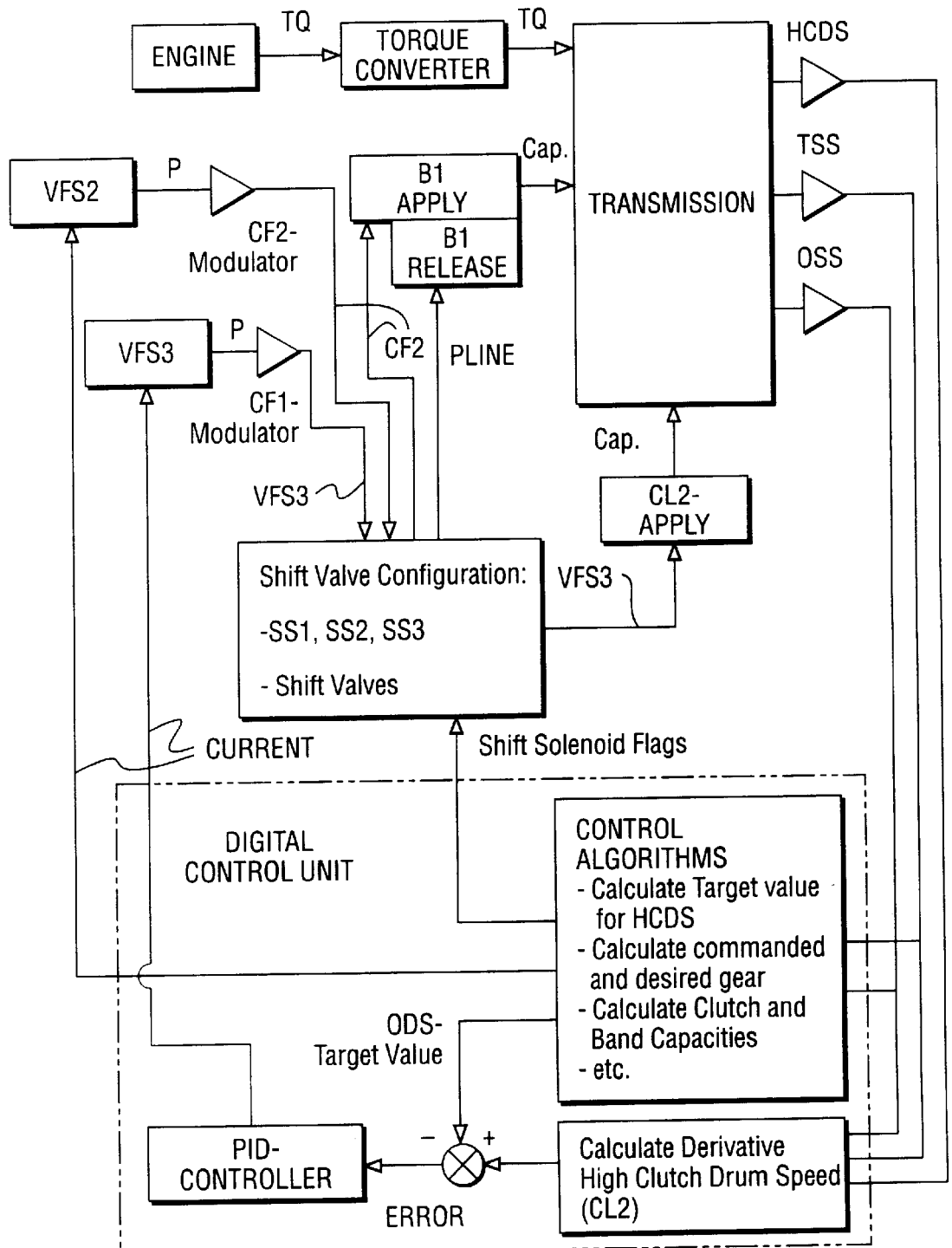
FIG. 10 is a system diagram for a 4-2 downshift of the transmission.

This control method of controlling the downshifting of the Simpson planetary gearset is described in U.S. patent application Ser. No. 08/509,571 (2-1, 4-3 downshift control). The 4-2 downshift control system is shown in general in FIG. 10.

Figure 11:
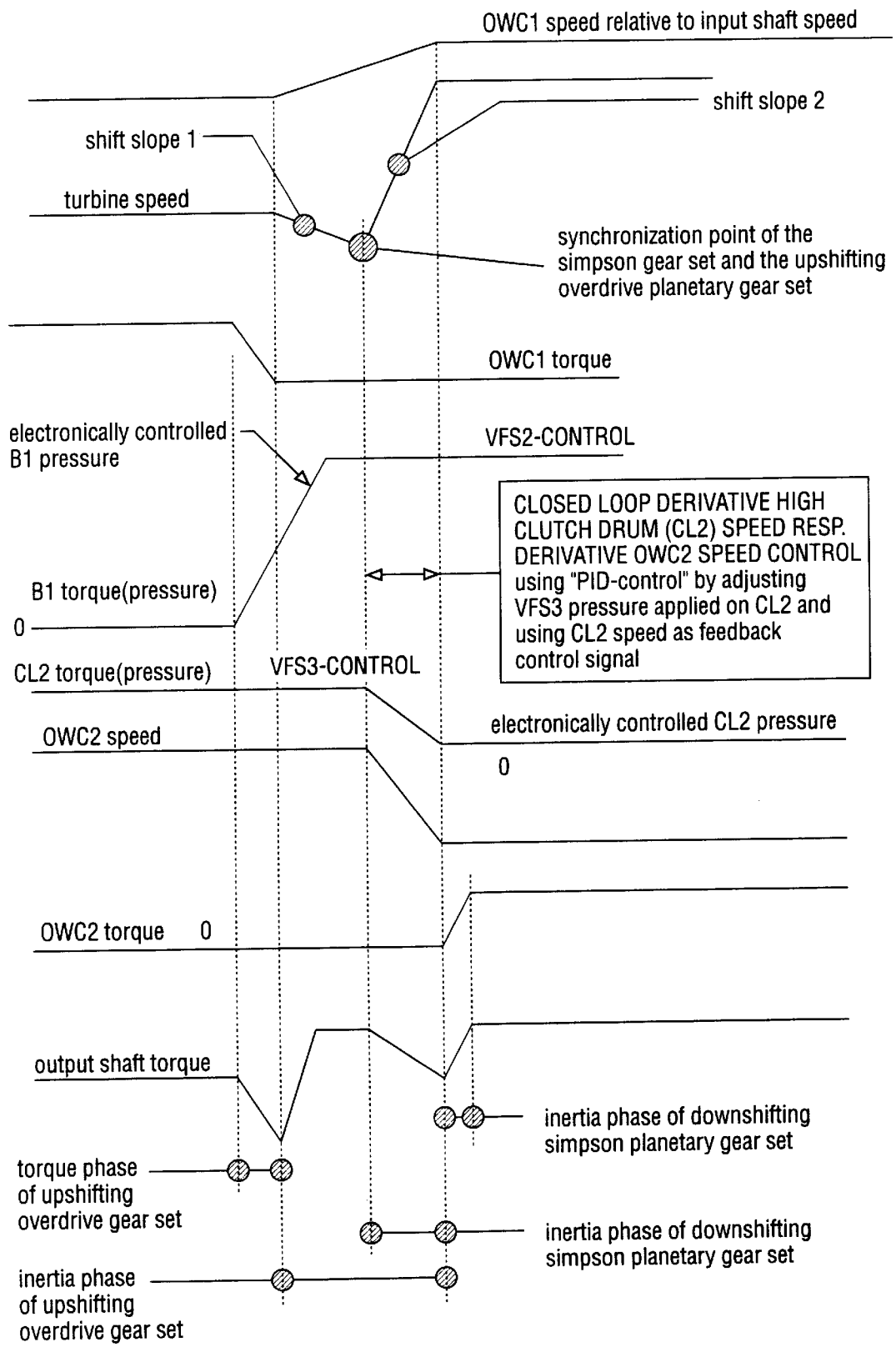
FIG. 11 is a plot of the speed and torque characteristics for the transmission elements during a 4-2 downshift.

The graph shown in FIG. 11 illustrates the shifting process. B1 pressure is increased by VFS2 control, which reduces OWC1 torque. At the point where the reaction torque of OWC1 is zero, the inertia phase of the upshifting overdrive planetary gearset is initiated, thus generating shift slope 1. The transmission shifts first to the next possible higher gear, which is in this case fourth gear plus overdrive. The synchronization point is determined by the percentage of overdrive upshift progression.

When the synchronization point has been reached, the downshifting of the Simpson planetary gearset is initiated. CL2 torque established by VFS3 control pressure is released PID-controlled, and OWC2 speed is reduced initiating the shift slope 2. Here again, the CL2 pressure/torque characteristic has to be capable of accumulating torque to ensure a smooth OWC2 engagement. The downshift is complete when OWC2 completely transmits torque. CL2 capacity control can also be executed in an open loop controlled method with timer control and VFS3 control pressure ramps.

The electronic control system has to satisfy the same requirements as those listed for the 2-3 upshift control system.

A detailed description of the control system now follows.

Important Transmission Calculations

Two important transmission calculations, which are carried over from U.S. patent application Ser. No. 08/549,438, are listed below:

PCSFTCMPT=percentage shift complete

This calculates the instantaneous percentage of the gear ratio change that is completed depending on the old gear and the commanded gear; i.e.:

$$PCSFTCMPT=(RT\_TRANS-GRRAT[GR\_OLD])/(GRRAT[GR\_CM]-GRRAT[GR\_OLD]),$$

where
RT_TRANS=current calculated gear ratio
GRRAT=gear ratio in each gear
GR_CM=commanded gear
GR_OLD=old gear
RT_TRANS=instantaneous calculated gear ratio; i.e.:

$$RT\_TRANS=NT/NO,$$

where
NT=turbine speed
NO=output shaft speed
Additional important calculations are added, which are specific for the 2-3 upshift execution and explained as follows:
RT_SFT_END=the transmission ratio where the shift solenoid stages are controlled This calculation is used to determine, based on calibration data, the transmission gear ratio threshold when the solenoid stages should be changed from the intermediate step 3 (IS3) to third gear; i.e.:

$$RT\_SFT\_END=GRRAT2+[FNPCSFT23(TP\_REL)*(GRRAT3-GRRAT2)]$$

where
GRRAT2=gear ratio in second gear
GRRAT3=gear ratio in third gear
FNPCSFT23(TP_REL)=function TP-REL versus PCSFTMPT to determine the percentage shift complete value when the solenoid stage should be changed
TP-REL=relative throttle position
RT_23_TRIG=ratio threshold when closed loop capacity control by VFS2 takes place; i.e.:

$$RT\_23\_TRG=GRRAT2+[FN23CMPF(NOBART)*(GRRAT3-GRRAT2)]$$

where
FN23CMPF=function NOBART versus PCSFTCMPT to determine the percentage shift complete value when capacity control on the overdrive band takes place
NOBART=output shaft speed
ODS_TRG=target overdrive drum speed; i.e.:

$$ODS\_TRG=NOBART*GRRAT3*FNODS\_CMPT(NOBART)$$

This calculates the overdrive drum speed target based on the output shaft speed NOBART and a function NOBART versus a multiplier, where FNODS_CMPT(NOBART)= function NOBART versus a multiplier to determine the target overdrive drum speed
ODSS_TRG_FG=target overdrive drum speed dependent on the gear ratio; i.e.:

$$ODSS\_TRG\_FG=ODSS\_TRG*[(GRRAT2-RT\_TRANS)/(GRRAT2-GRRAT3)]$$

This calculates the target overdrive drum speed as a function depending on actual gear ratio RT_TRANS. The target overdrive drum speed ODSS_TRG is increased and synchronized with the execution of the shift.

Overdrive Drum Speed Calculation (ODS)

The overdrive drum speed has to be calculated in order to execute the swap-shift in a closed loop controlled manner. For this calculation, the velocity state of the overdrive planetary gearset as well as the velocity state of the Simpson planetary gearset has to be known. This is required since both transmissions are compounded in series. During a swap-shift, the speed developed in the overdrive planetary gearset and transferred to the Simpson planetary gearset has to be known. This is accomplished as follows:

The general equation for the OD-set is as follows:

$$ODS=(\omega rod*Rrod+TSS*(Rsod+Rrod))/Rsod$$

where
ωrod=speed transferred to Simpson planetary gearset
TSS=turbine speed, which is the carrier speed of the OD planetary gearset (measured speed)
ODS=calculated overdrive drum speed
Rsod=radius of sun gear of overdrive planetary
Rrod=radius of ring gear of overdrive planetary
The component of the carrier speed delivered from the Simpson set is derived out of the measured output shaft speed (OSS) and the high clutch drum speed (HCDS).

Functional Description Of The 5R55N/W Control System For FIG. 3 Transmission And FIG. 5 Transmission The hydraulic control system as well as the control strategy now will be described. The functional description contains the 2-3 upshift control as well as the 3-2 and 4-2 downshift control system. The hydraulic control system to accomplish a 2-3 upshift as well as a 3-2/4-2 downshift consists of the following hardware components:

valve body and connecting labyrinth
3 ON/OFF solenoids for shift control (SS1, SS2, SS3)
1 ON/OFF solenoid (SS4) for CL1 control
1 main regulator valve including a booster valve
2 modulator valves (CF1 and CF2)
1 solenoid pressure regulator
5 shift valves
3 variable force solenoids (VFS1, VFS2, VFS3)
1 separator plate with connecting holes
springs and sleeves
All of these components are used by the hydraulic control system to execute either a 2-3 upshift or a 3-2/4-2 downshift.

Pressure Buildup System

The pressure buildup system is similar to the pressure buildup system disclosed in U.S. application Ser. No. 08/549,438, except two additional variable force solenoids and one clutch pressure modulator forward, are added to enhance the independent capacity control of B1 versus B2/CL4 and CL2.

Pressure Systems Used For 2-3/3-2/4-2 Shift Control Is As Follows:

The hydraulic control system consists of three different pressure systems:

The electronic pressure control system contains three variable force solenoids:

EPC1 to control B2 for the FIG. 5 transmission and CL4 for the FIG. 3 transmission
EPC2 to control B1
EPC3 to control CL2
Pressures are generated by the manual valve:
main regulator valve system (PL)
SOL1 regulator valve system
clutch pressure modulator forward 1 (CF1) to supply system pressure for B2 or CL4
clutch pressure modulator forward 2 (CF2) to supply system pressure for B1
VFS3 or EPC3 is directly connected to CL2

2-3 Upshift System (SWAP-SHIFT)—Hydraulic Control System

The hydraulic control system to execute a 2-3 upshift is shown in FIGS. 22a-a, 22a-b, 22b-a, 22b-b, 22c-a and 22c-b. The solenoid stages needed to execute a 2-3 upshift are shown in the table below along with the pressures applied on each affected element. During the transition from second to third gear, an intermediate step 3 is introduced which initiates the upshifting event of the Simpson planetary gearset.

| | SS1 | SS2 | SS3 | B1 | OW C1 | CL4 for FIG. 3 Trans. | B2 for FIG. 5 Trans. | OWC2 |
|---|---|---|---|---|---|---|---|---|
| GEAR | | | | | | | | |
| 2nd | ON | OFF | ON | | | | | |
| Intermediate step 3 (IS3) | ON | ON | ON | | | | | |
| 3rd | ON | ON | OFF | | | | | |

Shaded area = Element is engaged
Light area = Element is disengaged 2-3 Upshift Sequence: Second Gear Intermediate Step 3—Third Gear With the second gear solenoid stage (see FIGS. 22a-a and 22a-b), the overdrive planetary gearset is upshifted in addition to the first gear. With shift solenoid 3 (SS3) energized, the overdrive control valve in bore 215 moves into upshift position. This disconnects line pressure from the overdrive servo release (OSR) side and connects the OSR side with the OSA/OSR exhaust port. The overdrive servo apply side is connected with CF2 pressure produced by the clutch pressure modulator forward 2. This additional CF2 modulator produces the capability of independent capacity control of the overdrive band by adjusting the overdrive servo apply pressure with EPC2 pressure produced by VFS2. This will be important when the swap-shift is initiated. The intermediate servo apply (B2) side is exhausted over the shift valve in bore 205 into the ISA/IC/EX port. This system is used for the transmission of FIG. 5. For the transmission of FIG. 3, orifice 180 of the separator plate is opened and orifice 181 is closed. This connects CL4 to the CF1 pressure circuit. The intermediate servo release side is applied with line pressure over the shift valve in bore 213, which is in downshift position since SS2 is exhausted.

When a 2-3 upshift is initiated, shift solenoid 2(SS2) is energized. This stage is called the "intermediate step 3" as shown in the above table. With the energized shift solenoid 2, shift valve in bore 213 moves into upshift position and the shift valve in bore 205 moves into downshift position since SS2 pressure is applied on the backside of that valve. This is shown in FIG. 22a-a. The upshifted valve in bore 213 connects the intermediate servo release side (ISR) with the HC apply circuit which is again connected to the HC/EX port in bore 212. The shift valve in bore 205 connects CF1 pressure, controlled by EPC1 and by VFS1, to the intermediate servo apply side (B1) or intermediate clutch apply side (CL4). The intermediate servo or the intermediate clutch starts to engage. This initiates the 2-3 upshift by upshifting the simpson planetary gearset as explained earlier.

Considering the fact that both elements (the overdrive servo and the intermediate servo or intermediate clutch) are applied with two independent CF pressure systems (CF1 and CF2), independent capacity control is available. When the intermediate band (B2) or intermediate clutch (CL4) transmits full capacity, the reaction torque of OWC2 is zero and the Simpson planetary gearset starts to upshift. The downshifting of the overdrive planetary gearset is closed loop controlled by adjusting the CF2 pressure on the overdrive servo apply side. This controls the overdrive band capacity and makes a control of the amount of torque applied to OWC1 possible. By monitoring turbine speed (TS), output shaft speed (OSS) and high clutch drum speed (HCDS), the upshifting of the Simpson set and the downshifting of the overdrive planetary gearset can be synchronized using closed loop within a defined calibration window. The coast clutch CL1 is first of all overridden with shift solenoid 3 (SS3) pressure to ensure CL1 is exhausted when B1 is applied; and, secondly, CL1 is controlled separately by shift solenoid 4 (SS4) and the coast clutch control valve in bore 215.

At the point where sufficient overdrive band capacity control has been achieved and the transmission approaches the third gear ratio, the transmission can then shift into third gear completely. Shift solenoid 3 (SS3) is now de-energized and the overdrive control valve in bore 215 moves into downshift position. This is shown in FIG. 22c-a. With the downshifted valve in bore 215, the overdrive servo release side is connected with line pressure and the overdrive servo apply side is exhausted into the OSA/OSR/EX port. The line pressure fully strokes the overdrive band and the downshifting of the overdrive planetary gearset is completed. The 2-3 upshift is complete.

Control Strategy For 2-3 Upshift

In order to describe the complete control system including the control strategy during the shift interval, the following parameters during a 2-3 upshift event have to be considered:

Control strategy:
GR_DS desired gear
GR_CM commanded gear
EPC1 control pressure register
EPC2 control pressure register
FLG_SS_1 shift solenoid flag 1
FLG_SS_2 shift solenoid flag 2
FLG_SS_3 shift solenoid flag 3
RT_TRANS calculated gear ratio
TM_23_STRT timer to enable start duty cycle
calculated ODS overdrive drum speed
N engine speed
NT turbine speed Hydraulic and transmission parameters:
SS1 shift solenoid pressure 1
SS2 shift solenoid pressure 2
SS3 shift solenoid pressure 3
OSA overdrive servo apply pressure
OSR overdrive servo release pressure
ISA intermediate servo apply pressure
CL4 intermediate clutch pressure
HCDS high clutch drum speed
Output shaft speed
Turbine speed
Output shaft torque The execution of a 2-3 upshift is a sequence of events and control actions with interaction between the control strategy and the control hardware. The timing diagram shown in FIGS. 14a and 14b represents the execution of a 2-3 upshift in the shift interval. Control strategy as well as the hardware executing actions are illustrated in this timing diagram.

t1:
Control Strategy:
The driver desires a 2-3 upshift, which is triggered by the control strategy based on a function of vehicle speed versus throttle position. The GR_DS is changed from 2nd gear to 3rd gear and the shift verification timer TM_VER_SFT is loaded. The dynamic EPC1 value is added for controlling the B2 capacity in third gear.

Control Hardware:
The EPC1 values are raised according to the commanded EPC1 value and so is the CF1 modulator pressure which is applied on B2 for the transmission of FIG. 5 and on CL4 for the transmission of FIG. 3.

t2:

Control Strategy:

The shift verification timer TM_VER_SFT is expired and the gear commanded register GR_CM is changed from 2nd to 3rd gear. An initial EPC2 value is loaded into the EPC2 register. This initial EPC2 value is required to reduce the surplus capacity on the overdrive band (B1) apply side in order to accelerate the initiation of closed loop B1-capacity control. In addition the 2-3 upshift start timer TM_23_STRT is loaded. This timer is required to initiate a "start" EPC2 value independent of the expiration of the shift verification timer TM_VER_SFT. When this timer is expired, a start EPC2 value is set prior to closed loop capacity control of the overdrive band (B1). The TM_23_STRT timer is a function of transmission oil temperature since the applied pressure varies with EPC2 and temperature.

At this point the following important calibration parameter are calculated:

ODS_TRG=NOBART*GRAT3*FNODS_CMPT(NOBART)RT_
SFT_END=GRRAT2+[FNPCSFT23(TP_REL)*(GRRAT3-
GRRAT2)]RT_23_TRIG=GRRAT2+
[FN23CMPF(NOBART)*(GRRAT3-GRRAT2)]

The overdrive drum speed target value ODS_TRG is calculated based on a function FNODS_CMPT, which contains a multiplier of overdrive drum speed as a function of output shaft speed NOBART. This is calculated based on the actual output shaft speed, times the gear ratio after completion of the shift (GRRAT3).

Further, the gear ratio threshold value RT_23_TRIG, in order to trigger closed loop control on the overdrive band (B1), is calculated based on a function FN23CMPF, percentage shift complete PCSFTCMPT versus output shaft speed NOBART.

A further gear ratio threshold value RT_SFT_END is calculated to determine the end of closed loop capacity control. These values are compared later with the continuously calculated RT_TRANS and are used to determine the ratio band of closed loop upshift control. Shift solenoid flag 2 FLG_SS_2 is set to 1 and the EPC1-RMP timer is loaded. The EPC1 ramp is now executed.

Control Hardware:

Shift solenoid 2 is energized and the shift valve in bore 213 moves into upshift position and the shift valve in bore 205 moves into downshift position. This disconnects the intermediate servo release side from line pressure and exhausts the release side to the HC-EX exhaust port in bore 212. CF1 pressure produced from the clutch pressure modulator forward 1 is applied to the intermediate servo apply side B2 for the transmission of FIG. 5 and to the intermediate clutch CL4 for the transmission of FIG. 3. The characteristic of this forward modulator CF1 allows capacity control from 0 to maximum capacity. The intermediate band or the intermediate clutch engages and takes the torque of the sun gear from the Simpson planetary gearset. At the same time the reaction torque on OWC2 is reduced. The output shaft torque follows first the reaction torque characteristic from OWC2. The torque phase of the 2-3 swap-shift is initiated. The CF2 pressure level on the overdrive band is set to the "START" level, which still satisfies B1 static capacity.

t3:

Control Strategy:

The start timer TM_23_STRT is expired. A "Hold" EPC2 value is calculated based on input torque imparted to the OD-set, which marginally holds the B1 capacity. This is required to set the B1 capacity to a value close to closed loop control settings. This is calculated as follows:

$$EPC2\_HOLD = \frac{TQ\_TOTAL * RATIO\_B1}{GAIN\_B1 * GAIN\_CF2}$$

EPC2_HOLD=Hold EPC2 pressure to maintain marginally B1 capacity

TQ_TOTAL=Input torque into OD-Set

TQ_TOTAL=TQ_ENG+TQ_I$\alpha$_SIMP+TQ_I$\alpha$_OD

TQ_ENG=Engine Torque

TQ_I$\alpha$_SIMP=Reaction inertia torque imparted from Simpson set

TQ_I$\alpha$_OD=Inertia torque of OD_set

GAIN_B1=B1 capacity gain

GAIN_CF2=Pressure amplification of CF2 modulator valve

RATIO_B1=Ratio of B1 torque to input torque

The EPC2_HOLD components will ensure a smooth initiation of the overdrive brake band break-away. When the inertia phase of the Simpson set is started, the inertia torque of the Simpson set is transferred to the OD_set triggering the downshifting of the OD-set.

Control Hardware:

The CF2 pressure is decreased on the overdrive servo apply side (B1) since EPC2 pressure has been decreased to a "HOLD" level, which marginally holds B1 capacity. The overdrive band capacity can be manipulated by the EPC2 settings and overdrive drum slip can be introduced prior to closed loop control of the overdrive band capacity. The torque phase of the upshifting Simpson set is now fully active and the reaction torque on OWC2 is decreased, which also decreases the output shaft torque.

t4:

Control Strategy:

The RT_TRANS value is calculated continuously based on turbine speed (TS) and output shaft speed (OSS). The RT_TRANS value starts to decrease since the inertia phase of the 2-3 upshift is started and the torque phase is completed. The shift starts with a shift slope 1, which is entirely dependent on the CF1 pressure settings and the commanded EPC1 ramp.

Control Hardware:

The torque phase of the upshifting event of the Simpson planetary gearset is completed and the output shaft torque is completely dependent on the applied capacity on the intermediate band B2 for the transmission of FIG. 5 and CL4 for the transmission of FIG. 3. The reaction torque on one-way clutch 2 (OWC2) is zero and the high clutch drum speed (HCDS, CL2) starts to decelerate. The output shaft torque is reversed since the reaction torque is zero and ISA pressure is increasing capacity. The overdrive drum speed still stays at zero speed.

t5:

Control Strategy:

At this point the RT_TRANS value is smaller than the RT_23_TRIG calibration value. The closed loop control of the overdrive band capacity is now executed. The required control strategy is illustrated in the following control block diagram (see FIG. 12).

A PID-Controller is used in this application to control with capacity manipulation the overdrive drum speed. The overdrive drum speed is calculated from HCDS, TSS and OSS. For this calculation, the following actions must be carried out:

Determine the sign of HCDS (as outlined above under "Determination of High Clutch Drum Direction")

Calculate ODS from HCDS, TSS and OSS (shown above under "Overdrive Drum Speed Calculation")

The calculated overdrive drum speed is then used as the feedback control value to determine the error and the control effort.

The target overdrive drum speed is calculated as follows:

The ODS_TRG value is converted into a target value, which is synchronized with the continuation of the shifting event. The overdrive drum speed target value is directly connected to the RT_TRANS calculation. The overdrive drum target speed value is then decreased from the initial value calculated previously by following calculation:

ODSS_TRG_FG=ODS_TRG*(GRRAT2-RT_TRANS)/(GRRAT2-GRRAT3)

where ODDS_TRG_FG is the overdrive drum speed target value depending on the actual gear ratio.

The error of overdrive drum speed is calculated as follows:

e_ODS=Calculated ODS-ODSS_TRG_FG

In order to calculate the PID controller output, the errors for two previous calculation loops are needed. They are as follows:

e_ODS_T0=error at the current calculation loop
e_ODS_T1=error one calculation loop back
e_ODS_T2=error two calculation loops back The PID controller output is now calculated as follows:

ΔP_PID=Kc*(Kp*(e_ODS_T0-e_ODS_T1)+Ki*e_ODS_T0+kd*(e_ODS_T0-2*e_ODS_T1+e_ODS_T2))

This is the velocity algorithm which is used when the actuator, which is in this case a variable force solenoid, has an integrative behavior.

Kp=proportional gain
Ki=integral gain
Kd=derivative gain
Kc=overall gain

The controller gains should be selectable from a table of throttle position (TP) versus vehicle speed (VS). This is required since the 2-3 upshifts occur at different throttle positions and vehicle speeds.

The commanded VFS2 pressure EPC2 is now calculated. EPC2 is the control pressure to manipulate the overdrive band capacity (B1). When the PID control is initiated, the following calculation is executed:

EPC2=EPC_HOLD

EPC2=(EPC2+ΔP_PID+Δ_FF)*FN(TOT)

ΔP_PID=PID portion of EPC2 pressure
ΔP_FF=Feed forward term which is used to add pressure when a sudden change in input torque is taking place; i.e.:

$$\Delta P\_FF = \frac{\Delta TQ\_TRANS * RATIO\_B1}{Gain\_B1 * Gain\_CF2}$$

ΔTQ_TRANS=Delta input torque generated by sudden throttle position changes
FN(TOT)=Temperature compensation of EPC2 pressure The EPC2 calculation takes the error between the actual overdrive drum speed ODS and the target overdrive drum speed into account and converts the calculated error in EPC2 values. This adjusts the overdrive band capacity accordingly. Based on the capacity control on the overdrive band a 'shift slope 2' is initiated, which starts the downshifting event of the overdrive planetary gearset.

Control Hardware:

The overdrive servo apply pressure is either increased or decreased based on the EPC2 value. A second shift slope, as mentioned earlier, is introduced due to overdrive band capacity control and the additional overdrive band slip. The overdrive drum speed starts to follow the target value ODS_TRG_FG. Independent control of the overdrive planetary gearset is initiated. The output shaft torque decreases since the capacity on the overdrive band is decreased as well.

t6:

Control Strategy:

At this point, the RT_TRANS value is smaller than the second ratio threshold RT_SFT_END. At this point in time, the closed loop control of the overdrive band is terminated by setting the shift solenoid flag 3 FLG_SS_3 to 0. The EPC2 calculations are terminated and EPC2 register is set to zero. This is the synchronization point between the downshifting of the overdrive planetary gearset and the upshifting of the Simpson gearset.

Control Hardware:

Shift solenoid 3(SS3) is de-energized and the overdrive control valve in bore 215 moves into downshift position. The CF2 pressure is disconnected from the overdrive servo apply side and line pressure is connected to the overdrive servo release side. This reduces the overdrive band capacity completely as OWC1 takes the remaining inertia and starts to transmit full torque. From point t5 to t6, closed loop downshift accumulation takes place for the overdrive planetary gearset in order to accomplish a smooth one-way clutch engagement of OWC1. This accumulation phase is also used to synchronize the downshifting of the overdrive planetary gearset and the upshifting of the Simpson set using feedback control with overdrive drum speed. Beyond timing point $t_6$, the overdrive servo release pressure is line pressure. The output shaft torque characteristically shows another negative slope since the overdrive band has zero capacity. Output shaft torque signature of the overdrive planetary gearset and the Simpson planetary gearset add up to the summed output shaft torque signature.

t7:

Control Strategy:

The EPC1_RMP timer has expired and the EPC1 ramp is terminated.

Control Hardware:

The overdrive drum has reached engine speed and the OWC1 is fully engaged. The high clutch drum speed (HCDS) is at zero speed. The output shaft torque characteristic is now reversed again since OWC1 carries full torque. The torque phase of the downshifting event is initiated and the 2-3 upshift is complete.

Figure 15:
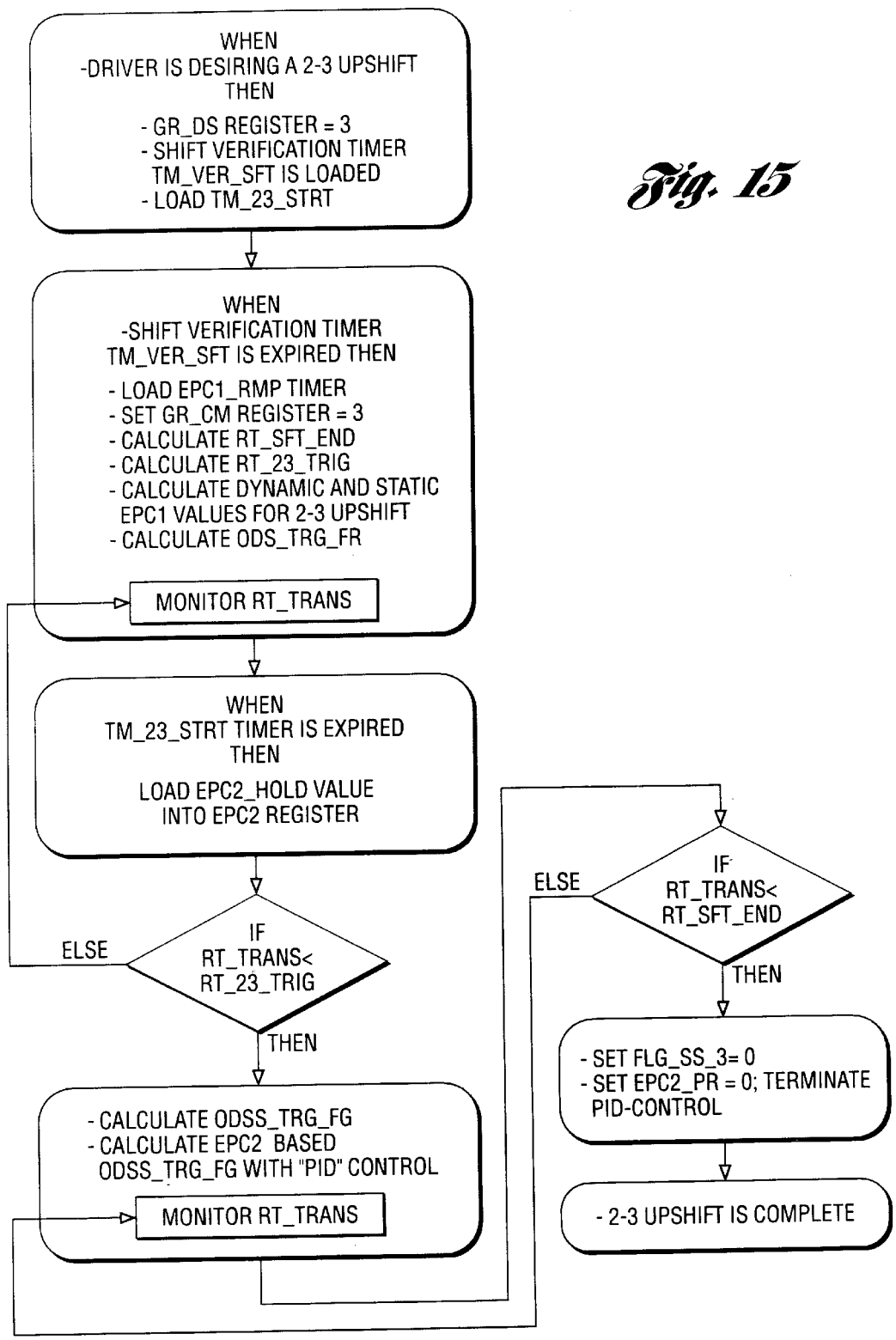
FIG. 15 is a flowchart illustrating the electronic control strategy for a 2-3 upshift.

The flow diagram shown in FIG. 15 shows again the control strategy during a 2-3 upshift in a condensed manner. It helps to understand the above explained 2-3 upshift execution during the shift interval:

3-2/4-2 Downshift System

The 3-2/4-2 downshift control system is the inverse of the 2-3 upshift event. Here the overdrive planetary gearset is upshifted and the Simpson set is downshifted in a synchronized manner. During a 3-2 downshift, the Simpson set is downshifted by releasing the intermediate band (B2) for the transmission of FIG. 5 and releasing the intermediate clutch (CL4) for the transmission of FIG. 3 in a controlled manner.

OWC2 engages after the inertia phase of the downshifting Simpson set. During a 4-2 downshift, the Simpson set is downshifted by a controlled release of the high clutch (CL2).

The solenoid stages along with the engagement state of the elements is shown below:

|  | SS1 | SS2 | SS3 | B1 | OWC1 | CL4 for trans. shown in FIG. 3 | B2 for trans. shown in FIG. 5 | OWC2 | CL2 |
|---|---|---|---|---|---|---|---|---|---|
| GEAR |  |  |  |  |  |  |  |  |  |
| 2nd | ON | OFF | ON |  |  |  |  |  |  |
| Intermediate step 3 (1S3) | ON | ON | ON |  |  |  |  |  |  |
| 3rd | ON | ON | OFF |  |  |  |  |  |  |
| 4th | OFF | OFF | OFF |  |  | APPLIED OR RELEASED |  |  |  |
| 4th plus overdrive (5th) | OFF | OFF | ON |  |  | APPLIED OR RELEASED |  |  |  |

Shaded area = Element is engaged
Light area = Element is disengaged

The shift sequence for a 3-2 downshift is as follows:
3-2 downshift sequence→3rd gear—Intermediate step 3—2nd gear The 4-2 downshift can be executed either in sequence, which means 4-3-2, or directly as a 4-2 downshift. The shift sequence is shown with the following:

4-3-2 downshift sequence→4th gear—3rd gear—Intermediate step 3—2nd gear 4-2 downshift sequence→4th gear—4th gear plus overdrive—2nd gear This description covers the 4-2 downshift and the 3-2 downshift only. The sequenced 4-3-2 downshift is basically the execution of a 4-3 downshift following 3-2 (swap-shift) downshift. During the direct 4-2 downshift, the control hardware uses the "4th gear plus overdrive" state (5th gear) as an intermediate step to initiate the 4-2 downshift as shown in the above table.

3-2 Downshift:

FIGS. 22c-b, 22c-a; 22b-b, 22b-a, 22a-b and 22a-a show the 3-2 downshift hydraulic control system. The solenoid stage in third gear is SS2=ON, SS1=ON and SS3=OFF. The intermediate servo/band(B2) for the transmission of FIG. 5 and the intermediate clutch (CL4) for the transmission of FIG. 3 are engaged by the upshifted shift valve in bore 205 energized by shift solenoid 2 on the back side of the valve with CF1 modulator pressure. The high clutch (CL2) is exhausted over the shift valve in bore 212 into the HC/EX port. When the 3-2 downshift is initiated, the shift solenoid 3 is energized and the overdrive control valve in bore 215 moves into upshift position. The transmission is now in the intermediate step 3 shown in FIGS. 22b-a and 22b-b. The overdrive servo release circuit was previously applied with line pressure and is now exhausted over the exhaust port OSA/OSR/EX in bore 215. The overdrive servo apply side is applied with the CF2-modulator pressure produced by the clutch pressure modulator valve 2 applied with VFS2 output pressure. The overdrive servo is applied and initiates the 3-2 downshift by upshifting the overdrive planetary gearset. When a certain fraction of gear ratio has been monitored by the control strategy, the transmission is commanded to reduce and control the capacity of B2/CL4. The downshifting of the Simpson planetary gearset is now initiated and controlled either open loop or closed loop to accomplish a smooth OWC2 engagement. The high clutch drum speed (CL2) is now used as a feedback control signal for open and closed loop control.

When a certain fraction of monitored percentage shift complete has been reached, shift solenoid 2 (SS2) is de-energized and shift solenoid 3 is energized. This moves the shift valve in bore 205 into upshift position (see FIGS. 22a-a and 22a-b) and the intermediate servo apply pressure or the intermediate clutch pressure is exhausted over the ISA/IC/EX port located shift valve in bore 205. With the downshifted valve in bore 213, line pressure is connected to the intermediate servo release side, thus reducing B1 capacity down to zero. The shift solenoid 1 always stays on during the 3-2 downshift and keeps the high clutch always exhausted over the shift valve in bore 212. The 3-2 downshift is now complete.

4-2 Downshift:

The solenoid stage in 4th gear is SS1=OFF; SS2=OFF and SS3=OFF. With shift solenoid 1 turned off, the shift valve in bore 212 is in downshift position and EPC3 pressure is applied on the high clutch. This can be seen in FIGS. 22e-a and 22e-b. In order to initiate a direct 4-2 downshift, the overdrive planetary gearset has to be upshifted. This can only be accomplished by energizing shift solenoid 3 first. With shift solenoid 3 turned on, the transmission is in the "4th gear plus overdrive" (5th gear) solenoid stage. When shift solenoid 3 is energized, the overdrive servo release pressure is exhausted over the overdrive servo control valve in bore 215 into the OSA/OSR/EX port as shown in FIGS. 22e-a and 22e-b. The overdrive servo apply is engaged with CF2 pressure and the overdrive band engages. This initiates the 4-2 downshift. When the control strategy has monitored a certain fraction of gear ratio, the downshifting event of the Simpson planetary gearset is initiated. This is done by controlling the high clutch capacity by VFS3 in a closed loop or open loop manner in order to accomplish a smooth OWC2 engagement. The feedback control signal is the high clutch drum speed signal.

Shift solenoid 2 always stays energized. When a certain percentage of shift completion has been reached as it is being controlled by VFS3, the 2nd gear solenoid stage will be commanded. In this case, shift solenoid 1 is energized (see FIGS. 22a-a and 22a-b) which exhausts the high clutch apply pressure over the upshifted valve in bore 212 into the HC/EX port. The intermediate servo release pressure is applied with line pressure over the downshifted valve in bore 213 preventing the intermediate servo to stroke during 4-2 downshift control since VFS2 has to be kept high to maintain line pressure settings. The rear one-way clutch OWC2 engages and the 4-2 downshift is now complete.

Control Strategy For 3-2/4-2 Downshift

In order to describe the complete control system, including the control strategy, the following parameters during a 3-2/4-2 downshift event have to be considered during the shift interval:

Control Strategy:
GR_DS desired gear
GR_CM commanded gear
EPC1 control pressure register
EPC2 control pressure register
EPC3 control pressure register
FLG_SS_1 shift solenoid flag 1
FLG_SS_2 shift solenoid flag 2
FLG_SS_3 shift solenoid flag 3
HCDS High clutch drum speed
N engine speed
NT turbine speed
Control Timer
ODS Overdrive Drum Speed (calculated from control strategy)
RT_TRANS Transmission gear ratio)
Hydraulic And Transmission Parameters:
SS1 shift solenoid pressure 1
SS1 shift solenoid pressure 2
SS1 shift solenoid pressure 3
OSA overdrive servo apply pressure
OSR overdrive servo release pressure
ISA intermediate servo apply pressure resp. Intermediate Clutch (CL4) pressure
Torque signature OD-set
Torque signature of SIMPSON-set
Output shaft torque The graph in FIGS. 13a and 13b shows the control strategy along with the control hardware during a 3-2/4-2 downshift interval. This illustrates the interactive functions of hardware and control strategy during the 3-2/4-2 downshift event.

3-2 Downshift t1:

Control Strategy:

The driver desires a 3-2 downshift, which is triggered by the control strategy based on a function of vehicle speed versus throttle position. GR_DS is changed from 3rd to 2nd gear and the shift verification timer TM_VER_SFT is loaded. The dynamic EPC2 value is added for second gear to apply B1-capacity.

Control Hardware:

The EPC2 values are raised according to the commanded EPC2 values.

t2:

Control Strategy:

The shift verification timer TM_VER_SFT is expired and the gear commanded register GR_CM is changed from 3rd to 2nd gear. A 3-2/4-2 control timer is loaded. At the same time, overdrive drum speed and turbine speed are monitored to sense the start of the downshifting event. Those two signals are also used to determine the initiation of the closed loop controlled portion of the downshift. The control timer is required in order to control the 3-2/4-2 downshift independent of the speed signals. This is necessary in case the speed signals are not available. Shift solenoid flag 3 FLG_SS_3 is set to 1 and the EPC2_RMP timer is loaded. The EPC2 ramp is now executed.

A "Hold" EPC1 value is calculated based on input torque transferred to the Simpson set, which marginally holds B2-Capacity. This is required to set the B2 capacity for the FIG. 5 transmission or the CL4 capacity for the FIG. 3 transmission to a value close to closed loop control settings. This is calculated as follows:

$$EPC1\_HOLD = \frac{TQ\_SIMP*RATIO\_B2(RATIO\_CL4)}{GAIN\_B2(GAIN\_CL4)*GAIN\_CF1}$$

or $$EPC1_{HOLD} = \frac{TQSIMP*RATIO\ CL4}{GAIN_{CL4}*GAIN_{CA}}$$

EPC1_HOLD=Hold EPC1 pressure to maintain marginally B2/CL4 capacity
TQ_SIMP=Input torque into SIMPSON set
GAIN_B2(GAIN_CL4)=B2/CL4 capacity gain
GAIN_CF1=Pressure amplification of CF1 modulator valve
RATIO_B2(RATIO_CL4)=Ratio of B2 torque/CL4 torque to input torque Control Hardware:

Shift solenoid 3 is energized and the overdrive control valve in bore 215 moves into upshift position. CF2-pressure produced from the clutch pressure modulator forward 2 is applied to the overdrive servo apply side. The overdrive servo release side is disconnected from line pressure and exhausted into the OSA/OSR EX in bore 215 and the overdrive servo starts to stroke. The transmission is in intermediate step 3 stage shown in FIG. 22b-a and 22b-b.

The CF1 pressure is decreased on the intermediate servo apply side (B2) or on the Intermediate clutch apply side (CL4) since EPC1 pressure has been decreased to a "HOLD" level, which marginally holds B2/CL4 capacity. The intermediate band capacity or intermediate clutch capacity can be manipulated by the EPC1 settings and high clutch (CL2) drum slip can be introduced prior to closed loop control of the intermediate band or intermediate clutch capacity.

t3:

Control Strategy:

Overdrive drum speed (ODS) and turbine speed (NT) are monitored.

Control Hardware:

The overdrive servo (B1) engages with CF2 pressure applied. The characteristic of this forward modulator 2 allows capacity control from 0 to maximum capacity. The overdrive band engages and takes the torque of the sun gear from the overdrive planetary gearset. At the same time, the reaction torque on OWC1 relative to the input torque is reduced. The output shaft torque follows first the reaction torque characteristic from OWC1 shown on the torque signature of the OD-set in FIGS. 13a and 13b. The torque phase of the 3-2 swap-shift is initiated with the upshifting of the overdrive planetary gearset.

t4:

Control Strategy:

The turbine speed value (NT) and the overdrive drum speed value (ODS) start to decrease since the inertia phase of the 3-2 shift is started and the torque phase is completed.

Both speed signals are still being monitored where the overdrive drum speed is calculated from the HCDS, TSS and OSS. The shift starts with a 'shift slope 1', which is entirely dependent on the CF2 pressure settings applied on the overdrive band according to the commanded EPC2 ramp.

Control Hardware:

The torque phase of the upshifting event from the overdrive planetary gearset is completed and the output shaft torque is completely dependent on the applied capacity of the overdrive band. The reaction torque on one-way clutch 1 (OWC1) is zero and the overdrive drum speed (ODS) starts to decrease, The output shaft torque is reversed since the reaction torque is zero and OSA pressure is increasing capacity. During a 3-2 downshift, the high drum speed still stays at zero speed.

t5:

Control Strategy:

At this point, the ODS value or the NT value is smaller than a calibration value.

The overdrive drum speed is calculated from HCDS, TSS and OSS. For this calculation, the following actions have to be carried out:

Determine the sign of HCDS (as outlined above under the heading "Determination of High Clutch Drum Direction . . . "

Calculate ODS from HCDS, TSS and OSS (shown above under the heading "Overdrive Drum Speed Calculation"

Figure 19:
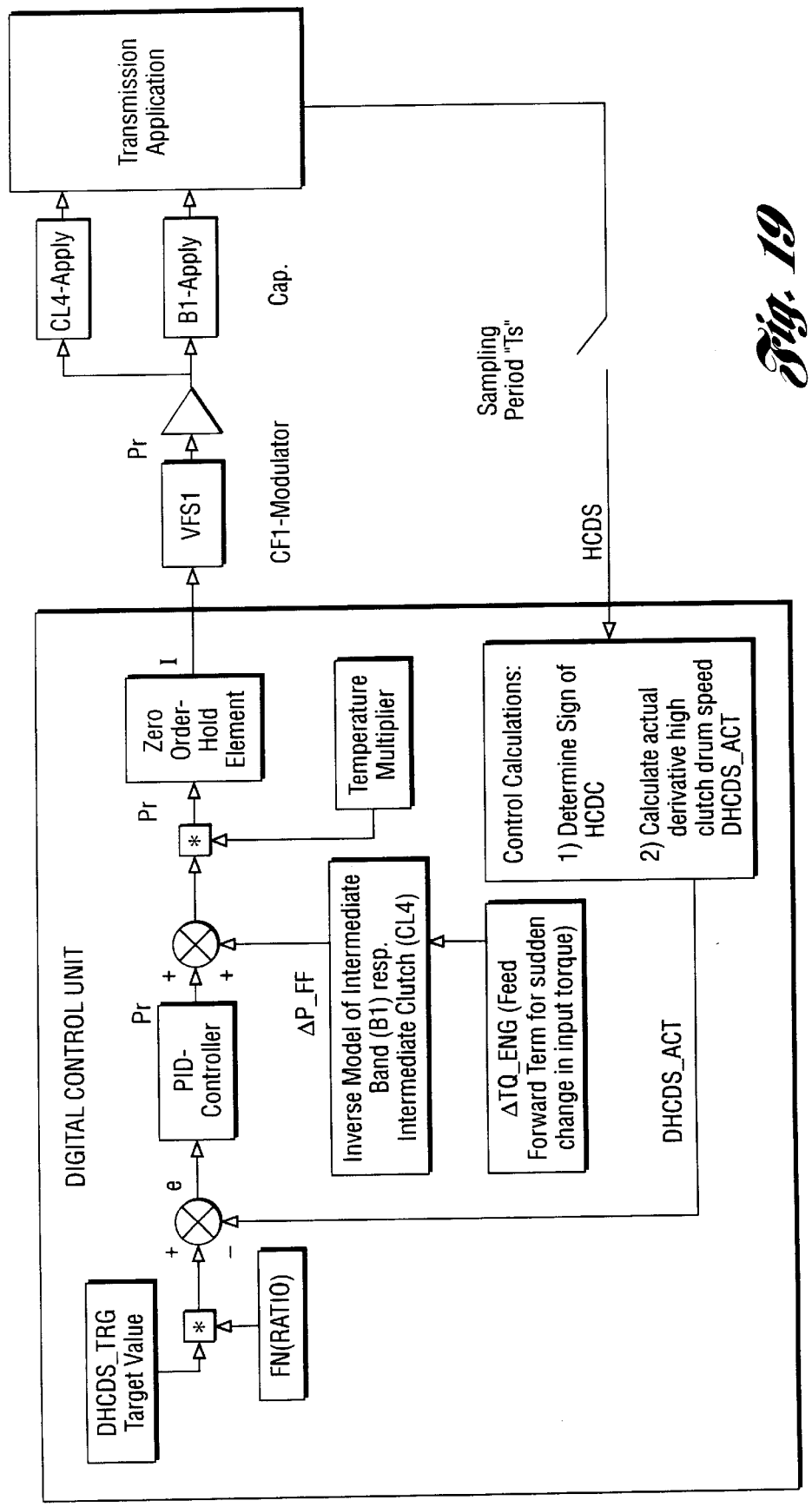
FIG. 19 is a system diagram for the downshifting of the Simpson gearset during a 3-2 downshift.

The downshifting of the Simpson set is now being initiated in a closed loop control manner. Based on the downshifted Simpson planetary gearset, a shift slope 2 is initiated. The control strategy has sensed that enough capacity is transmitted by the engaged overdrive band. The feedback control system then starts closed loop control of downshifting of the Simpson planetary gearset as outlined below:

A PID controller is used in this application to control with capacity manipulation the derivative of the high clutch drum speed (dHCDS/dt). The control block diagram is shown in FIG. 19.

The target derivative high clutch drum speed is calculated from tables of throttle position versus vehicle speed. This is required in order to have dedicated target values for dedicated shifts at dedicated vehicle speeds and throttle positions. The individual target value will be adjusted for a dedicated downshift by a multiplier which is a function of gear ratio (see FIG. 16 as an example). This multiplier gives the opportunity to design a derivative of second order. This derivative of second order is required to control the rear one-way-clutch engagement (OWC2). The target value of the derivative high clutch drum speed is as follows:

DHCDS_TRG=DHCDS_TRG*FN(RATIO)

Figure 16:
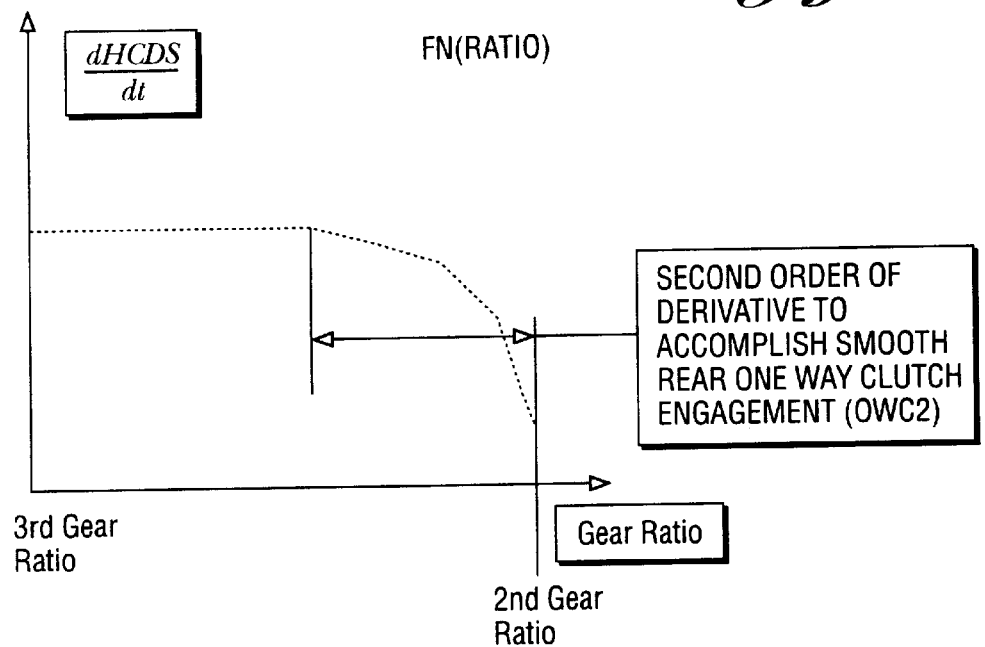
FIG. 16 is a plot of the derivative of the high clutch drum speed during a 3-2 downshift.

DHCDS_TRG=target derivative high clutch drum speed
FN(RATIO)=Multiplier of target value versus gear ratio (see FIG. 16.)

The error of derivative high clutch drum speed is calculated as follows:

e_DHCDS=DHCDS_ACT-DHCDS_TRG

DHCDS_ACT=actual derivative high clutch drum speed

DHCDS_TRG=target derivative high clutch drum speed

In order to calculate the PID controller output, the errors up to two calculation loops backwards are needed. They are as follows:

e_DHCD_T0=error at the current calculation loop e_DHDS_T1=error one calculation loop back e_DHDS_T2=error two calculation loops back The PID controller output is now calculated as follows:

$$\Delta P\_PID = Kc*(Kp*(e\_HCDS\_T0 - e\_HCDS\_T1) + Ki*e\_HCDS\_T0 + kd*(e\_HCDS\_T0 - 2*e\_HCDS\_T1 + e\_HCDS\_T2))$$

This is the velocity algorithm which is used when the actuator, which is in this case a variable force solenoid, has an integrative behavior.

Kp=proportional gain

Ki=integral gain

Kd=derivative gain

Kc=overall gain

The controller gains should be selectable from a table of throttle position (TP) versus vehicle speed (VS). This is required since the 3-2 downshifts occur at different throttle positions and vehicle speeds.

The commanded VFS1 pressure EPC1 is now calculated. EPC1 is the control pressure needed to manipulate the intermediate band capacity (B2) for the transmission of FIG. 5 and the intermediate clutch capacity (CL4) for the transmission of FIG. 3. When the PID control is initiated, the EPC1_HOLD value is already loaded into the EPC1 register.

EPC1=EPC1_HOLD

EPC1=(EPC1+ΔP_PID+Δ_FF)*FN(TOT)

ΔP_PID=PID portion of EPC1 pressure

ΔP_FF=Feed forward term which is used to add pressure when a sudden change in input torque is taking place $$\Delta P\_FF = \frac{\Delta TQ\_TRANS * RATIO\_B2}{Gain\_B2 * Gain\_CF1}$$

or $$\Delta P\_FF = \frac{\Delta tQ\_TRANS * RATIO\_CL4}{Gain\_CL4 * Gain\_CF1}$$

ΔTQ_TRANS=Delta input torque generated by sudden throttle position changes

FN(TOT)=Temperature compensation of EPC1 pressure

The EPC1 calculation takes the error between the actual derivative HCDS and the target derivative high clutch drum speed DHCDS into account and converts the calculated error in EPC1 values. This adjusts the intermediate band or the intermediate clutch capacity accordingly. Based on the capacity control on the intermediate band or intermediate clutch a 'shift slope 2' is initiated, which starts the downshifting of the Simpson planetary gearset.

Control Hardware:

The intermediate servo apply pressure or intermediate clutch apply pressure is either increased or decreased based on the EPC1 value. A second shift slope, as mentioned earlier, is introduced due to intermediate band or intermediate clutch capacity control. The shape of the high clutch drum speed starts to follow the derivative high clutch drum speed target value. Independent control of the Simpson planetary gearset is initiated. The output shaft torque decreases since the capacity on the intermediate band or intermediate clutch is decreased as well. The inertia phase of the downshifting of the Simpson planetary gearset is initiated. The high clutch drum speed starts to accelerate from zero rpm.

t6:

Control Strategy:

At this point, the HCDS value is greater than a calibration value. The downshifting event of the Simpson set is almost completed. The shift solenoid flag 2, FLG__SS__2 is set to zero. This terminates the closed loop control portion of the downshifting event of the Simpson planetary gearset.

Control Hardware:

The shift solenoid 2 is de-energized and the shift valve in bore 213 moves into downshift position and the shift valve in bore 205 moves into upshift position. This connects line pressure to the intermediate servo release side over the shift valve in bore 213. The intermediate servo apply pressure or intermediate clutch apply pressure is exhausted over the shift valve in bore 205 into the ISA/IC exhaust port. The intermediate clutch or the intermediate servo have zero capacity. The high clutch drum speed approaches its rotational speed and the OWC2 will then fully engage.

t7:

Control Strategy:

The EPC2 ramp timer is expired and the ramp is terminated.

Control Hardware:

The high clutch drum speed has reached its rotational speed and OWC2 is fully engaged. The overdrive drum speed (ODS) has zero speed. The output shaft torque characteristic is now reversed again since the OWC2 carries full torque. The torque-phase of the downshifting Simpson gearset is initiated and the inertia phase is completed. The 3-2 downshift is complete.

t8:

Control Strategy:

no action

Control Hardware:

OWC2 is fully carrying torque and the torque phase of the downshifting Simpson set is now completed.

Figure 18:
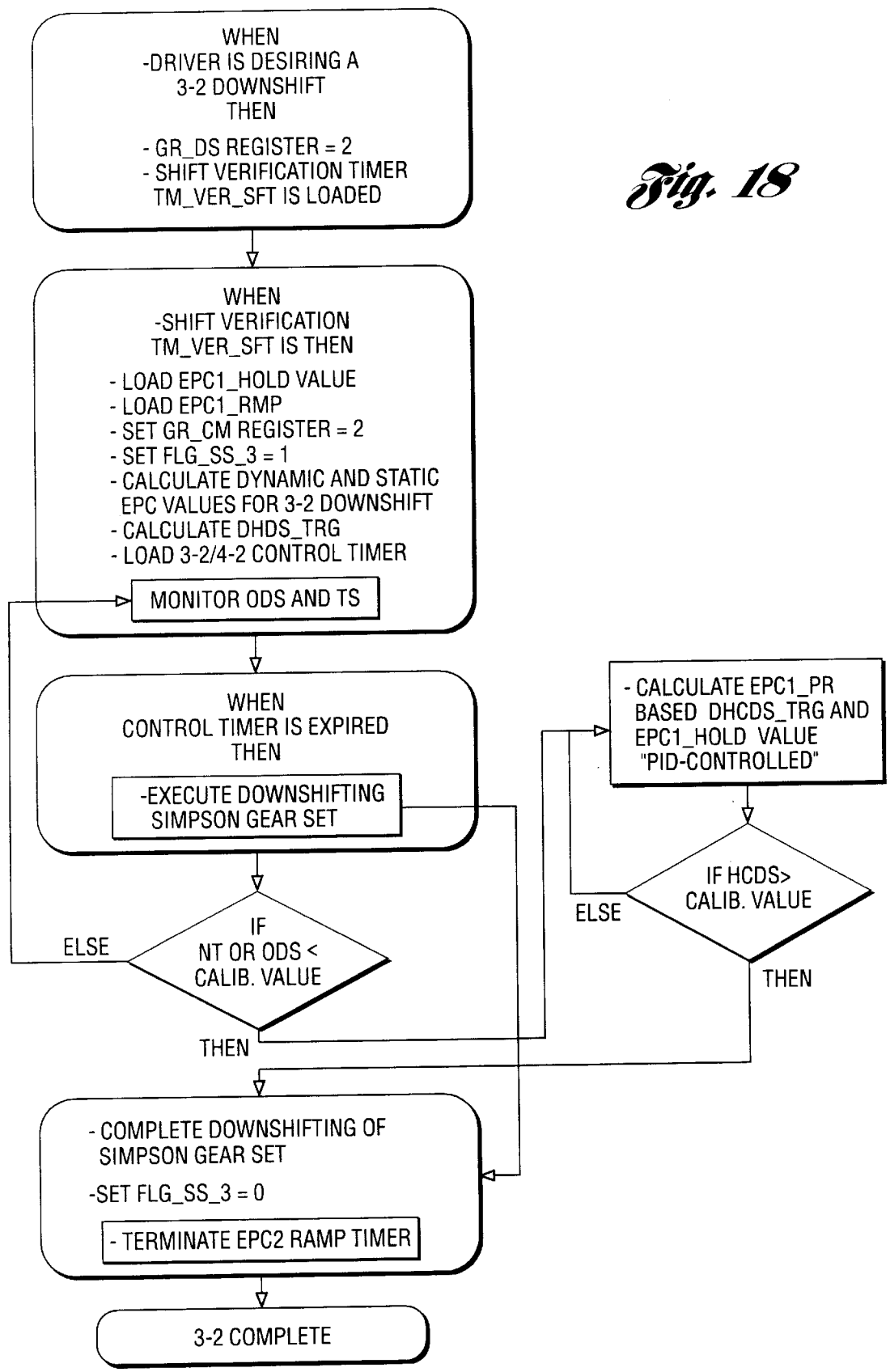
FIG. 18 is a flowchart of the control strategy during a 3-2 downshift.

The flow diagram shown in FIG. 18 shows again the control strategy during a 3-2 downshift in a summary manner. It demonstrates the 3-2 downshift execution in the shift interval as explained above.

4-2 DOWNSHIFT (4th Gear—4th Gear Plus Overdrive—2nd Gear)

The additional shift control actions and shifting events for the 4-2 downshift is shown in the shift interval in FIGS. 13a and 13b in broken lines.

t1:

Control Strategy:

The driver desires a 4-2 downshift which is triggered by the control strategy based on functions vehicle speed versus throttle position. The GR__DS is changed from 4th to 2nd gear and the shift verification timer TM__VER__SFT is loaded. The dynamic EPC2 value is added for second gear to apply B1 capacity.

Control Hardware:

The EPC2 values are raised according to the commanded EPC2 values.

t2:

Control Strategy:

The shift verification timer TM__VER__SFT is expired and gear commanded register GR__CM is changed from 4th to 2nd gear. A 3-2/4-2 control timer is loaded. At the same time, overdrive drum speed and turbine speed are monitored to sense the start of the downshifting event. Those two signals are also used to determine the initiation of the closed loop controlled portion of the downshift. The control timer is required in order to control the 3-2/4-2 downshift independent of the speed signals. This is necessary in case the speed signals are not available. Shift solenoid flag 3 FLG__SS__3 is set to 1 and the EPC2__RMP timer is loaded. The EPC2 ramp is now executed.

A "Hold" EPC3 value is calculated based on input torque transferred to the Simpson set which marginally holds the CL2 capacity. This is required to set CL2 pressure to a value close to closed loop control settings. This is calculated as follows:

$$EPC3\_HOLD = \frac{TQ\_SIMP * RATIO\_CL2}{GAIN\_CL2}$$

EPC3__HOLD=Hold EPC3 pressure to maintain marginally CL2 capacity
TQ__SIMP=Input torque into Simpson set
GAIN__CL2=CL2 capacity gain
RATIO__CL2=Ratio of CL2 torque to input torque Control Hardware:

Shift solenoid 3 is energized in 4th gear and the overdrive control valve in bore 215 moves into upshift position (see FIGS. 22e-a and 22e-b). CF2 pressure produced from the clutch pressure modulator forward 2 is applied to the overdrive servo apply side. The overdrive servo release side is disconnected from line pressure and exhausted into the OSA/OSR EX in bore 215 and the overdrive servo starts to stroke. The transmission is in "4th gear plus overdrive" stage shown in FIGS. 22e-a and 22e-b. The EPC3 pressure is decreased on the high clutch apply side (CL2) since EPC3 pressure has been decreased to a "HOLD" level which marginally holds CL2 capacity. The high clutch capacity can be manipulated by the EPC3 settings and high clutch (CL2) drum slip can be introduced prior to closed loop control of the high clutch capacity.

t3:

Control Strategy:

The control strategy monitors overdrive drum speed (ODS) and turbine speed (NT).

Control Hardware:

The overdrive servo engages with CF2 pressure applied. The characteristic of this forward modulator 2 allows capacity control from 0 to maximum capacity. The overdrive band is engaging and takes the torque of the sun gear from the overdrive planetary gearset. At the same time, the reaction torque on OWC1 relative to the input torque is reduced. The output shaft torque follows first the reaction torque characteristic from OWC1 shown on the torque signature of the OD set in FIGS. 13a and 13b. The torque phase of the 4-2 swap-shift is initiated with the upshifting of the overdrive planetary gearset.

t4:

Control Strategy:

The turbine speed value (NT) and the overdrive drum speed value (ODS) start to decrease since the inertia phase of the 4-2 shift is started and the torque phase is completed. Both speed signals are still being monitored where the overdrive drum speed is calculated from the HCDS, TSS and OSS. The shift starts with a shift slope 1 which is entirely dependent on the CF2 pressure settings on the overdrive band according to the commanded EPC2 ramp.

Control Hardware:

The torque phase of the upshifting event for the overdrive planetary gearset is completed and the output shaft torque is completely dependent on the applied capacity on the overdrive band. The reaction torque on one-way-clutch 1 (OWC1) is zero and the overdrive drum speed (ODS) starts to decrease. The output shaft torque is reversed since the reaction torque is zero and OSA pressure is increasing capacity. During a 4-2 downshift, the high drum speed turns in direction to input shaft speed.

t5:

Control Strategy:

At this point, the ODS value or the NT value is smaller than a calibration value.

The overdrive drum speed is calculated from HCDS, TSS and OSS. For this calculation, the following actions have to be carried out:

Determine the sign of HCDS (as outlined above under the heading "Determination of High Clutch Drum Direction . . . ")

Calculate ODS from HCDS, TSS and OSS (shown above under the heading "Overdrive Drum Speed Calculation")

Figure 20:
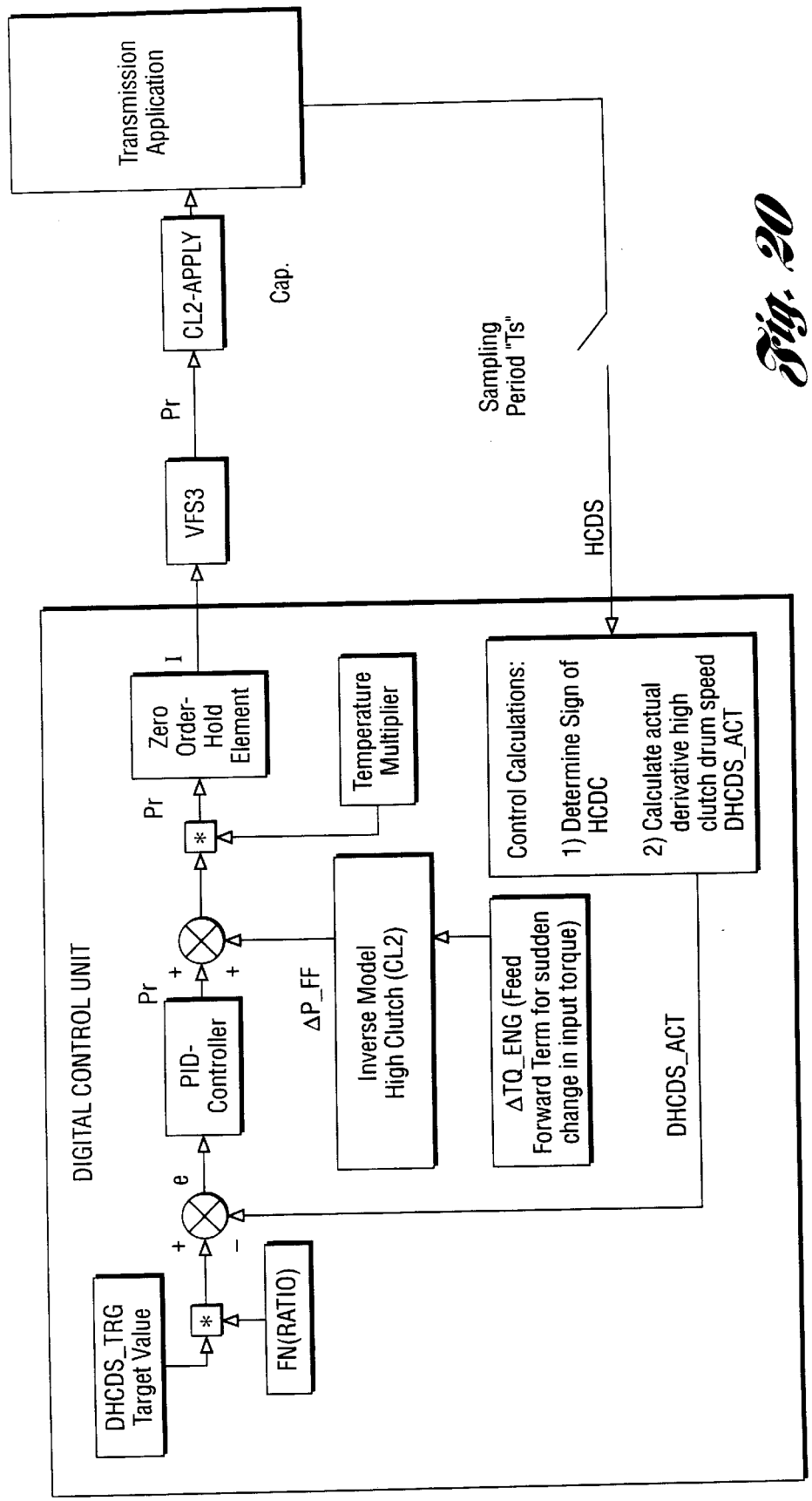
FIG. 20 is a system diagram for the downshifting of the Simpson gearset during a 4-2 downshift.

The downshifting event of Simpson set is now being initiated in a closed loop control manner. Based on the downshifted Simpson planetary gearset a shift slope 2 is initiated. The control strategy has sensed that enough capacity is transmitted by the engaged overdrive band. This causes the feedback control system to start closed loop controlled downshifting of the Simpson planetary gearset as outlined below:

A PID controller is used in this application to control with capacity manipulation of the derivative of the high clutch drum speed (DHCDS/dt). The control block diagram is shown in FIG. 20.

The target derivative high clutch drum speed is calculated from tables of throttle position versus vehicle speed. This is required to have dedicated target values for dedicated shifts at dedicated vehicle speeds and throttle positions. The individual target value will be adjusted for a dedicated downshift by a multiplier which is a function of gear ratio (see FIG. 17 as an example). This multiplier gives the opportunity to design a derivative of second order. This derivative of second order is required to control the rear one-way clutch engagement (OWC2). The target value of the derivative high clutch drum speed is as follows:

dHCDS_TRG=DHCDS_TRG*FN(RATIO)

dHCDS_TRG=target derivative high clutch speed

Figure 17:
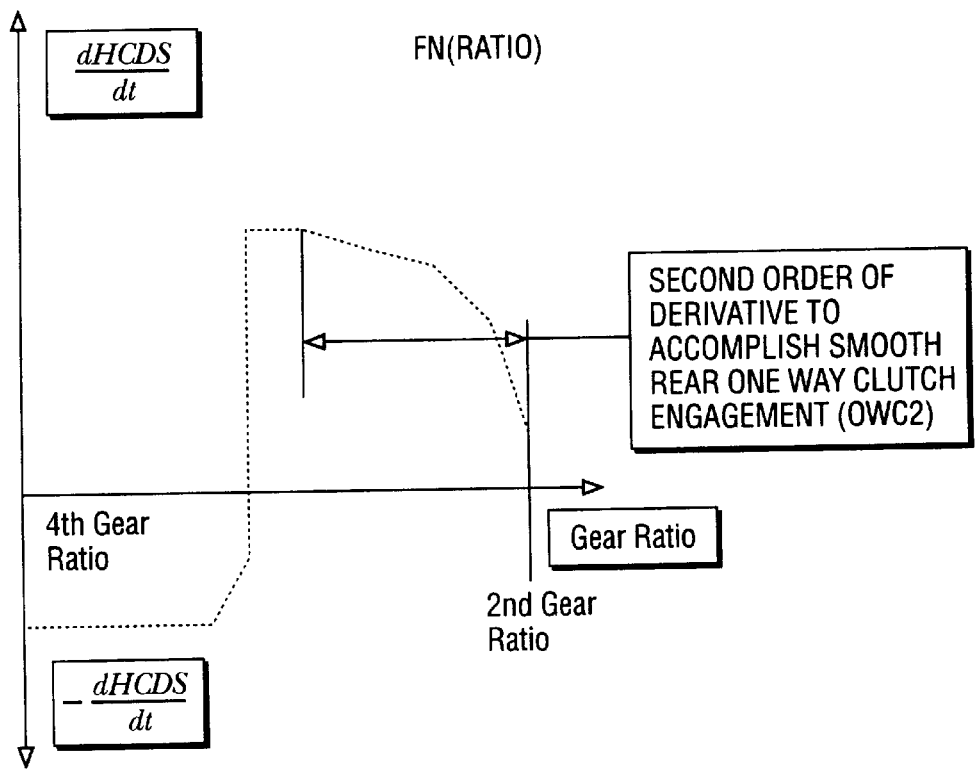
FIG. 17 is a plot of the derivative of the high clutch drum speed during a 4-2 downshift.

FN(RATIO)=Multiplier of target value versus gear ratio (see FIG. 17). Here the target value can be positive or negative since the turning direction of the high clutch drum is opposite to input shaft speed direction in 2nd gear and the same direction as the input shaft speed in 4th gear.

The error of derivative high clutch drum speed is calculated as follows:

e_dHCDS=DHCDS_ACT-DHCDS_TRG dHCDS_ACT=actual derivative high clutch drum speed
dHCDS_TRG=target derivative high clutch drum speed In order to calculate the PID controller output the errors up to two calculation loops backwards are needed. They are as follows:

e_dHCD_T0=error at the current calculation loop
e_dHDS_T1=error one calculation loop back
e_dHDS_t2=error two calculation loops back The PID controller output is now calculated as follows:

ΔP_PID=Kc*(Kp*(e_HCDS_T0-e_HCDS_T1)+Ki*E_HCDS_T0+Kd*(e_HCDS_T0-2*E_HCDS_T1+E_HCDS_T2))

This is a velocity algorithm which is used when the actuator, which is in this case a variable force solenoid, has an integrative behavior.

Kp=proportional gain
Ki=integral gain
Kd=derivative gain
Kc=overall gain

The controller gains should be selectable from a table of throttle position (TP) versus vehicle speed (VS). This is required since the 4-2 downshifts occur at different throttle positions and vehicle speeds.

The commanded VFS3 pressure EPC3 is now calculated. The EPC3 is the control pressure needed to manipulate the high clutch capacity (CL2). When the PID control is initiated, the EPC3_HOLD value is already loaded into the EPC3 register.

EPC3=EPC3_HOLD

EPC3_PR=(EPC3+ΔP_PID+ΔP_FF)*FN(TOT)

ΔP_PID=PID-portion of EPC3 pressure
ΔP_FF=Feed forward term which is used to add pressure when a sudden change in input torque is taking place $$\Delta P\_FF = \frac{\Delta TQ\_TRANS*RATIO\_CL2}{Gain\_CL2}$$

ΔTQ_TRANS=Delta input torque generated by sudden throttle position changes
FN(TOT)=Temperature compensation of EPC3 pressure The EPC3 calculation takes the error between the actual derivative high clutch drum speed dHCDS and the target derivative high clutch drum speed into account and converts the calculated error in an EPC3 value. This adjusts the high clutch capacity accordingly.

Based on capacity control of the high clutch, a shift slope 2 is initiated which starts the downshifting event of the Simpson planetary gearset.

Control Hardware:

The high clutch apply pressure is either increased or decreased based on the EPC3 value. A second shift slope, as mentioned earlier, is introduced due to high clutch capacity control. The shape of the high clutch drum speed starts to follow the derivative high clutch drum speed target value. Independent control of the Simpson planetary gearset is initiated. The output shaft torque decreases since the capacity on the high clutch is decreased as well.

The inertia phase of the downshifting of the Simpson planetary gearset is initiated.

The high clutch drum speed starts to decelerate down to zero rpm and then accelerate again in the opposite direction.

The high clutch is disconnected from the intermediate servo and controlled by the EPC3 pressure directly and independent of all other elements. This allows the closed loop control of the high clutch during a direct 4-2 downshift.

t6:

Control Strategy:

At this point, the HCDS value is greater than a calibration value. The downshifting of the Simpson set is almost completed. The shift solenoid flag 1, FLG_SS_1 is set to one. This terminates the closed loop controlled portion of the downshifting of the Simpson planetary gearset. Shift solenoid 2 is always de-energized.

Control Hardware:

The shift solenoid 1 is energized and the shift valves in bore 205 and 212 move into downshift position (see FIGS. 22a-a and 22a-b). This exhausts the high clutch pressure into the HC/EX port of the shift valve in bore 212 and disconnects EPC3 pressure from the high clutch. At the same time, the intermediate servo apply pressure is exhausted into the ISA/IC EX port in bore 205. This action has no influence on the downshift event since line pressure on the release side prevented the intermediate servo from stroking.

t7:

Control Strategy:

The EPC2 ramp timer is expired and the ramp is terminated.

Control Hardware:

The high clutch drum speed has reached its rotational speed and the OWC2 is fully engaged. The overdrive drum speed (ODS) has zero speed. The output shaft torque characteristic is now reversed again since the OWC2 is carrying full torque. The torque phase of the downshifting Simpson gearset is initiated and the inertia phase is completed.

t8:

Control Strategy:

no action

Control Hardware:

The OWC2 carries full torque and the torque phase of the downshifting Simpson set is now completed.

Figure 21:
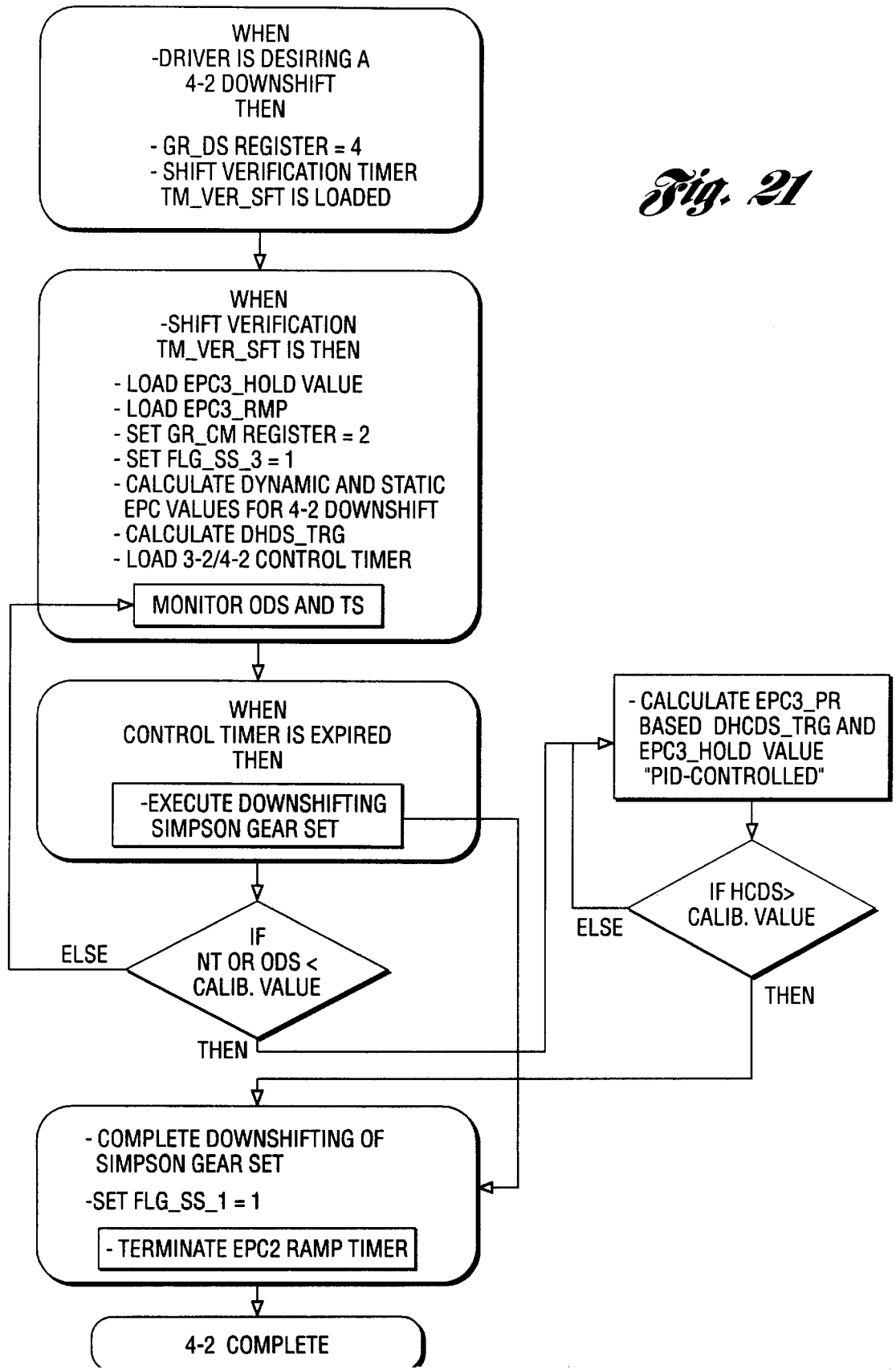
FIG. 21 is a flowchart showing the strategy for a 4-2 downshift.

The flow diagram of FIG. 21 shows the control strategy during a 4-2 downshift. It illustrates the downshift execution explained above during the shift interval.

Open Loop Control Of 3-2/4-2 Downshifts (Swap-Shift)

As explained above, a "good quality" 3-2/4-2 downshift is accomplished by a smooth rear one-way clutch engagement (OWC2) within the Simpson planetary gearset during the downshifting event of the Simpson set. The previous discussion explains how this is accomplished by "Closed Loop" capacity control.

The same effect can be accomplished by "Open Loop" capacity control as well. This control method is already described in U.S. patent application Ser. No. 509,571 entitled "Shift Control Systems for a Multiple Ratio Automotive Transmission", which is assigned to the assignee of this invention. It is described as a 2-1 downshift within the Simpson planetary gearset. An open loop timer attached to a negative pressure ramp controls the intermediate band capacity in order to achieve a smooth rear one-way clutch (OWC2) engagement during a 2-1 downshift. Percentage shift complete calculation and monitoring is then used in order to terminate the pressure ramp resulting in complete release of the intermediate band (B2) capacity.

The same method can be applied with the shift solenoids and shift valves along with the dedicated variable force solenoids for the affected elements as shown:

VFS3 with respect to EPC3 for the high clutch (CL2)

VFS1 with respect to EPC1 along with the CF1 modulator for the intermediate band (B2) for the FIG. 5 transmission and for the intermediate clutch (CL4) for the FIG. 3 transmission version

SUMMARY

The five-speed control system controls two independent parts of the transmission, which are the overdrive planetary gearset and the Simpson planetary gearset. These two independent transmissions are compounded together in series. The electronic control system controls upshifting of the overdrive planetary gearset and downshifting of the Simpson planetary gearset during a 2-3 upshift and vice versa during a downshift. It is important to synchronize both events and execute capacity control during the synchronization process.

The major enhancement of the swap-shift system of the present invention is independent capacity control of all elements involved in 2-3, 3-2 and 4-2 shifts. In the transmission of application Serial No. 549,438, however, only the 2-3 upshift uses independent capacity control of the Simpson planetary gearset or the overdrive planetary gearset.

Allowing independent capacity control of CL2 and B2 with respect to B1 provides enhancement in shift quality of the 3-2 and 4-2 downshifts using closed loop control.

The engagement of OWC2 is controlled during downshifting of the Simpson planetary gearset by controlling the B2 or the CL4 capacity. This is not possible with the transmission of application Ser. Nos. 549,438 509,571, which uses only one capacity modulator for B1 and B2. In addition, no capacity control was possible on CL2 to enhance the 4-2 downshift quality.

What is claimed is:

1. An automatic transmission for a vehicle having gearing defining multiple torque flow paths between a throttle controlled engine and a torque output shaft comprising a first gear unit with at least three forward-driving ratios and a second gear unit with at least two forward driving ratios, said gear units being disposed in series relationship in said torque flow paths, said torque flow paths including a torque converter with an impeller driven by said engine and a turbine connected drivably to said second gear unit;

pressure-operated clutch and brake means for establishing and disestablishing ratio changes in said gearing including a first reaction brake means for anchoring a reaction element of said first gear unit during operation in an intermediate ratio of said first gear unit and a second reaction brake means for anchoring a reaction element of said second gear unit during operation in the higher of said two forward driving ratios of said second gear unit;

said first reaction brake means including a first brake servo having a first servo piston and brake release and apply pressure chambers on opposite sides of said first servo piston;

said second reaction brake means including a second brake servo having a second servo piston and brake apply pressure and release chambers on opposite sides of said second brake servo piston;

two independent solenoid operated regulator valve means for establishing separate brake servo actuating pressures for said first and second brake servos;

a control valve system for controlling distribution of pressure to said brake means including said apply pressure chambers for said first and second brake servo pressure chamber, said valve system including a source of line pressure and a pressure regulator valve means for regulating said line pressure;

said independent solenoid operated regulator valve means being in fluid communication with said control valve system and said pressure regulator valve means;

said control valve system including shift valve means for selectively and separately distributing said servo actuating pressures to said apply pressure chambers whereby brake capacities during application and release of said first and second reaction brake means are controlled independently, one with respect to the other, to effect smooth transition of reaction torque from one of said gear units to the other during upshifts and downshifts.

2. The transmission as set forth in claim 1 wherein said clutch and brake means includes a high ratio clutch for establishing a ratio of unity in said first gear unit and a first reaction brake drum connected to a reaction element of said second gear unit; and a third solenoid-operated regulator valve means communicating with said pressure regulator valve means for distributing activating pressure to said high ratio clutch thereby establishing high ratio clutch capacity control for downshift to said intermediate ratio whereby independent capacity control of said high ratio clutch and said second reaction brake means achieves smooth downshift quality.

3. The transmission as set forth in claim 1 wherein said first reaction brake means comprises a series-related pressure-operated friction coupling and an overrunning coupling between said reaction element of said second gear unit and a stationary portion of said transmission.

4. The transmission as set forth in claim 1 wherein said first reaction brake means includes a first reaction brake drum, said clutch and brake means further including a high clutch for effecting a gear ratio of unity for said first gear unit;

said transmission further including a turbine speed sensor, a vehicle speed sensor, a brake drum speed sensor means for detecting speed of said first reaction brake drum and an output shaft speed sensor;

said control valve system including first and second solenoid valve means including an electronic processor means for modulating said brake servo activating pressure to establish independent closed loop control of brake capacities of said reaction brake means as a function of output signals of said speed sensors.

5. The transmission as set forth in claim 3 wherein said first reaction brake means includes a reaction brake drum, speed sensor means for detecting speed of said brake drum, a turbine speed sensor, a vehicle speed sensor and an output shaft speed sensor;

said control valve system including electronic processor means with first and second solenoid valve means for modulating said apply pressures to establish independent closed loop control of the capacities of said friction coupling and said second reaction brake means as a function of the output signals of said speed sensors.

6. The transmission as set forth in claim 3 wherein said first gear unit includes a reaction brake drum, high clutch means for effecting a gear ratio of unity for said first gear unit;

a first speed sensor means for detecting speed of said brake drum;

a second speed sensor means for detecting speed of said turbine;

a third speed sensor means for detecting speed of said output shaft;

said control valve system including control valve means and electronic processor means for establishing independent closed loop control of the brake capacity of said first reaction brake means;

said second reaction brake means including an overdrive brake drum;

said processor including means for calculating overdrive drum speed as a function of the output of said first, second and third speed sensor means upon release and application of said first reaction brake means and application and release of said second reaction brake means whereby closed loop control of upshifts and downshifts is achieved.

7. The transmission as set forth in claim 5 wherein said first gear unit includes high clutch means with a clutch drum for effecting a ratio of unity in said first gear unit;

electronic processor means including means for calculating the derivative of the speed of said clutch drum and means for effecting closed loop control of the capacities of said first reaction brake means and said high clutch means during downshifts as a function of said derivative.

8. The transmission as set forth in claim 7 wherein said electronic processor means includes means for calculating the rotary direction of said clutch drum as a function of overall gear ratio and said derivative; and means for effecting closed loop capacity control of said first reaction brake means and said high clutch means during downshifts as a function of the speed of said clutch drum.

* * * * *